(12) United States Patent
Altonji et al.

(10) Patent No.: US 7,546,994 B2
(45) Date of Patent: Jun. 16, 2009

(54) EXTENSION ARM WITH MOVING CLEVIS AND CABLE MANAGEMENT

(75) Inventors: Robert Altonji, Quakertown, PA (US);
Steve Bowman, Allentown, PA (US);
David VanDuzer, Slatington, PA (US);
Bradley A. Derry, Easton, PA (US);
Howard M. Williams, Jr., Emmaus, PA (US)

(73) Assignee: Innovative Office Products, Inc., Easton, PA (US)

( * ) Notice: Subject to any disclaimer, the term of this patent is extended or adjusted under 35 U.S.C. 154(b) by 0 days.

(21) Appl. No.: 11/810,352

(22) Filed: Jun. 5, 2007

(65) Prior Publication Data

US 2008/0067317 A1    Mar. 20, 2008

Related U.S. Application Data

(63) Continuation-in-part of application No. 11/544,076, filed on Oct. 6, 2006, which is a continuation-in-part of application No. 29/266,148, filed on Sep. 15, 2006, now Pat. No. Des. 570,853, application No. 11/810, 352, which is a continuation-in-part of application No. 29/266,148, and a continuation-in-part of application No. 29/267,176, filed on Oct. 6, 2006, now Pat. No. Des. 577,729.

(51) Int. Cl.
    *E04G 3/00*    (2006.01)
(52) U.S. Cl. ............ 248/276.1; 248/279.1; 248/281.11; 248/284.1; 248/584; 248/585; 403/69; 361/681; 361/682
(58) Field of Classification Search ............... 248/276.1, 248/279.1, 281.11, 284.1, 584, 585; 403/69, 403/150–159; 361/681–682
    See application file for complete search history.

(56) References Cited

U.S. PATENT DOCUMENTS

| 919,777 A | 4/1909 | Savin et al. |
| 1,189,754 A | 7/1916 | Trenaman |
| 3,721,416 A | 3/1973 | Goudreau |
| 3,981,340 A | 9/1976 | Anderson et al. |
| 4,160,536 A * | 7/1979 | Krogsrud ............... 248/280.11 |

(Continued)

OTHER PUBLICATIONS

International Search Report issued on Aug. 24, 2008 in connection with corresponding International Application No. PCT/US07/20056.

*Primary Examiner*—J. Allen Shriver, II
*Assistant Examiner*—Michael McDuffie
(74) *Attorney, Agent, or Firm*—Design IP

(57) ABSTRACT

The present invention pertains to extension arm apparatuses that are adapted to support user devices throughout a range of positions. A given apparatus may include one or more arms that position the user device remotely from a support position. An extension and retraction device such as a gas cylinder is received within each arm, and provides a force to support the user device as the arm is placed into a given position. A variable force clevis is connected to the extension/retraction device within the arm. The variable force clevis is connected to a pair of locations in the arm as well. As the arm moves, for instance up or down, the variable force clevis rotates within the arm and dynamically adjusts the force provided by the extension/retraction device. Removable and/or pivotable covers are provided for managing cables of the user device attached to the extension arm.

10 Claims, 46 Drawing Sheets

U.S. PATENT DOCUMENTS

| | | |
|---|---|---|
| 4,166,602 A | 9/1979 | Nilsen et al. |
| 4,402,481 A | 9/1983 | Sasaki et al. |
| 4,447,031 A * | 5/1984 | Souder et al. ........... 248/281.11 |
| 4,494,177 A * | 1/1985 | Matthews ................... 362/402 |
| 4,568,052 A | 2/1986 | Solomon et al. |
| 4,584,898 A * | 4/1986 | Panushka ............... 74/501.5 R |
| 4,770,384 A | 9/1988 | Kuwazima et al. ...... 248/281.11 |
| 4,846,434 A * | 7/1989 | Krogsrud ................ 248/284.1 |
| 4,852,842 A * | 8/1989 | O'Neill .................... 248/284.1 |
| 4,953,822 A | 9/1990 | Sharber et al. |
| 5,014,693 A | 5/1991 | Wright, II et al. |
| 5,133,547 A | 7/1992 | Pardi |
| 5,170,975 A | 12/1992 | Chadwick |
| 5,213,292 A | 5/1993 | Evans |
| 5,477,283 A | 12/1995 | Casey |
| 5,505,424 A * | 4/1996 | Niemann ................... 248/585 |
| 5,538,214 A | 7/1996 | Sinila |
| 5,609,316 A | 3/1997 | Tigliev |
| 5,743,503 A * | 4/1998 | Voeller et al. ............. 248/284.1 |
| 5,876,008 A | 3/1999 | Sweere et al. |
| 5,924,665 A | 7/1999 | Sweere et al. |
| 5,967,479 A | 10/1999 | Sweere et al. |
| 6,012,693 A | 1/2000 | Voeller et al. |
| 6,076,785 A | 6/2000 | Oddsen, Jr. |
| 6,286,794 B1 | 9/2001 | Harbin |
| 6,409,134 B1 * | 6/2002 | Oddsen, Jr. .............. 248/274.1 |
| 6,550,734 B1 | 4/2003 | Spadea |
| 6,553,587 B1 | 4/2003 | Barker et al. |
| 6,609,691 B2 * | 8/2003 | Oddsen, Jr. .............. 248/278.1 |
| 6,726,167 B2 * | 4/2004 | Oddsen, Jr. .............. 248/274.1 |
| D495,240 S | 8/2004 | Mnich et al. |
| 6,896,230 B2 | 5/2005 | Cvek |
| 7,066,435 B2 * | 6/2006 | Oddsen et al. ......... 248/220.43 |
| 7,188,812 B2 | 3/2007 | Wang et al. |
| 7,207,537 B2 * | 4/2007 | Hung ...................... 248/284.1 |
| D544,489 S | 6/2007 | Oddsen, Jr. et al. |
| D555,657 S | 11/2007 | Loyd |
| 7,364,127 B2 * | 4/2008 | Huang .................... 248/276.1 |
| 7,389,965 B2 * | 6/2008 | Oddsen et al. .......... 248/274.1 |
| 7,464,909 B2 * | 12/2008 | Li ........................ 248/280.11 |
| 2002/0017595 A1 * | 2/2002 | Koyanagi ................ 248/122.1 |
| 2002/0088910 A1 | 7/2002 | Sweere et al. |
| 2003/0075653 A1 | 4/2003 | Li |
| 2004/0178312 A1 | 9/2004 | Parsons |
| 2005/0230585 A1 | 10/2005 | Hung |
| 2006/0266903 A1 | 11/2006 | Oddsen et al. |

* cited by examiner

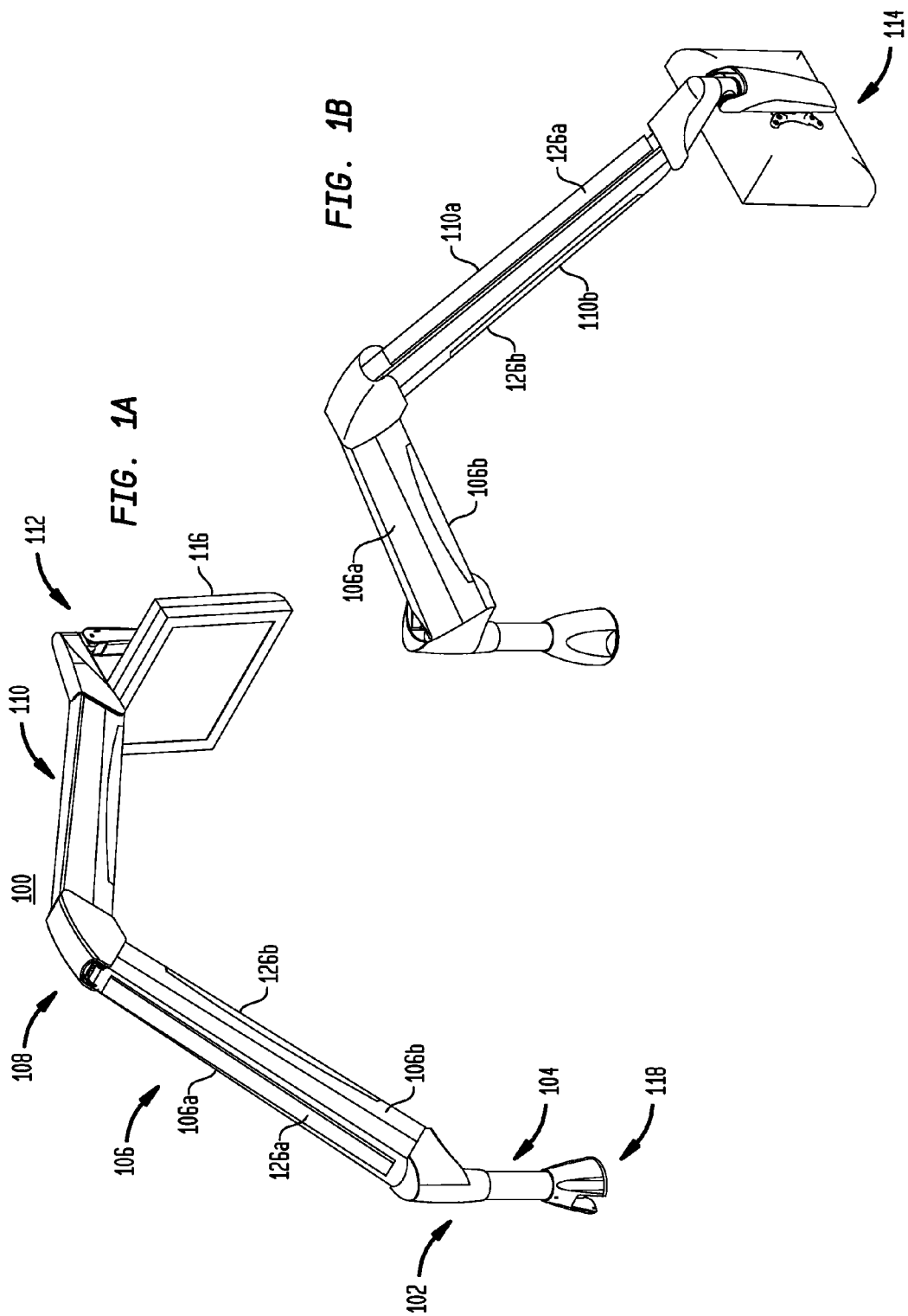

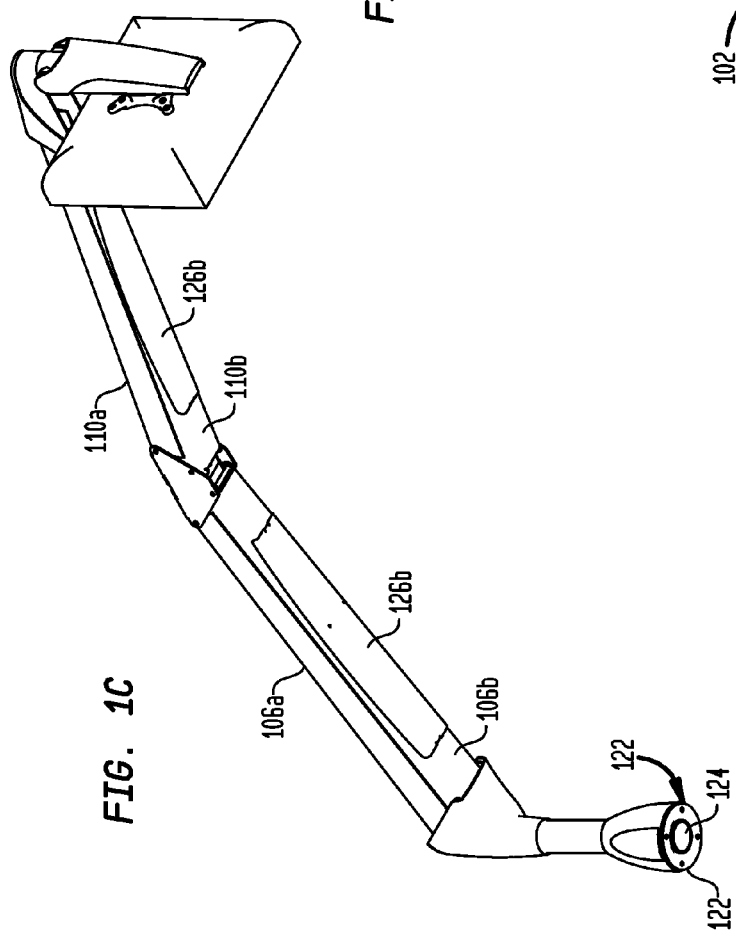
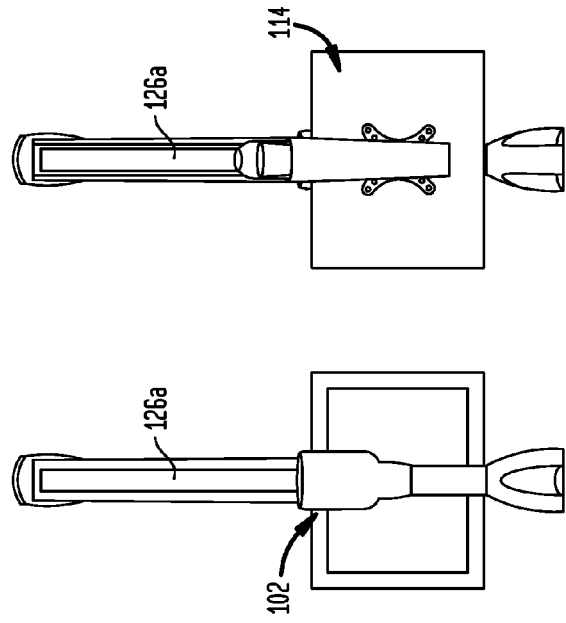

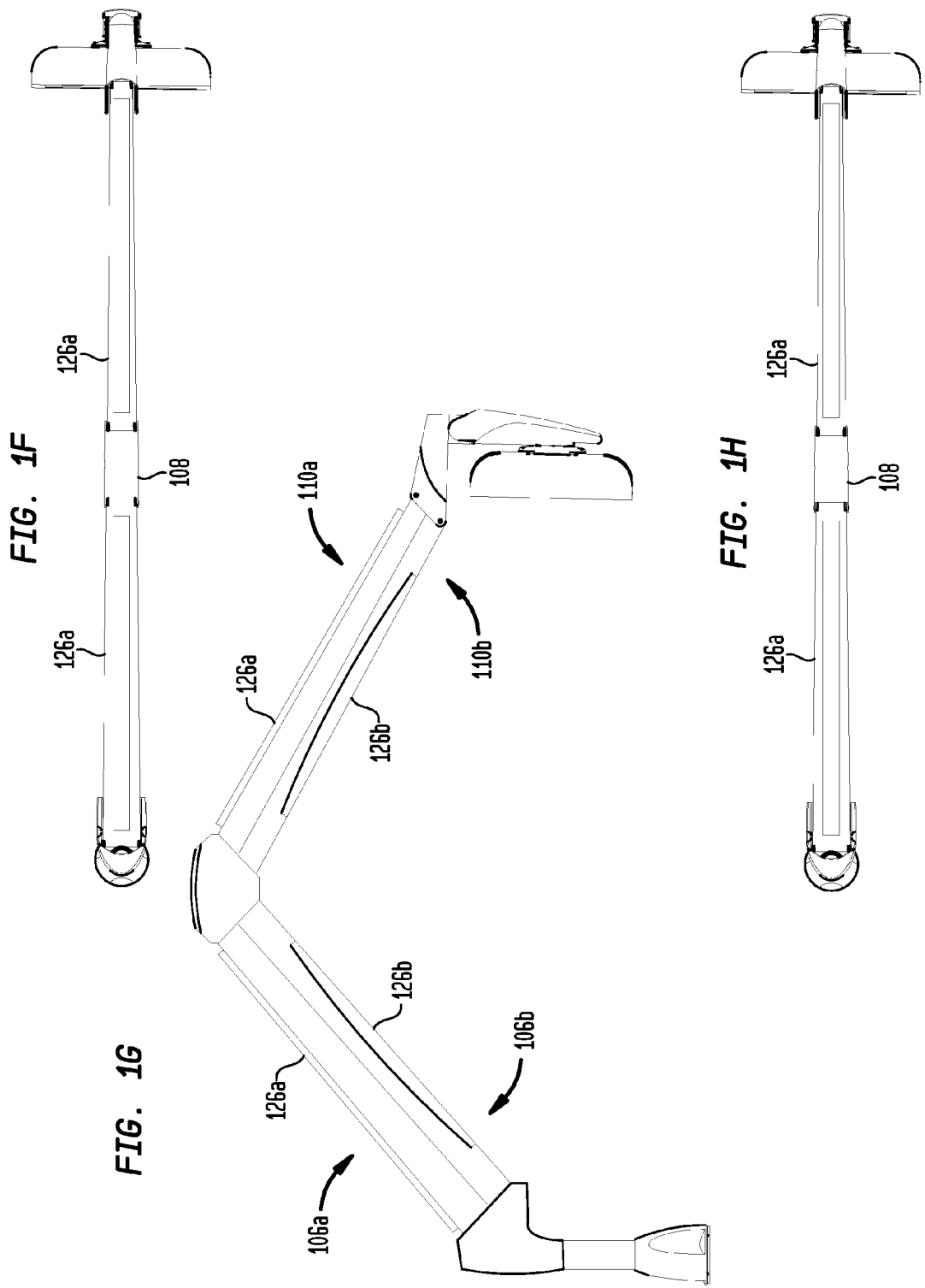

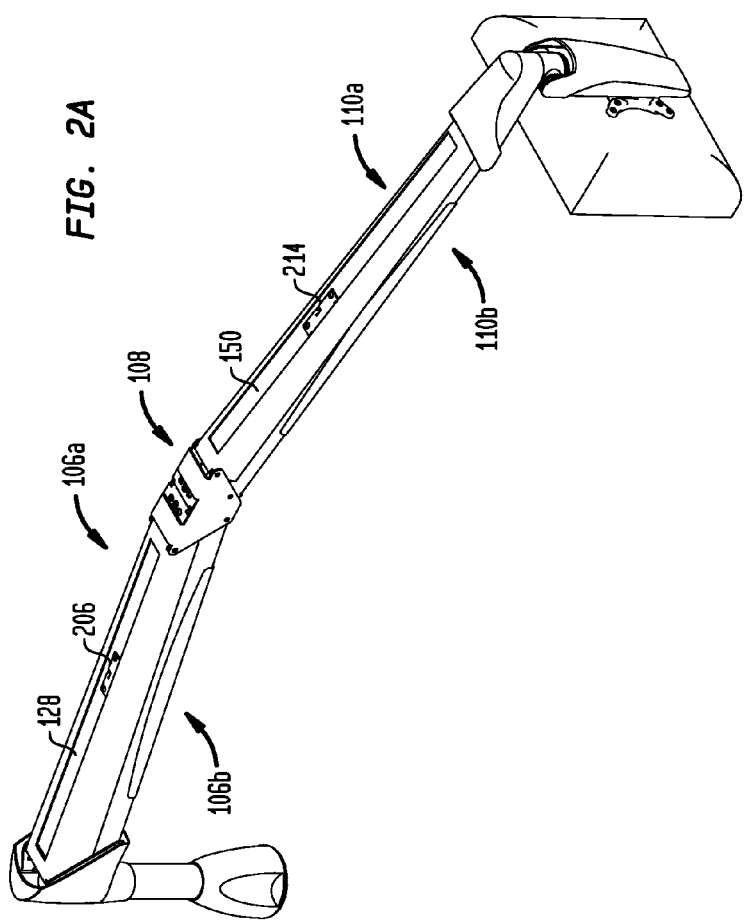
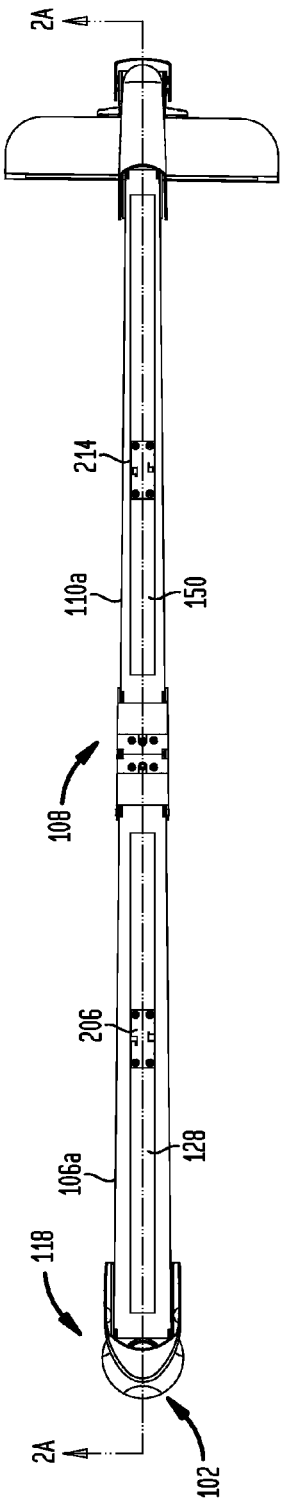

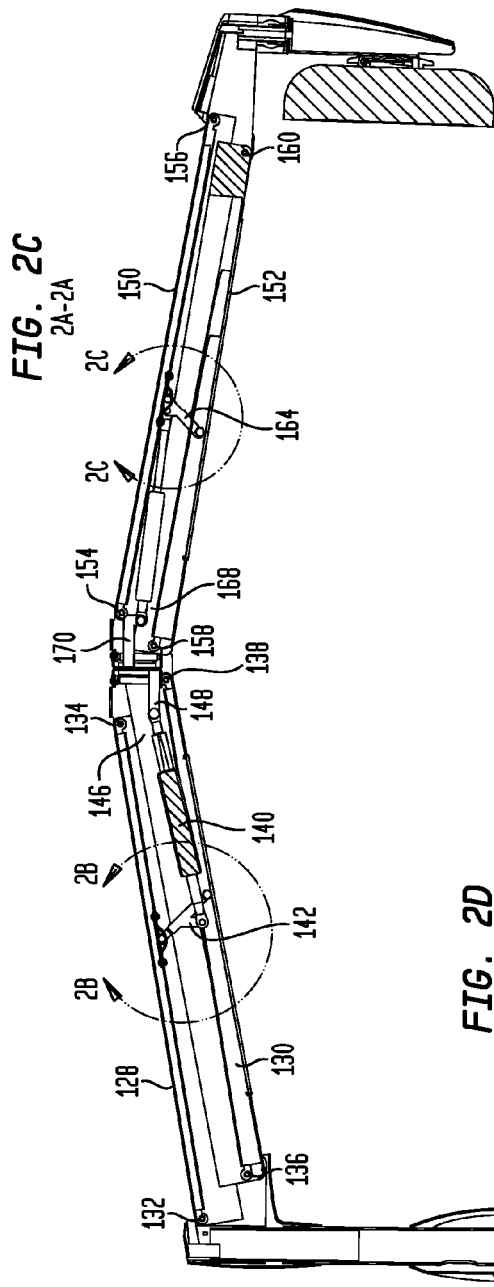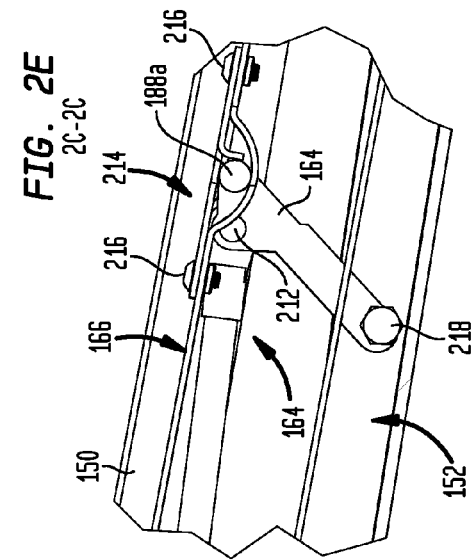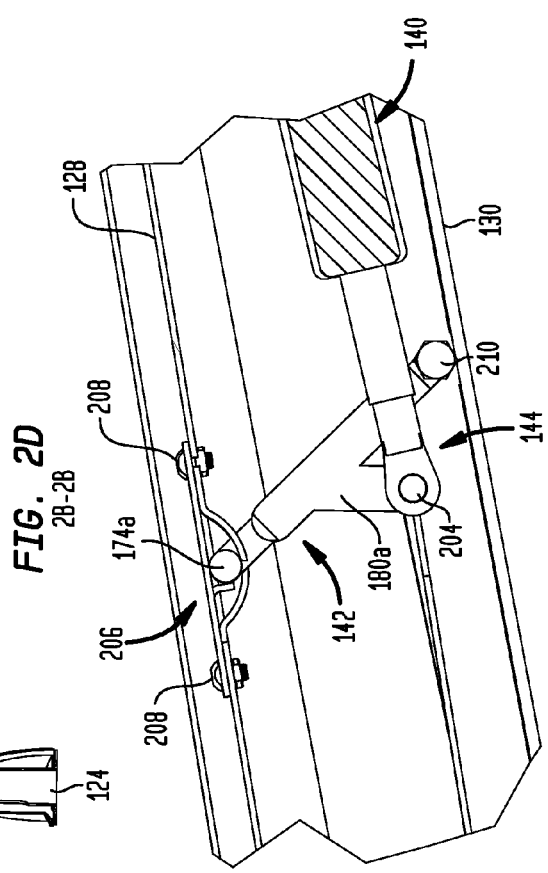

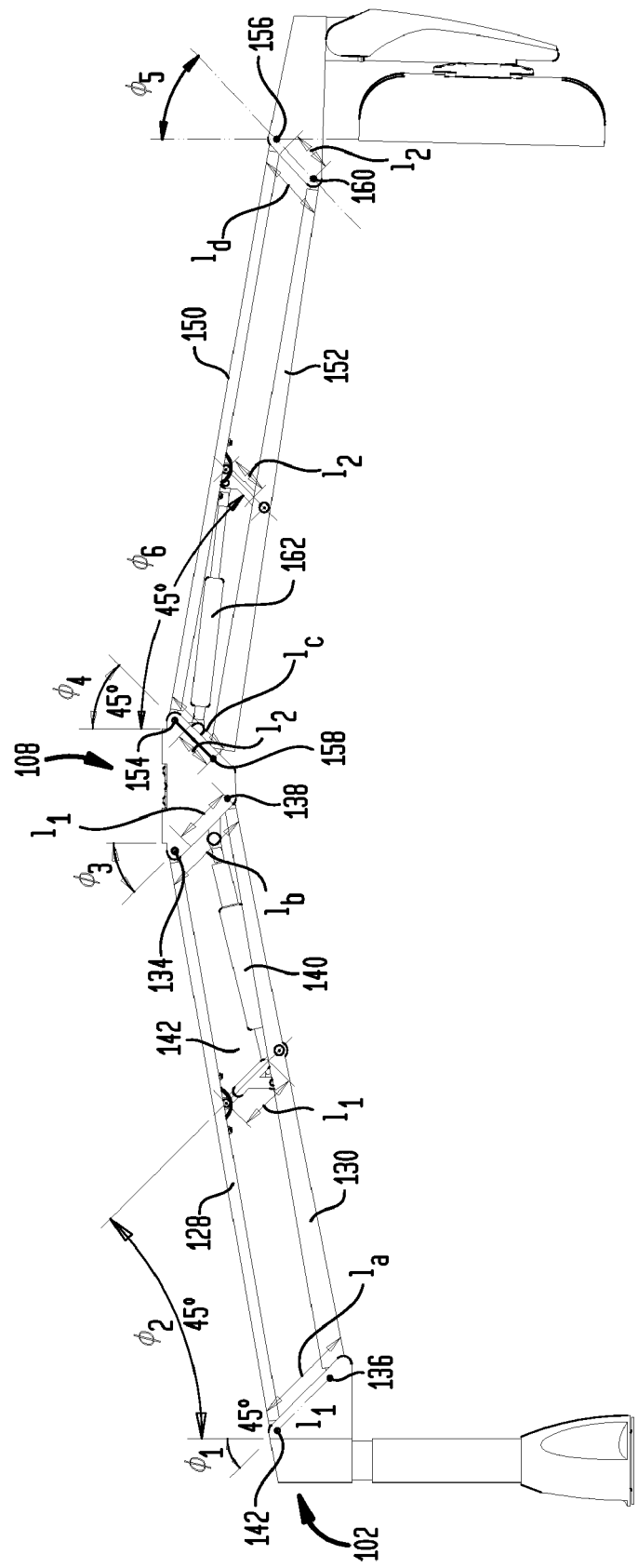

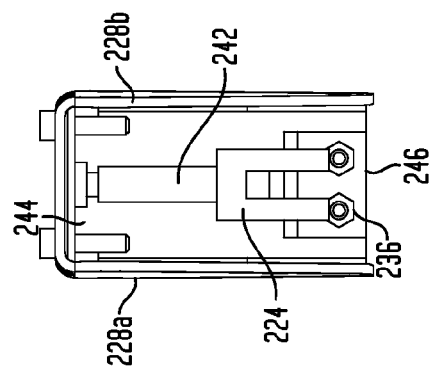
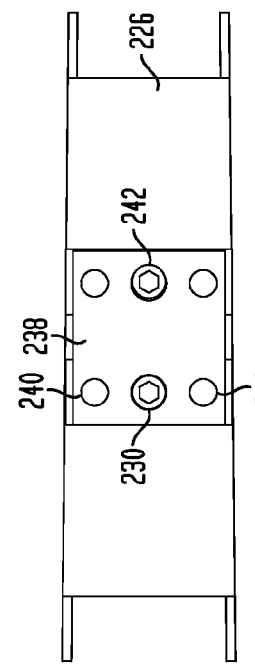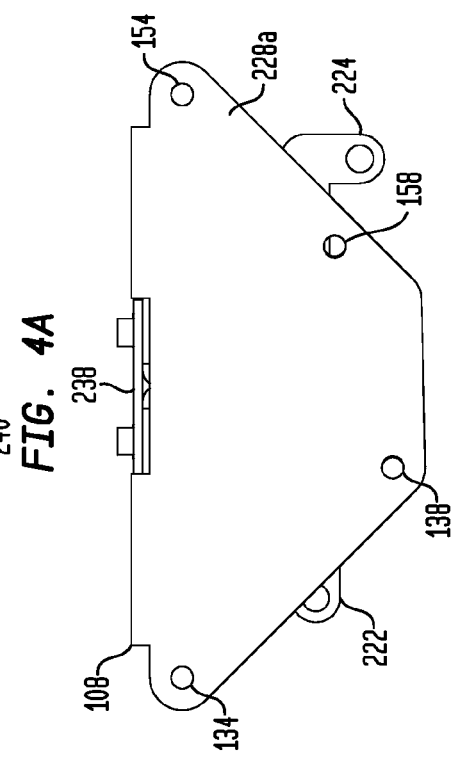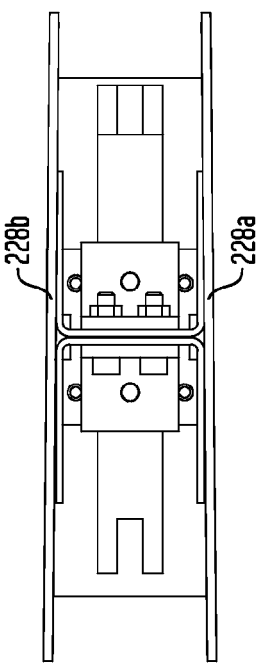
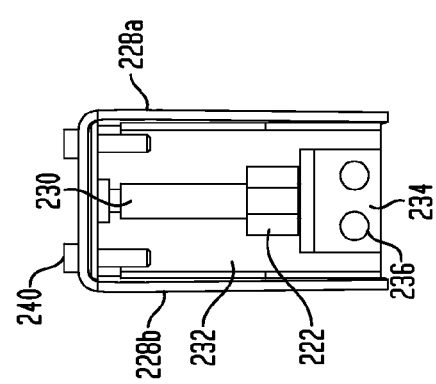

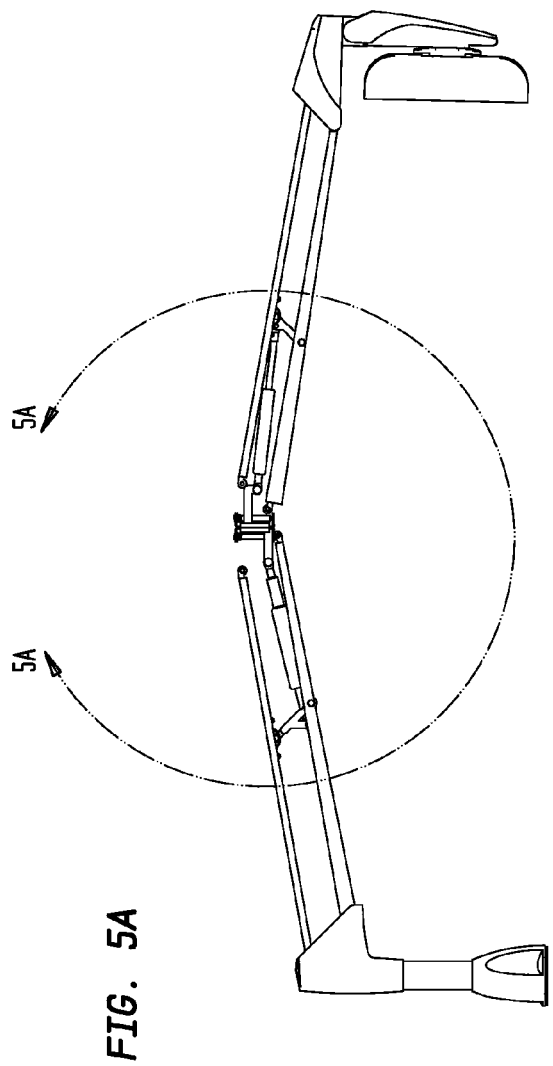
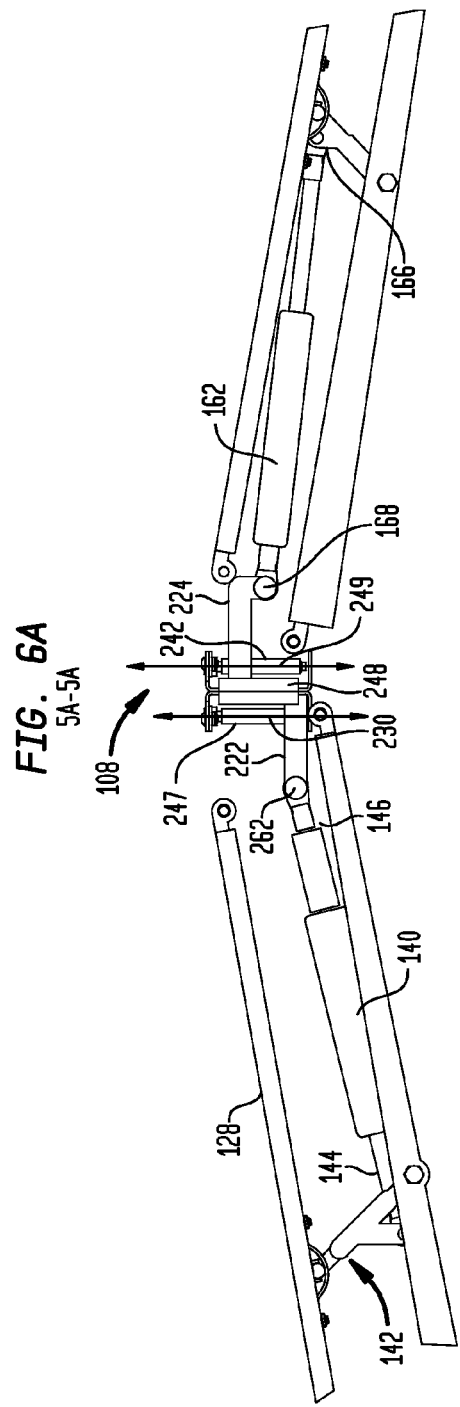
FIG. 5A
FIG. 6A
5A-5A 5B-5B 5C-5C 5D-5D 5E-5E 5F-5F 5G-5G

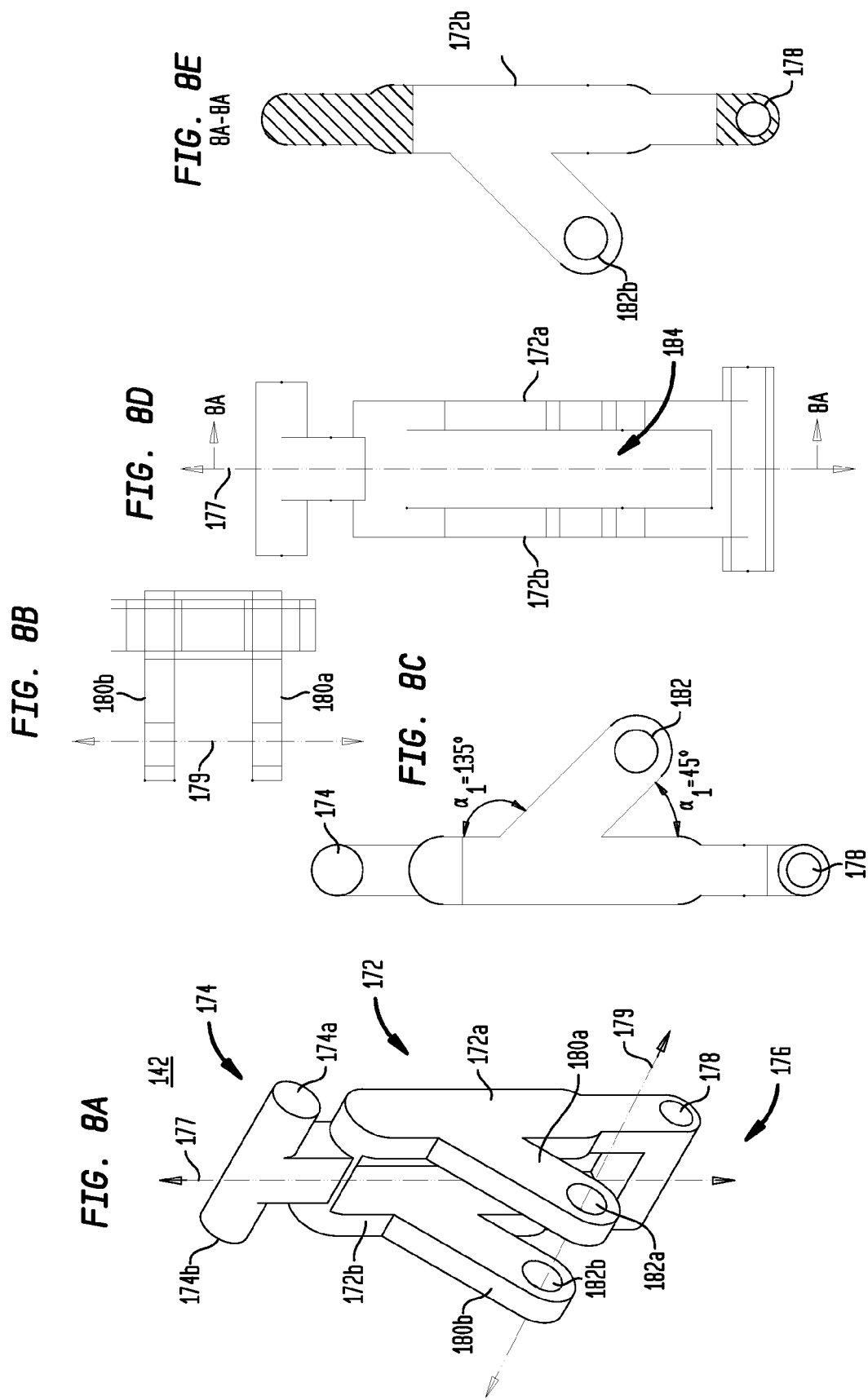

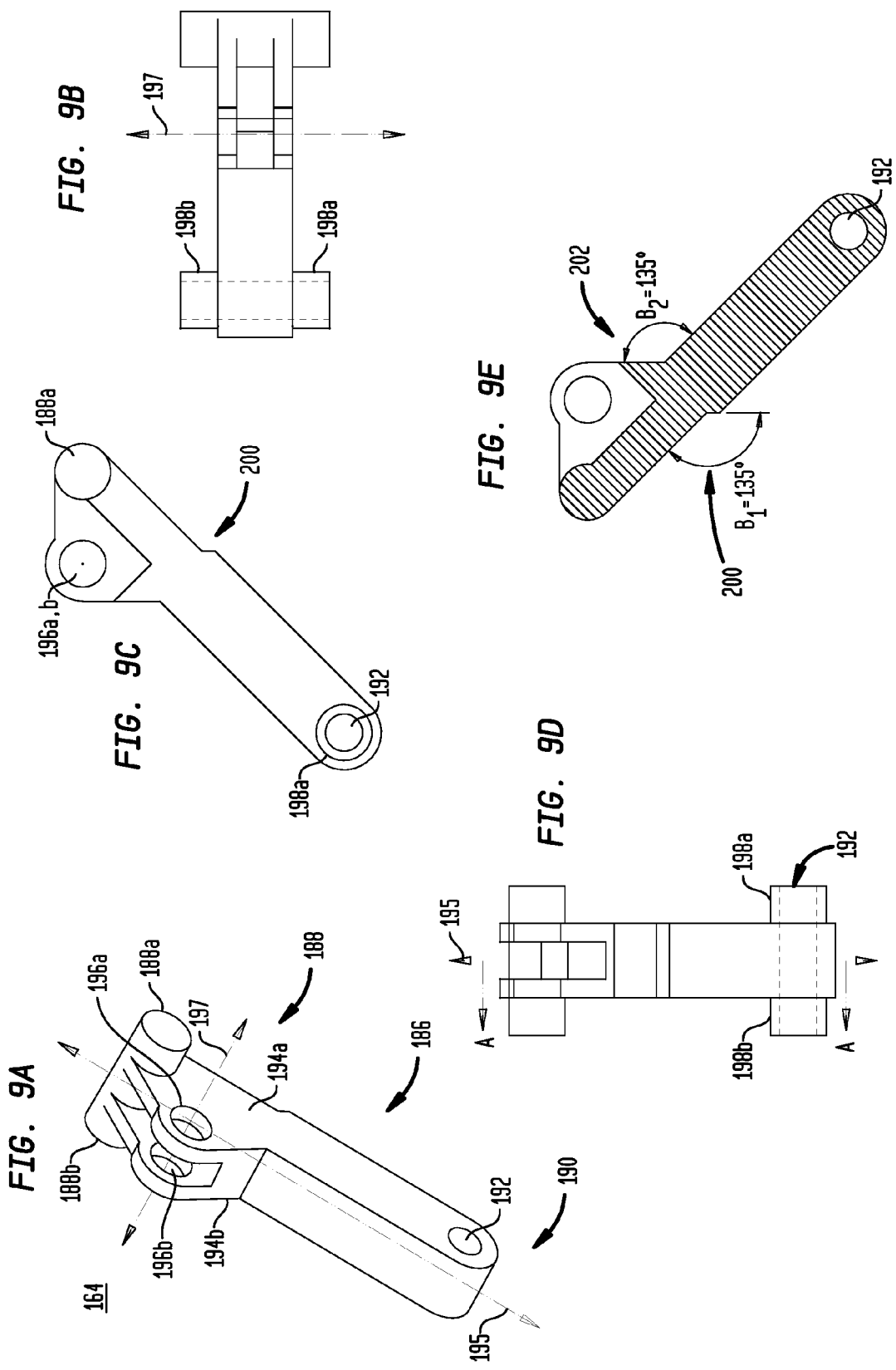

10A-10A

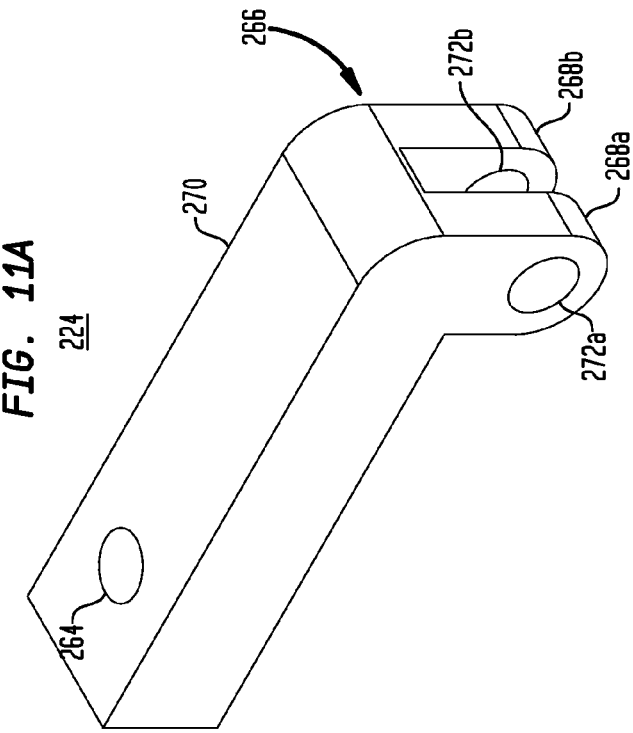
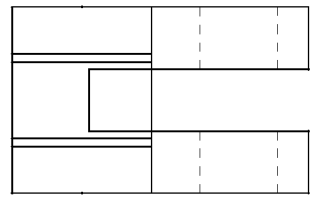
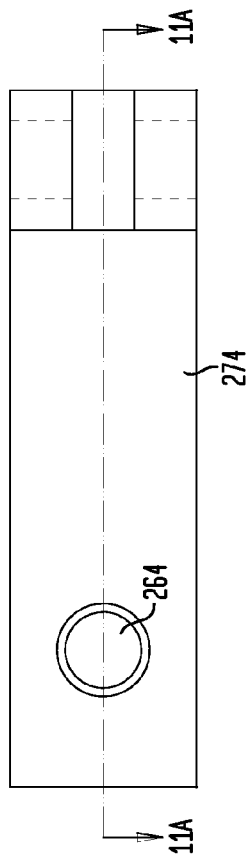
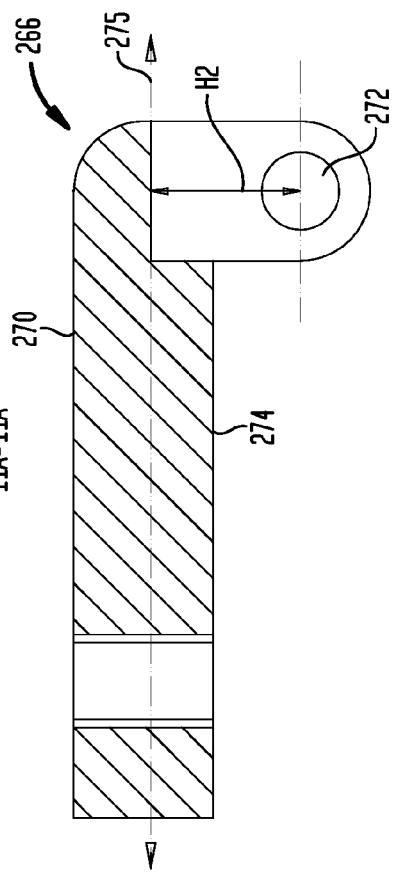

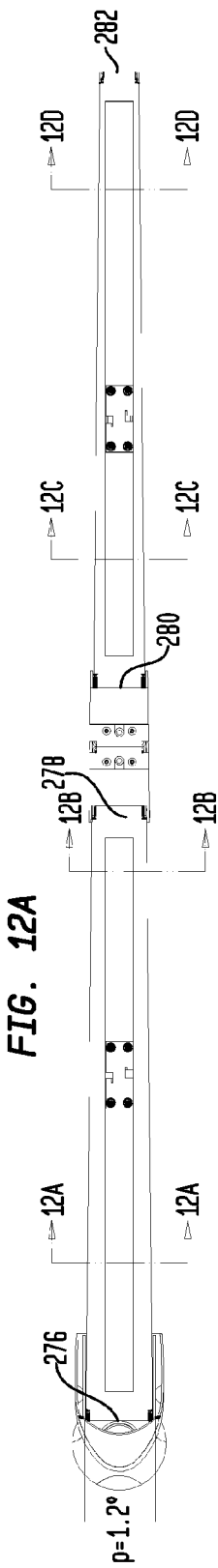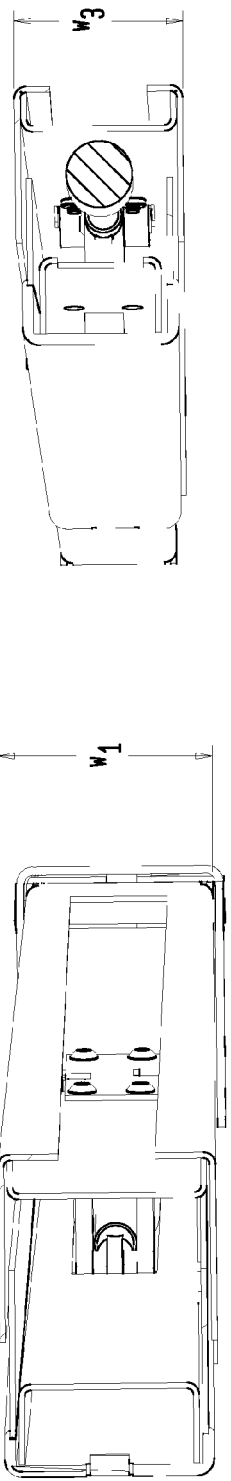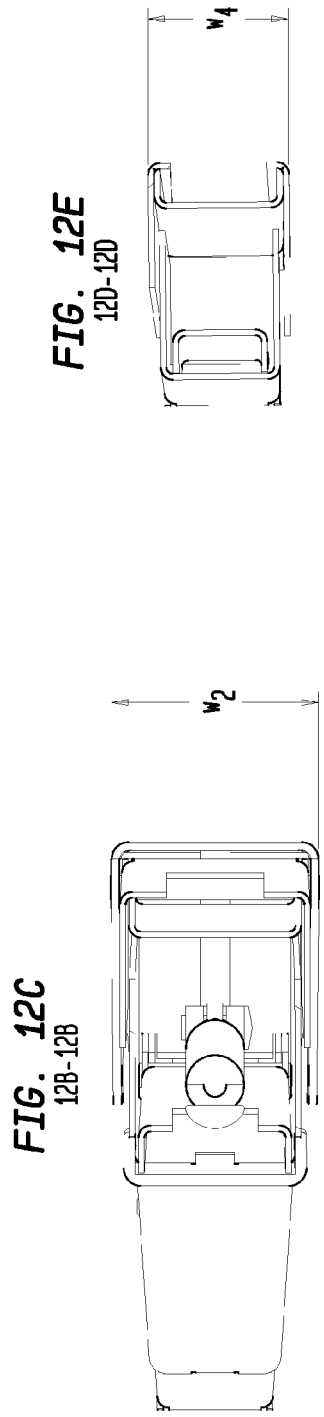
FIG. 12A
FIG. 12B
12A-12A
FIG. 12C
12B-12B
FIG. 12D
12C-12C
FIG. 12E
12D-12D

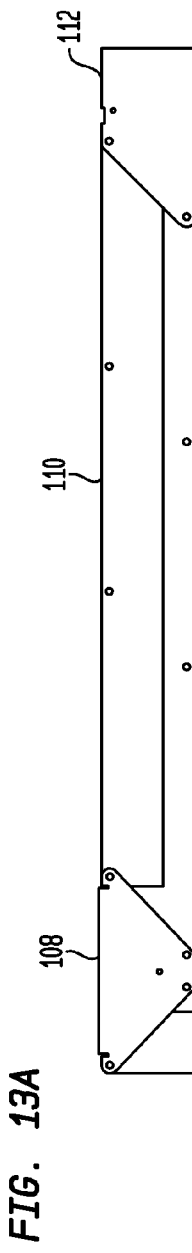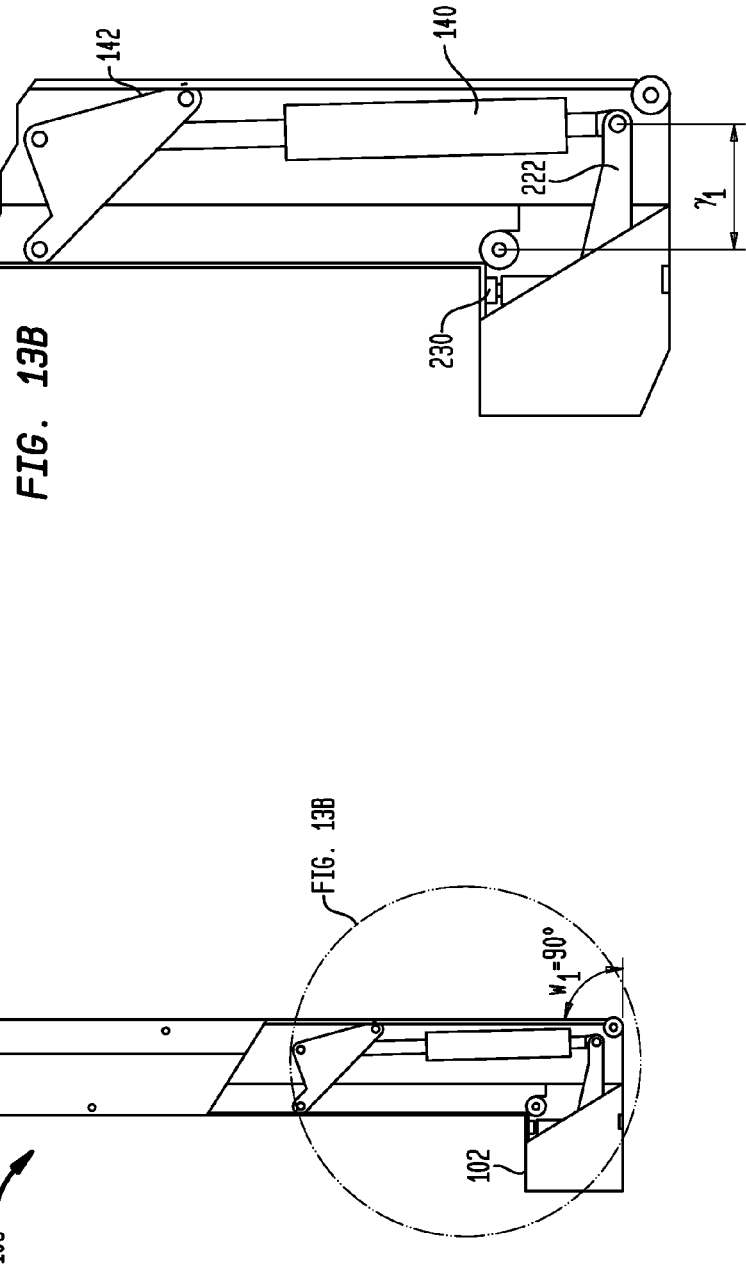

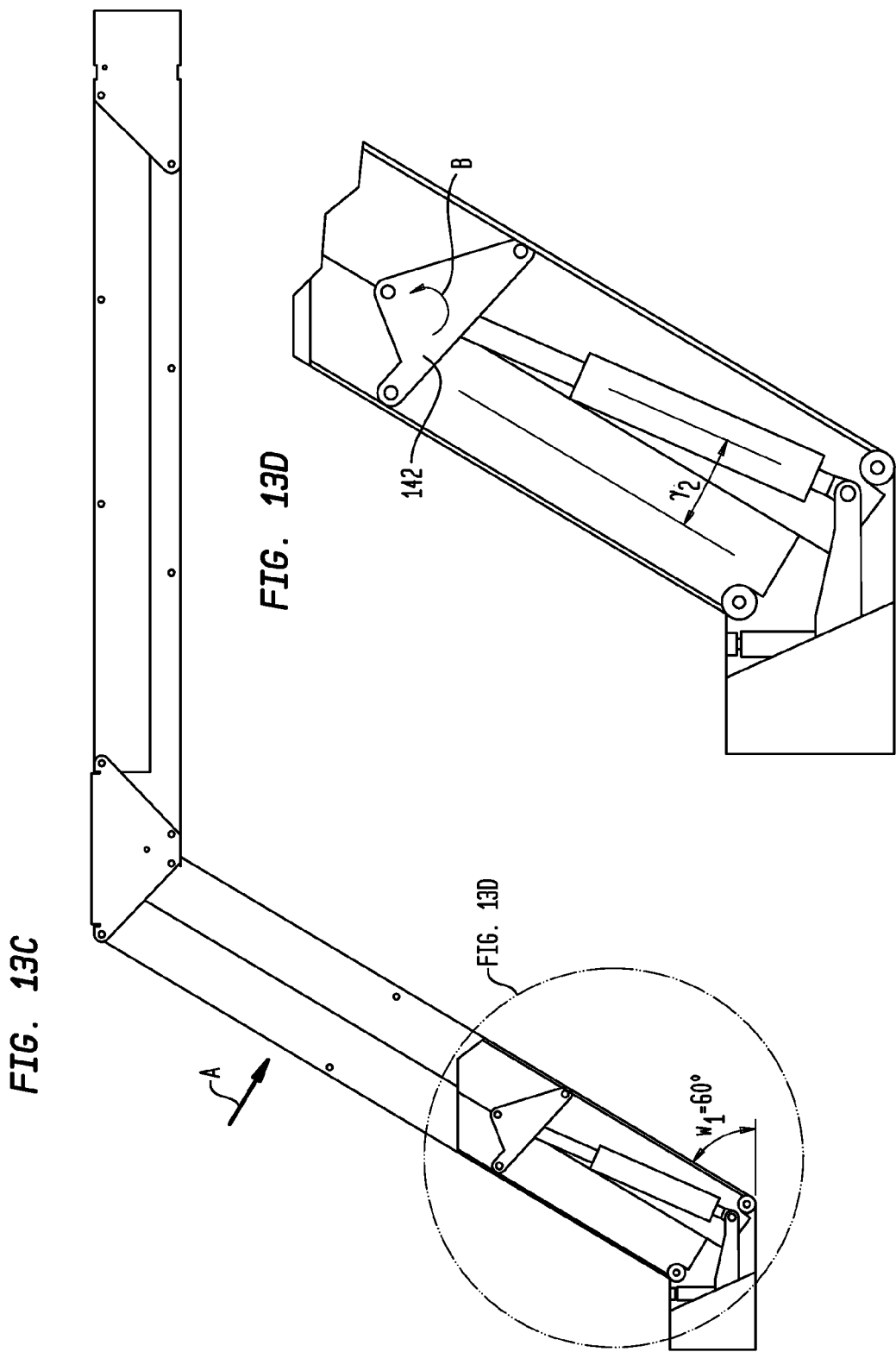

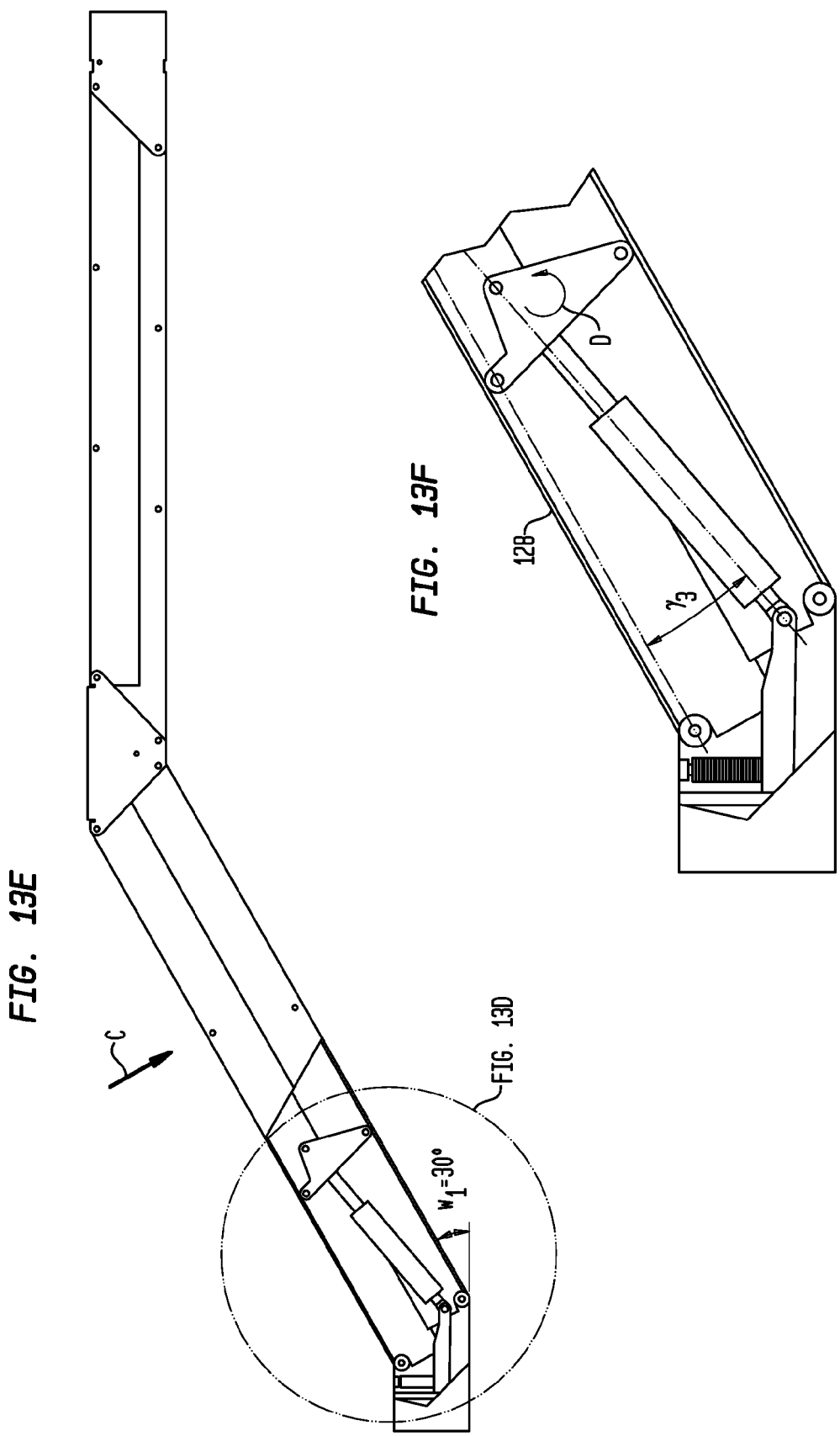

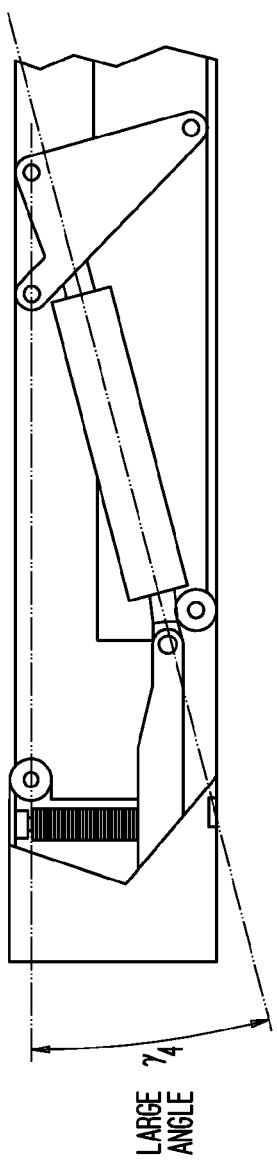
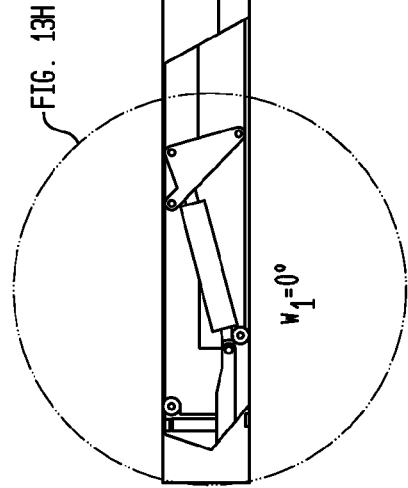
FIG. 13G
FIG. 13H

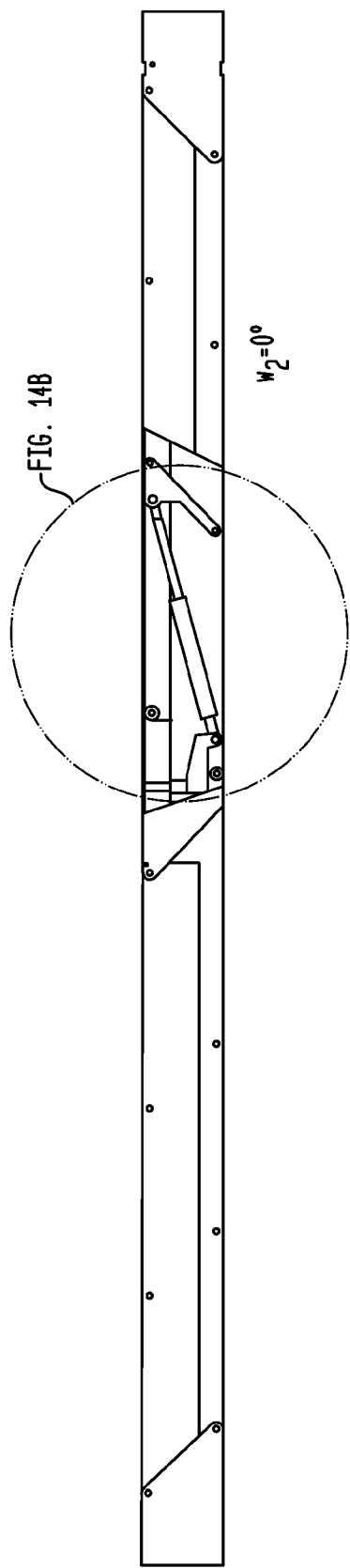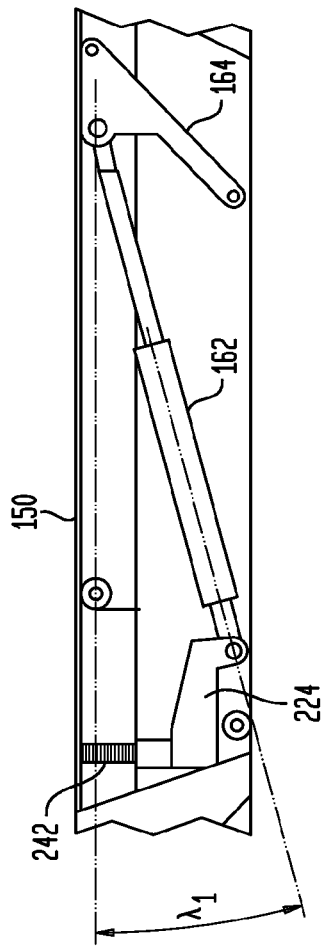

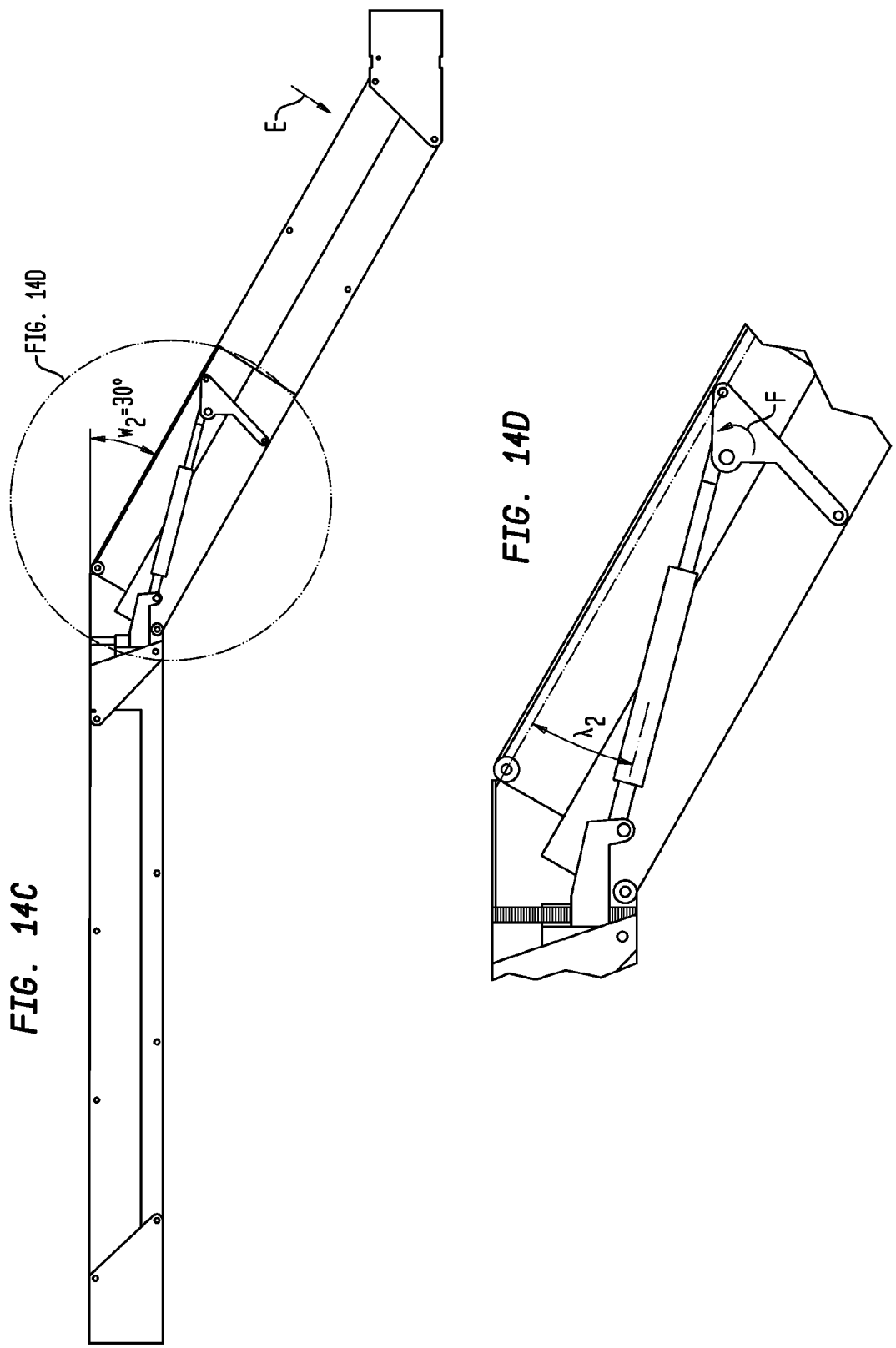

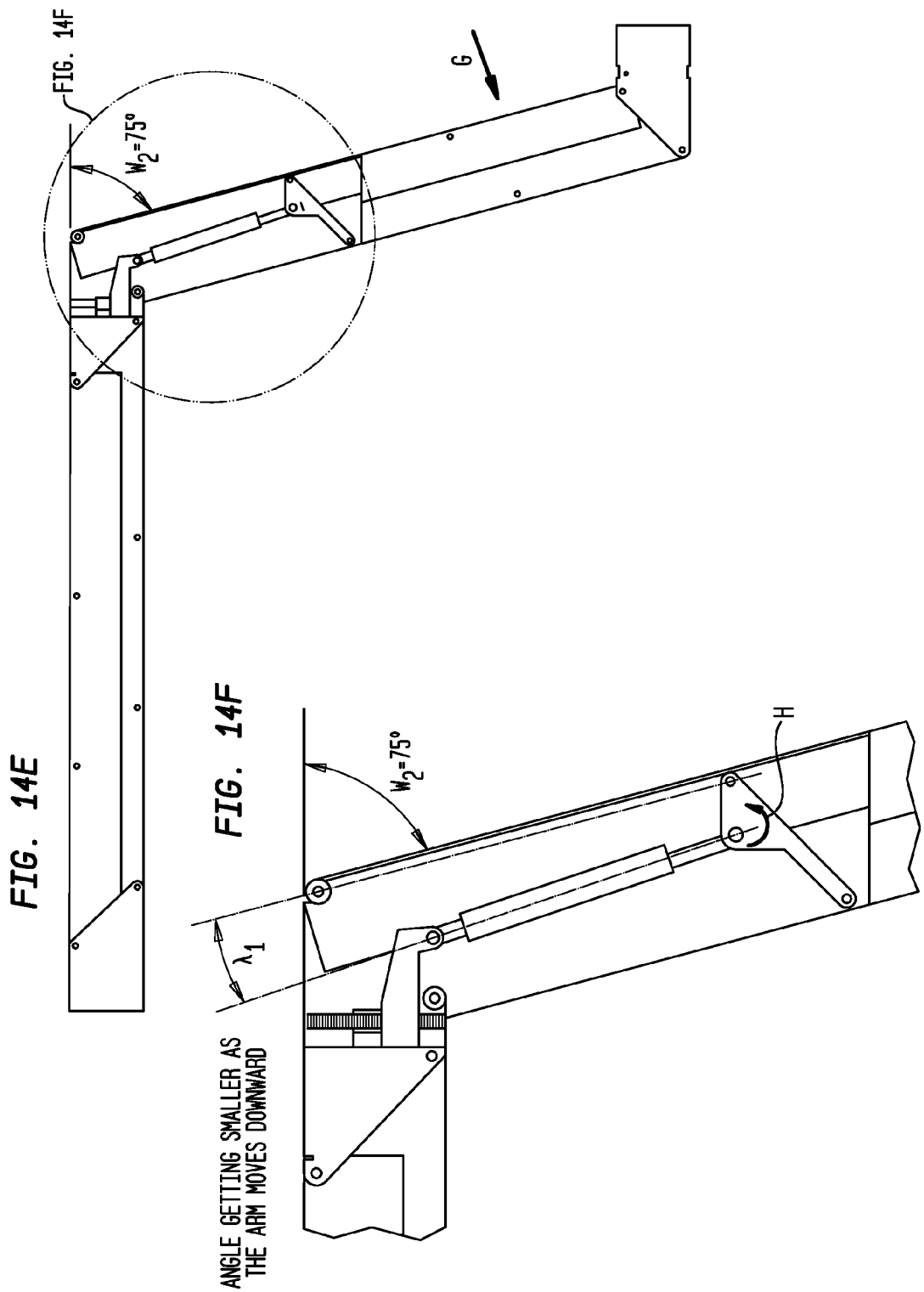

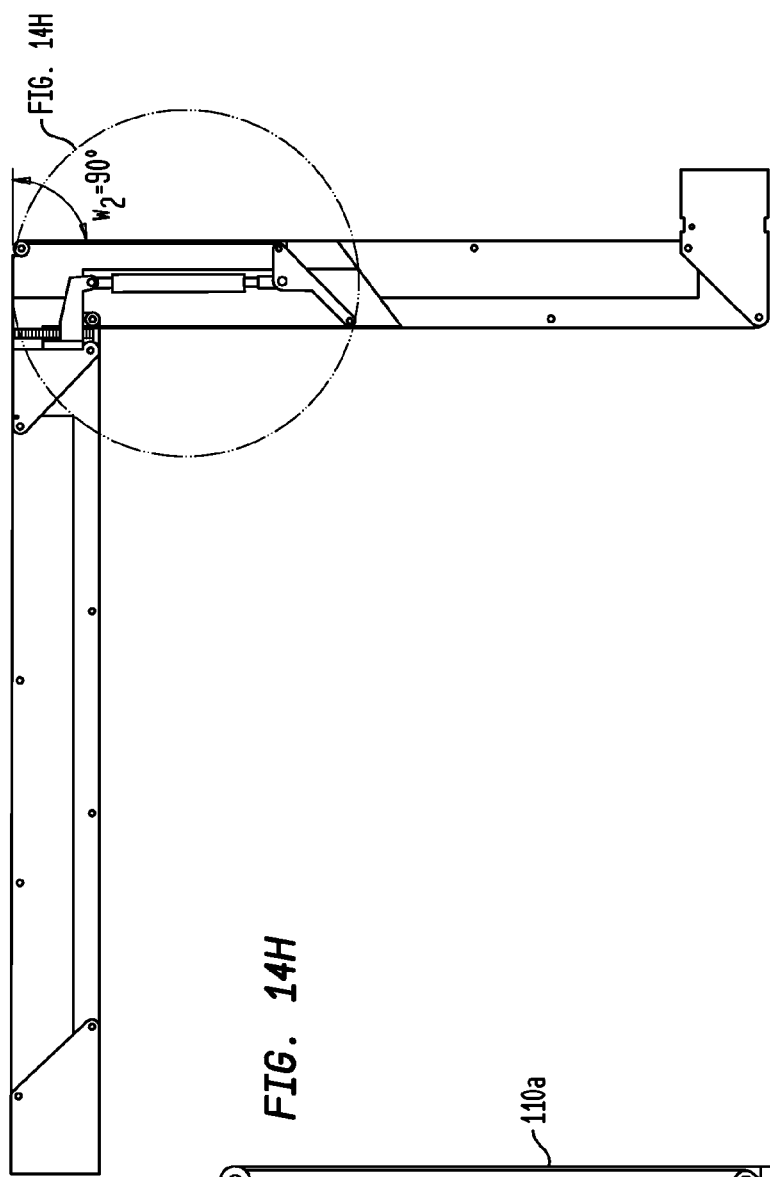
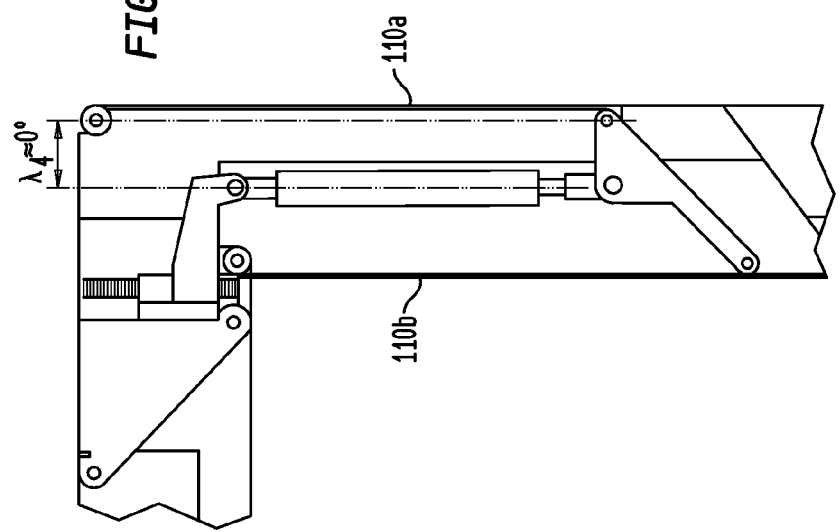

VERY SMALL ANGLE FOR MINIMUM CAPACITY

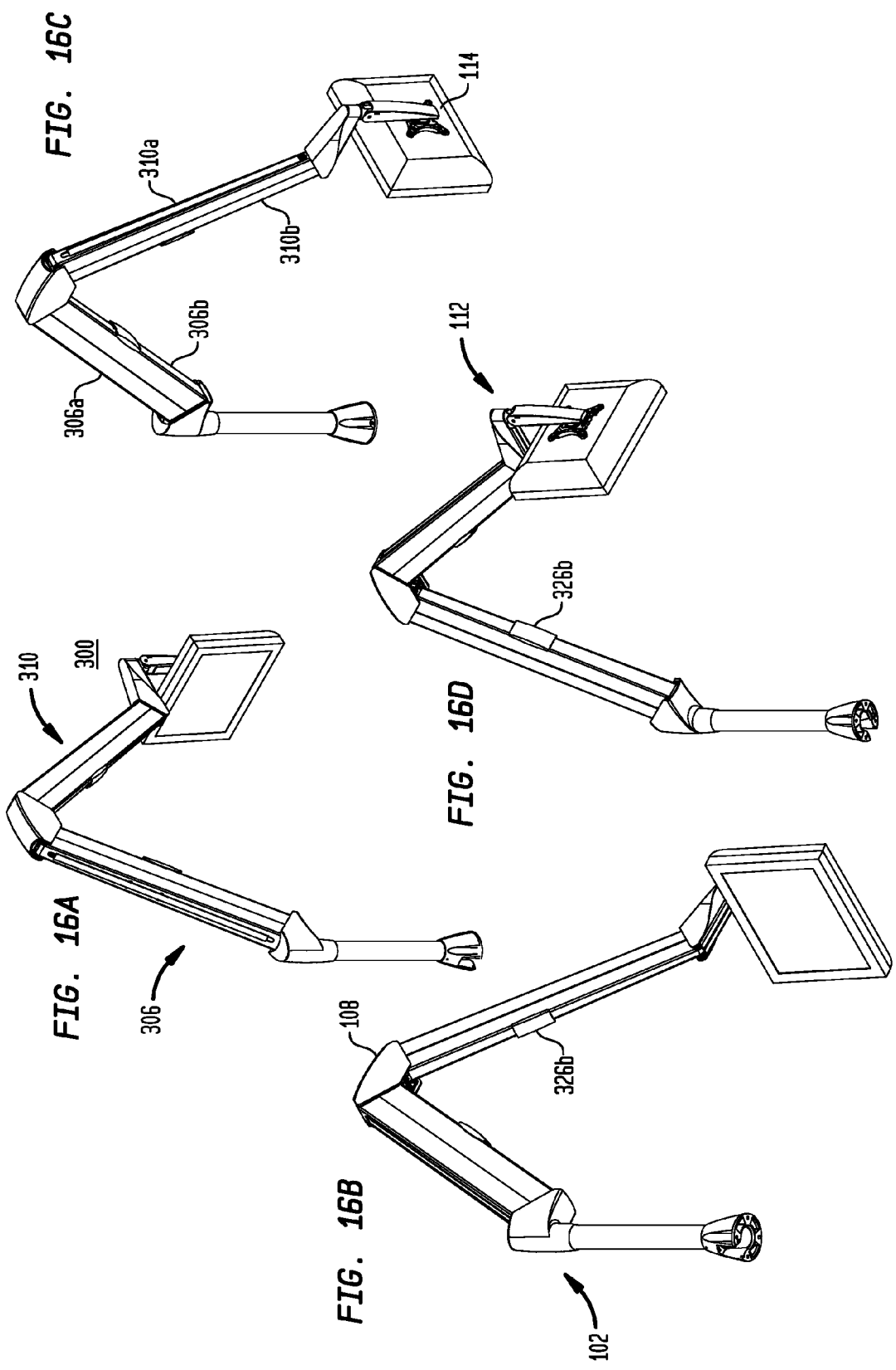

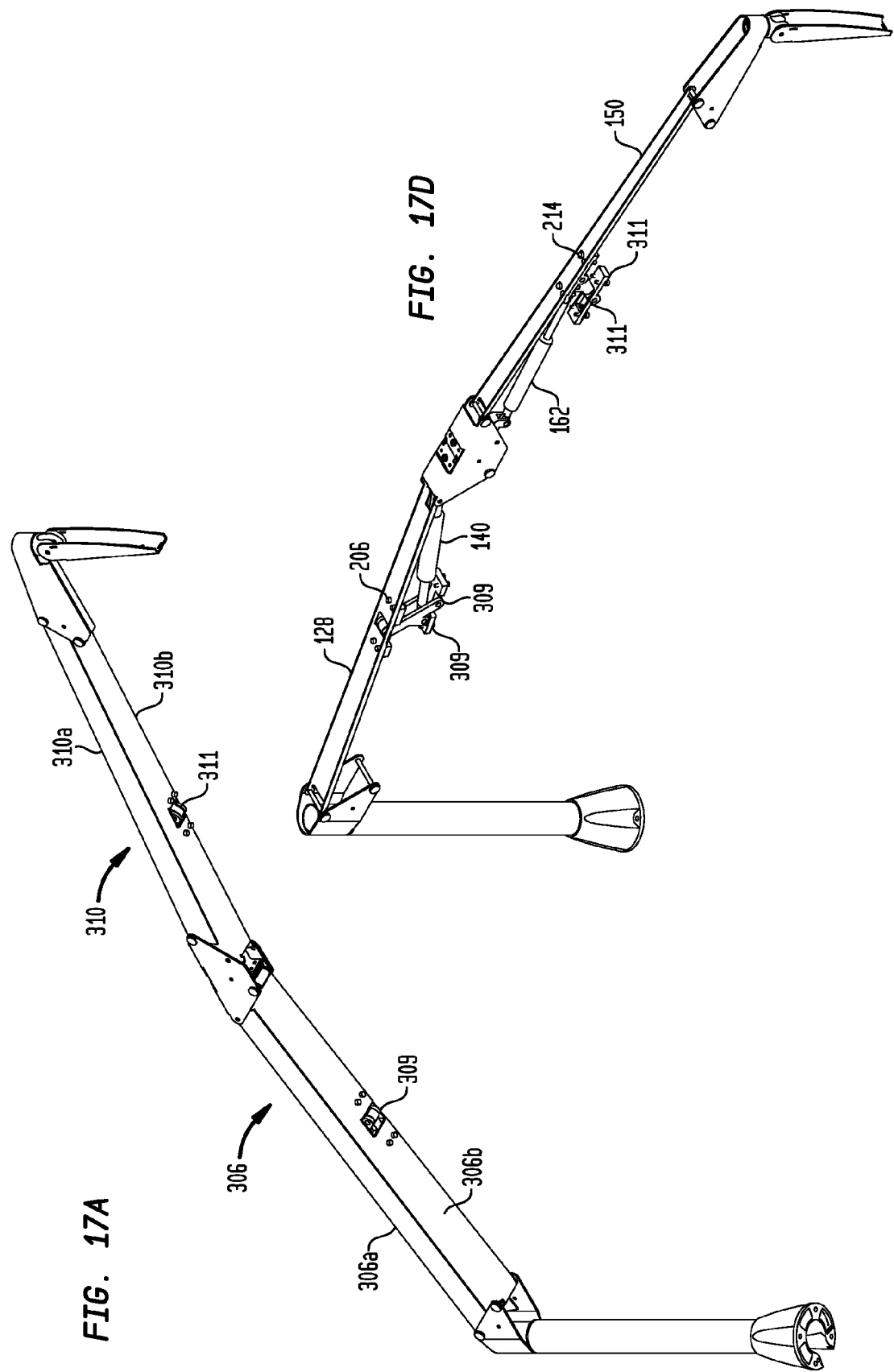

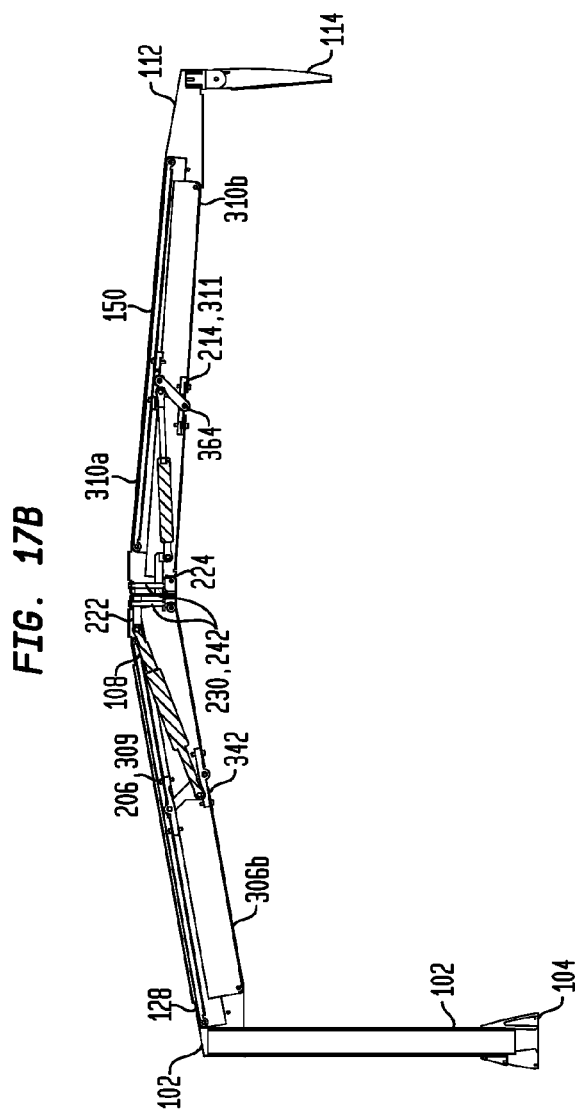
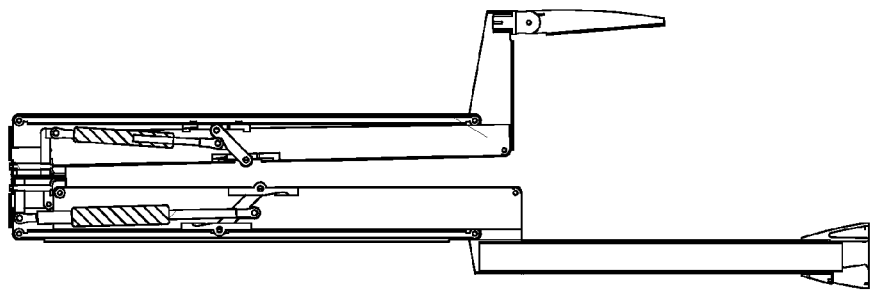
FIG. 17B
FIG. 17C

FIG. 18B
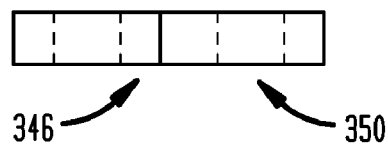
FIG. 18A  FIG. 18C
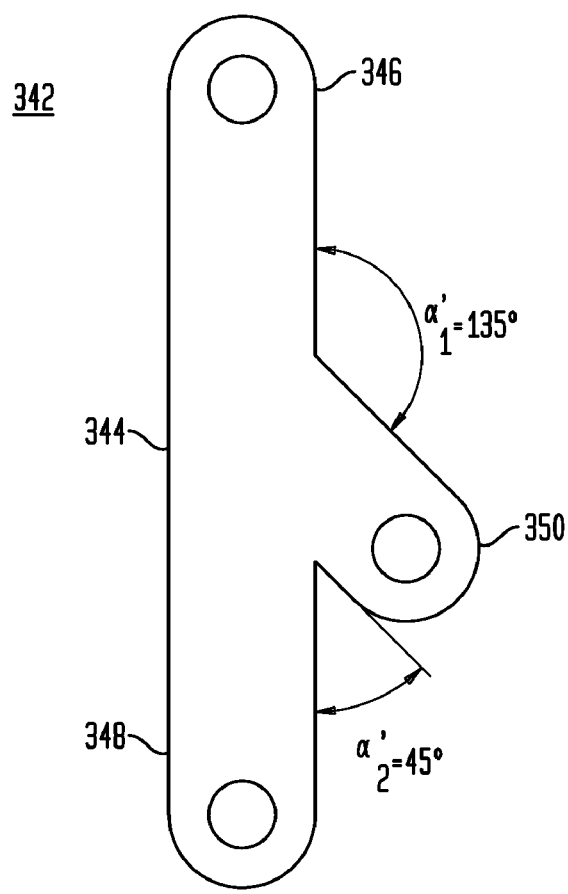 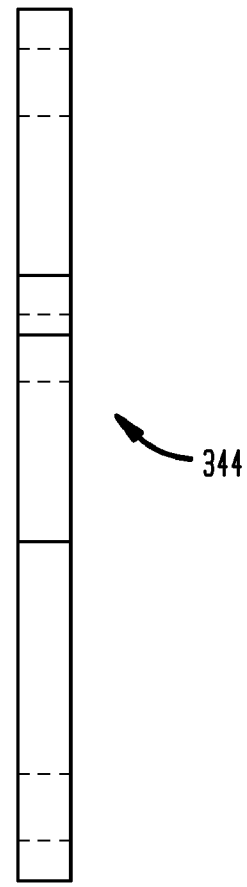

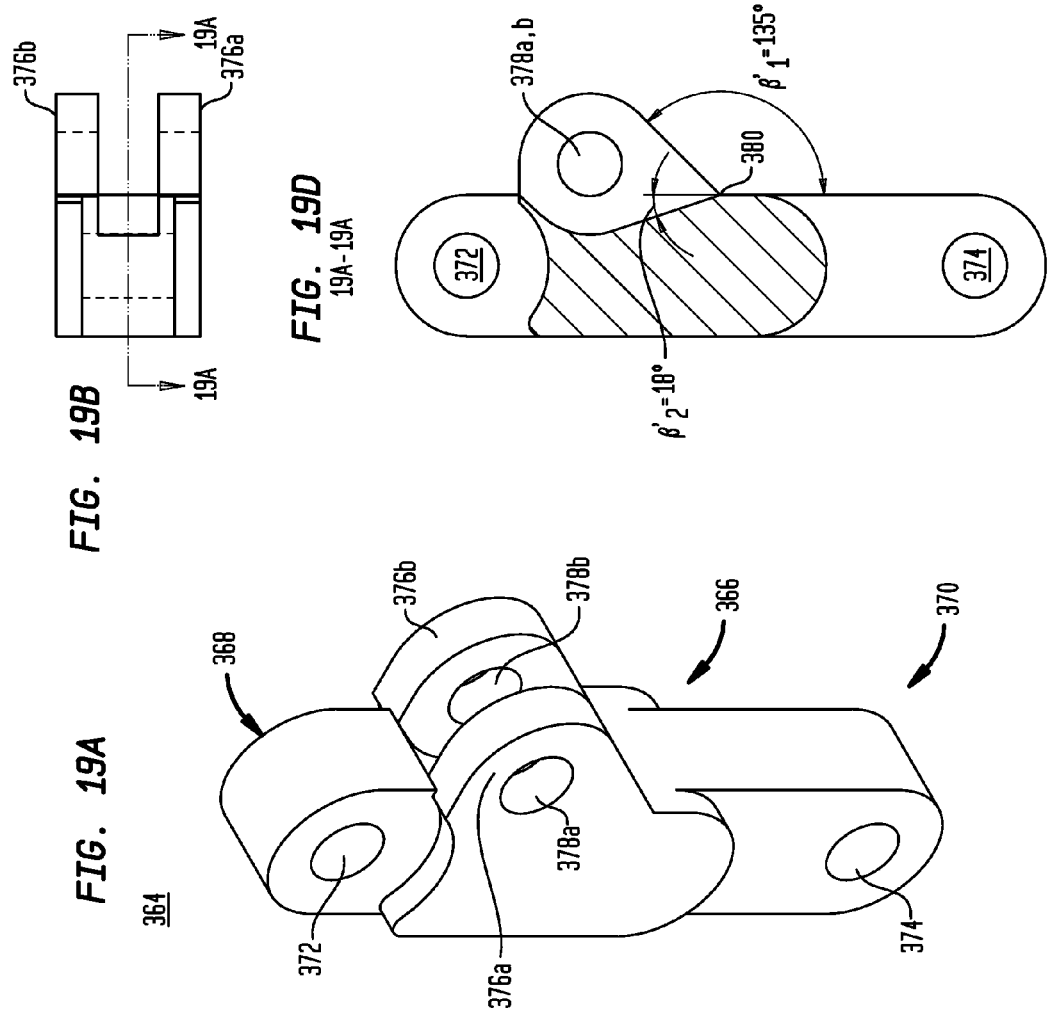

20A-20A 20B-20B 20C-20C 20D-20D

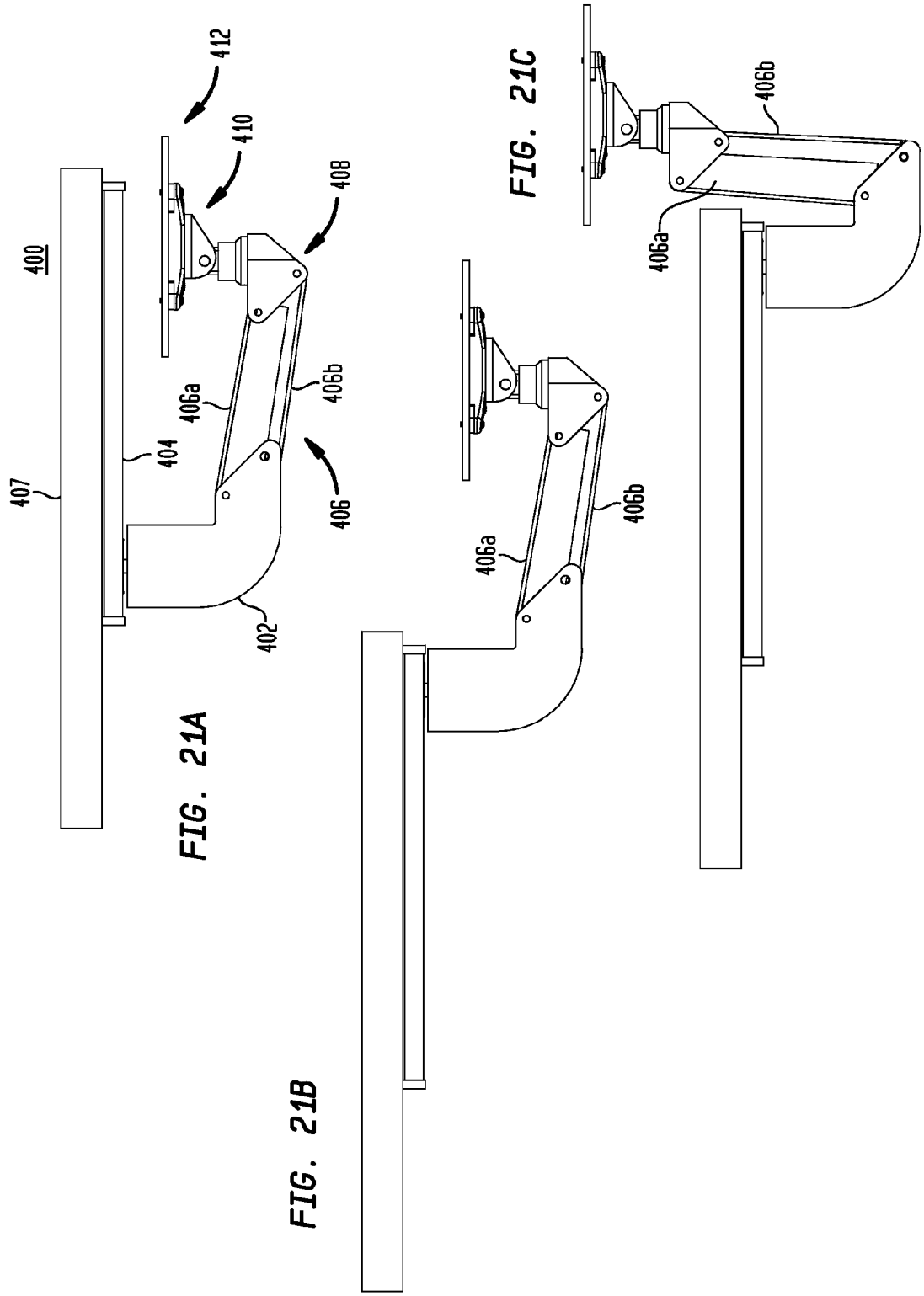

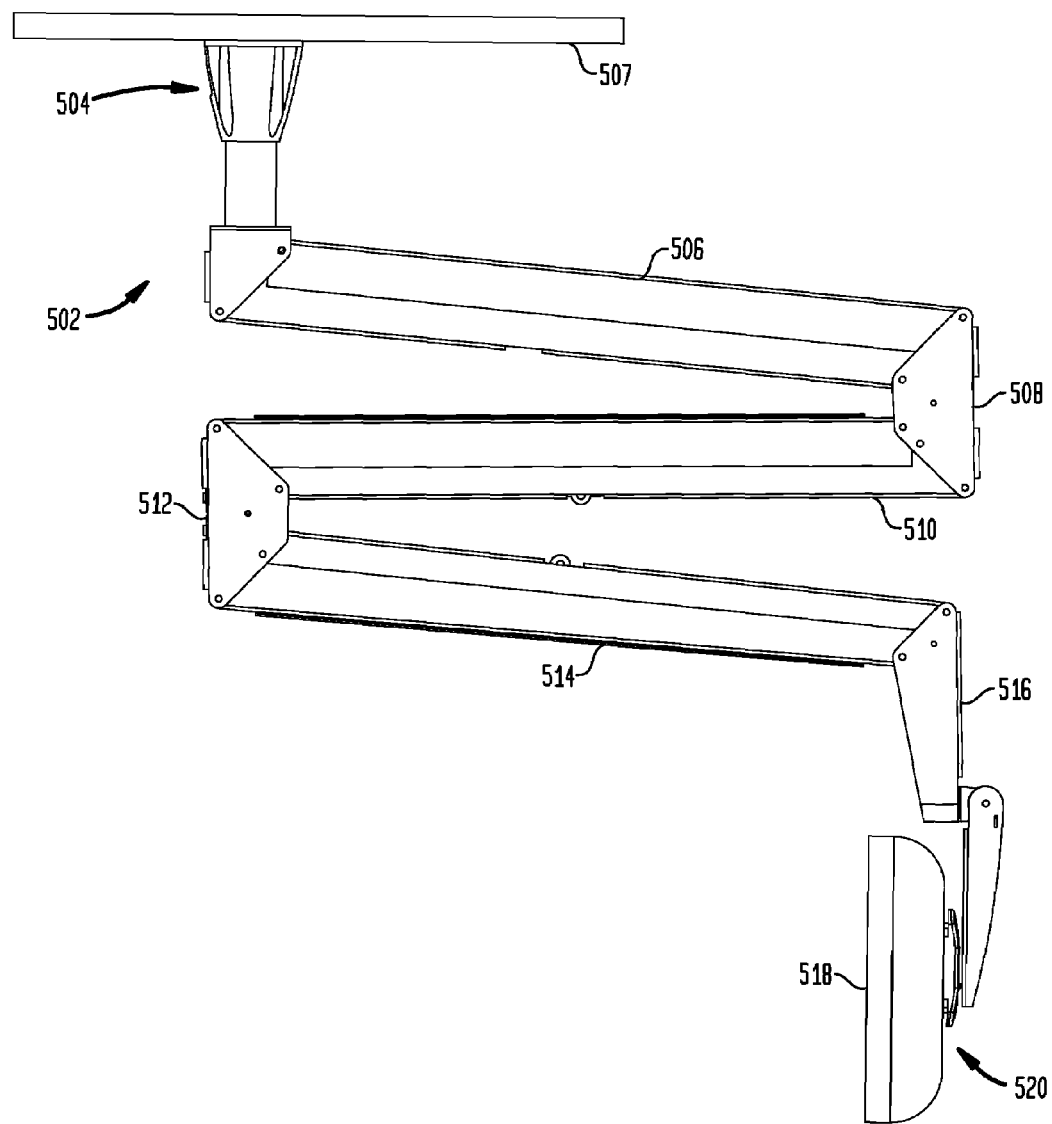

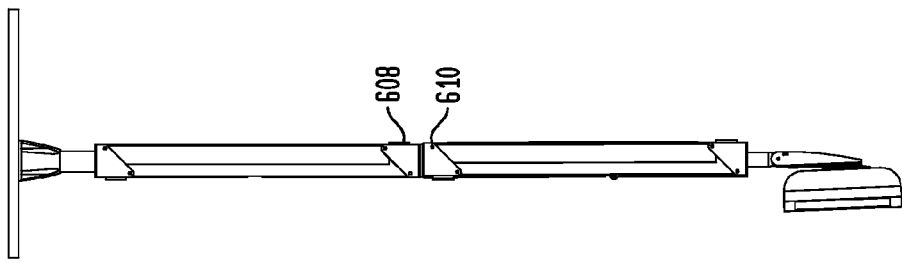
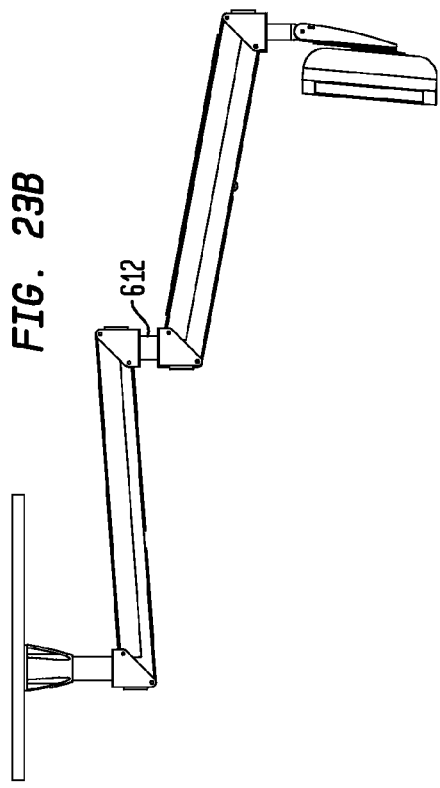
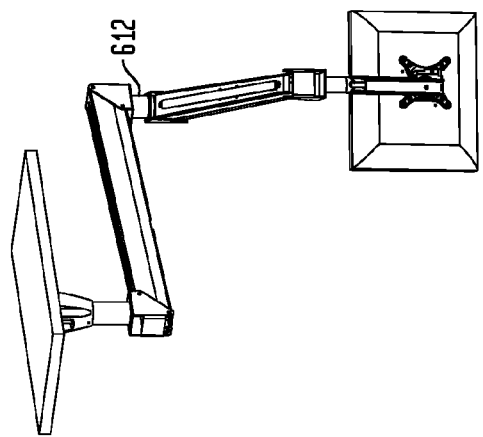
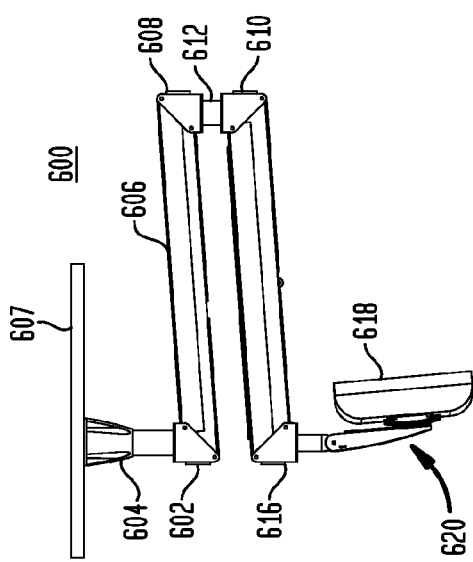

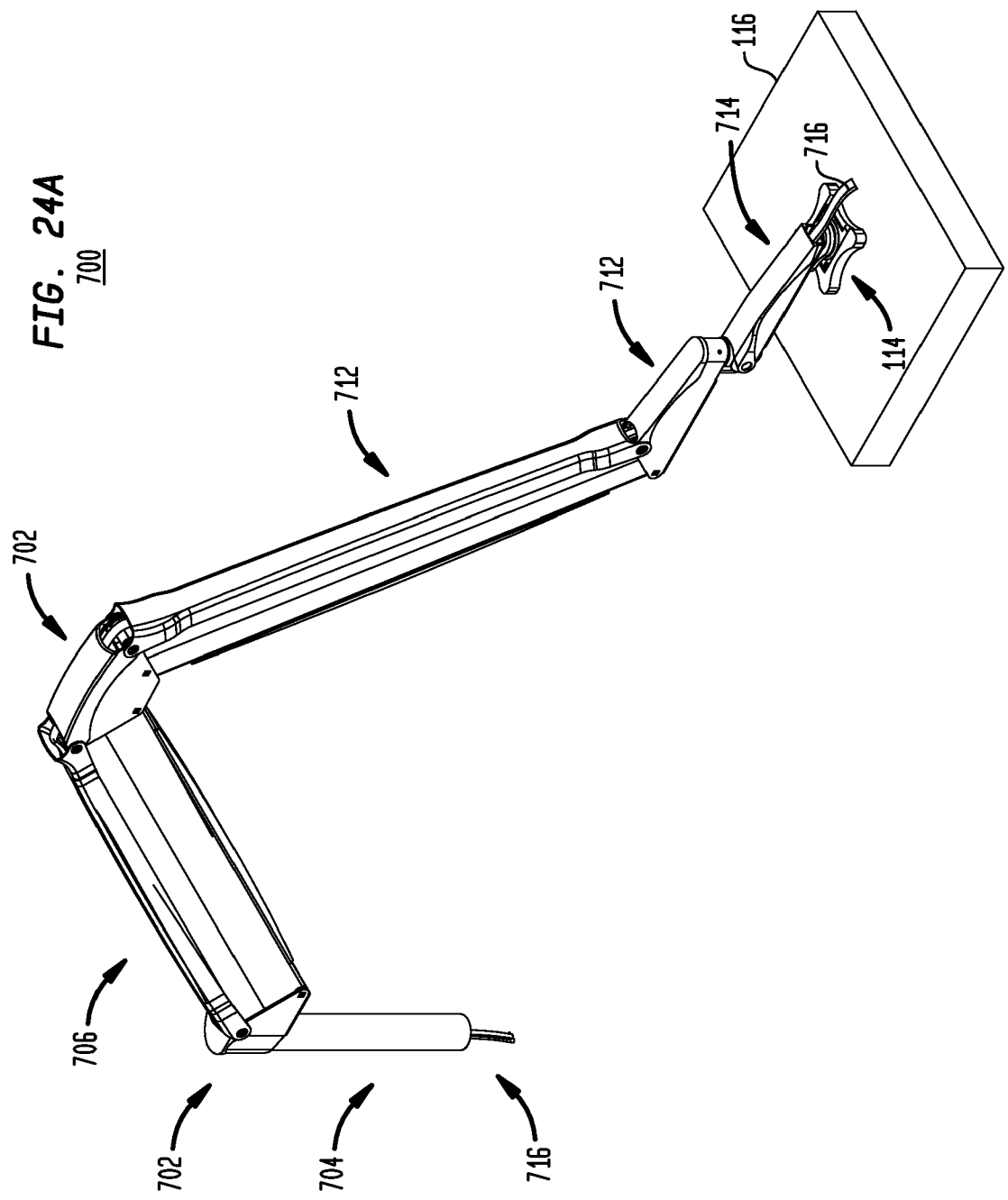

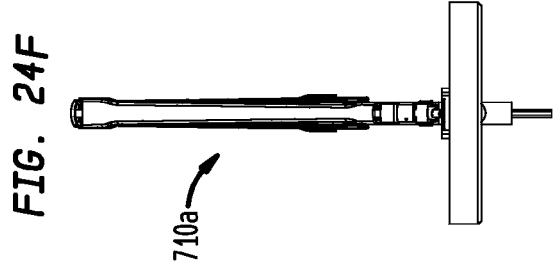
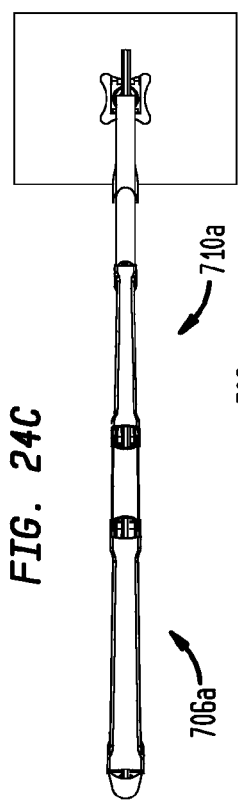
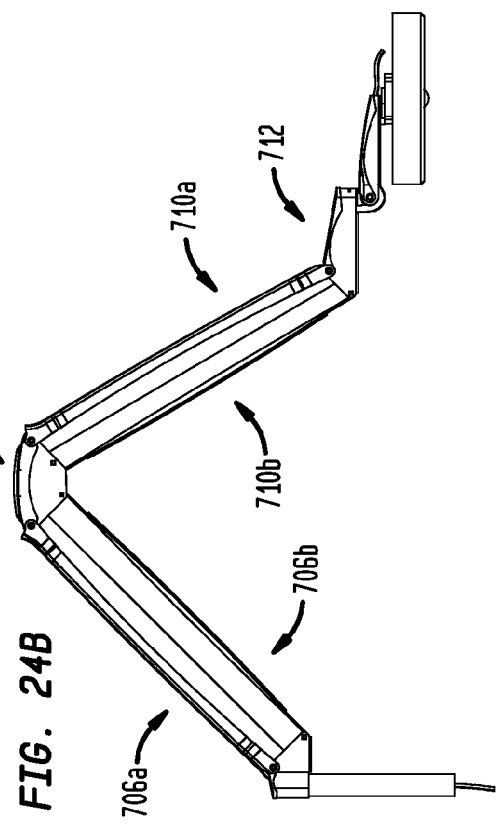
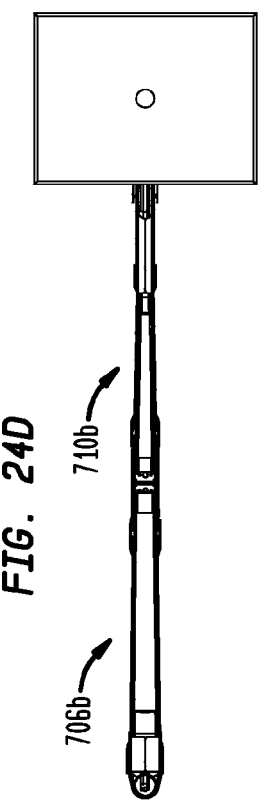
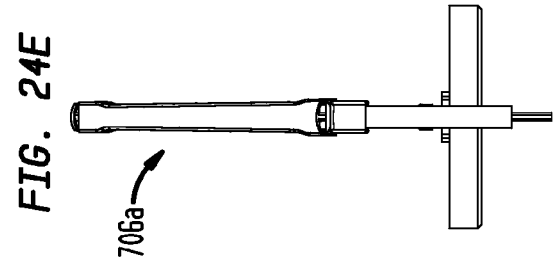

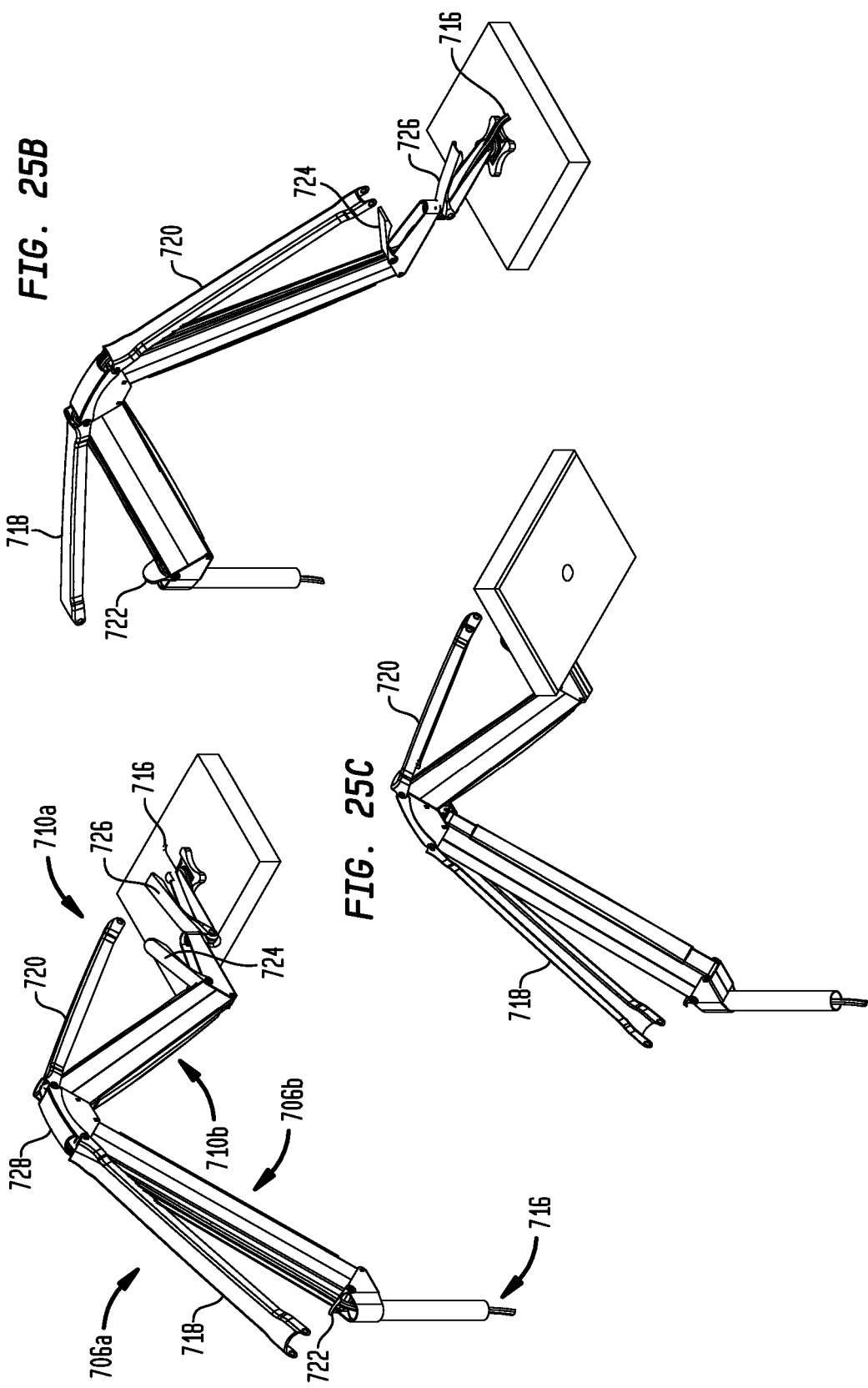

EXTENSION ARM WITH MOVING CLEVIS AND CABLE MANAGEMENT

CROSS-REFERENCE TO RELATED APPLICATIONS

The present application is a continuation-in-part of U.S. patent application Ser. No. 11/544,076, entitled "Extension Arm with Moving Clevis, filed Oct. 6, 2006, is a continuation-in-part of U.S. Design patent application Ser. No. 29/266,148, entitled "Boom Extension Arm," filed Sep. 15, 2006, and is a continuation-in-part of U.S. Design patent application Ser. No. 29/267,176, entitled "Boom Extension Arm," filed Oct. 6, 2006, the entire disclosures of which are hereby expressly incorporated by reference herein. The present application is related to U.S. Design patent application Ser. No. 29/288,254, entitled "Boom Extension Arm with Cable Management," filed concurrently herewith, the entire disclosure of which is hereby expressly incorporated by reference herein.

BACKGROUND OF THE INVENTION

The present invention relates to adjustable extension arm apparatuses for use with electronic devices. More particularly, the present invention relates extension arm assemblies that provide precision long or short range positioning and adjustment of electronic devices such as flat panel displays, keyboards, test equipment and other user devices.

It is often desirable to position user devices or equipment such as video displays, keyboards, mouse-type devices, etc. about a workspace or other location to give maximum comfort and ease of use to the user. For instance, such equipment can be placed on desks, tabletops, or upon other equipment such as personal computers or workstations.

One drawback to these configurations is the reduction in available workspace taken up by the equipment. Another drawback is the inability to place the equipment in a desired location. A further drawback is the potential for eye strain, neck strain and/or a cumulative trauma disorder such as carpel tunnel syndrome from poor placement of devices such as monitors and keyboards.

Different solutions have been provided in order to overcome these obstacles. For example, in one solution, a monitor stand or printer stand elevates the apparatus over other equipment on a desk. While this may free up workspace, it often places the equipment in an undesirable location or fixed position. Another solution employs a mechanical extension arm to support the monitor. Extension arms free up workspace and allow users to place the equipment where it is wanted. One such extension arm is shown and described in U.S. Pat. No. 6,478,274, entitled "Arm Apparatus for Mounting Electronic Devices," which is fully incorporated by reference herein. Another type of extension arm is shown and described in U.S. Pat. No. 6,409,134, entitled "Arm Apparatus for Mounting Electronic Devices with Cable Management System," which is fully incorporated by reference herein.

The extension arms of the aforementioned patents are particularly beneficial when positioning and/or adjusting user equipment in a work environment. The user is able to quickly and efficiently position a video display terminal or other equipment while he or she is situated at a desk or lab table, for example.

However, there are many other situations where it is also beneficial to be able to adjustably position a user device. For instance, in a hospital or clinic setting, the user may be a patient lying in a bed or a clinician inputting patient information or conducting tests on the patient. In these such cases, the user device may need to be positioned in one location for use, but the supporting device that holds the user device may be based quite remotely from this location.

In this case, a boom-type extension arm assembly may be used to provide the long range necessary to appropriately position the user device. Unfortunately, many boom-type extension arms must be configured to handle a specific user device of a known weight. For instance, such extension arms may use coiled springs having a fixed spring constant. The coiled springs may be chosen to handle the specific user device's weight. In this case, adjustment of such assemblies can difficult, and it may not be possible to swap between different user devices.

Another problem is that it may be difficult for such coiled spring assemblies to handle the load of the user device as the assembly moves through a range of positions. For instance, the assembly may move between a vertical position and a horizontal position. These two positions can place radically different load requirements on the coiled spring assembly. Thus careful engineering is important to prevent the assembly from snapping from the vertical position to the horizontal position, or vice versa. A further problem is how to run one or more cables through an extension arm while ensuring proper fit without kinking or other damage to the cable(s). Therefore, new extension arm assemblies which overcome these and other problems are desired.

SUMMARY OF THE INVENTION

In accordance with an embodiment of the present invention, an adjustable support apparatus for supporting a user device is provided. The apparatus comprises a first cap, a second cap, and an arm member. The first cap has a first section and a second section, the first section being adapted for engagement with a support surface. The second cap has a first section and a second section, the first section being adapted for engagement with the user device. The arm member has first and second ends. The first end is coupled to the second section of the first cap. The second end is coupled to the second section of the second cap. The arm member is operable to receive an extension and retraction device therein for providing a force for supporting the user device. The arm member includes a variable force clevis connected to the extension and retraction device. The variable force clevis is operable to vary the force provided by the extension and retraction member as the arm member is adjusted between selected positions.

In one alternative, the arm member includes a pair of channel members operable to move relative to one another as the position of the arm member is changed. Here, the variable force clevis is coupled at a first end to a first one of the channel members and at a second end to a second one of the channel members. The variable force clevis is operable to rotate within the arm member as the pair of channel members move relative to one another, thereby varying the force provided by the extension and retraction member.

In an example, at least one of the first and second channel members includes a channel stiffening member for supporting the weight of the apparatus and the user device. In this case, the variable force clevis is coupled to the channel stiffening member.

In another example, the adjustable support apparatus further comprises an adjustable clevis having a first side and a second side. Here, the variable force clevis is connected to a first end of the extension and retraction device and the first side of the adjustable clevis is connected to a second end of the extension and retraction device. In one alterative, the second side of the adjustable clevis is coupled to the first cap. In another alternative, the second side of the adjustable clevis is coupled to the second cap.

In a further example, the arm member is a first arm member and the variable force clevis is a first variable force clevis. Preferably, the apparatus further comprises a middle cap and a second arm member. The middle cap is disposed between the first and second caps. The middle cap has a first side and a second side. The first side is connected to the second end of the first arm member. The second arm member has first and second ends, with the first end thereof being connected to the second side of the middle cap and the second end thereof being connected to the second section of the second cap. The second arm member is operable to receive a second extension and retraction device therein for providing a force for supporting the user device. The second arm member includes a second variable force clevis connected to the second extension and retraction member. The second variable force clevis is operable to vary the force provided by the second extension and retraction device as the second arm member is adjusted between selected positions.

In accordance with another embodiment of the present invention, an adjustable support apparatus for supporting a user device comprises first and second endcaps, a middle cap, first and second arm members, and first and second extension/retraction members. The first endcap has a first section and a second section, with the first section being adapted for engagement with a support surface. The second endcap has a first section and a second section, with the first section being adapted for engagement with the user device. The middle cap is disposed between the first and second endcaps, with the middle cap having a first side and a second side. The first arm member has a first end coupled to the second section of the first endcap and a second end coupled to the first side of the middle cap. The second arm member has a first end coupled to the second side of the middle cap and a second end coupled to the second section of the second endcap. The first extension and retraction device is coupled to the first arm member for providing a first force for supporting the user device. The second extension and retraction device coupled to the second arm member for providing a second force for supporting the user device. The apparatus also includes a first variable force means for dynamically varying the force provided by the first extension and retraction device upon movement of the first arm member, as well as a second variable force means for dynamically varying the force provided by the second extension and retraction device upon movement of the second arm member.

In accordance with yet another embodiment of the present invention, an adjustable support apparatus is provided. The apparatus comprises first and second endcaps, first and second arm member, a middle cap, and first and second variable force clevises. The first endcap has a first section and a second section, with the first section being adapted for engagement with a support surface. The second endcap has a first section and a second section, with the first section being adapted for engagement with the user device. The middle cap is disposed between the first and second endcaps, with the middle cap having a first side and a second side. The first arm member has a first end coupled to the second section of the first endcap and a second end coupled to the first side of the middle cap. The second arm member has a first end coupled to the second side of the middle cap and a second end coupled to the second section of the second endcap. The first variable force clevis is coupled to the first arm member and to a first extension and retraction device therein for dynamically varying a balancing force provided by the first extension and retraction device. And the second variable force clevis is coupled to the second arm member and to a second extension and retraction device therein for dynamically varying a balancing force provided by the second extension and retraction device.

In one alternative, the first arm member includes a pair of channel members operable to move relative to one another as the first arm member's position changes, and the second arm member includes a pair of channel members operable to move relative to one another as the second arm member's position changes. The arm members' positions may change, for instance, when a user moves the attached user device to a desired location. The first variable force clevis has a first end coupled to a first one of the channel members of the first arm member, and a second end coupled to a second one of the channel members of the first arm member. Here, the first variable force clevis is operable to rotate within the first arm member as the first and second channel members thereof move relative to one another. Similarly, the second variable force clevis has a first end coupled to a first one of the channel members of the second arm member and a second end coupled to a second one of the channel members of the second arm member. The second variable force clevis is operable to rotate within the second arm member as the first and second channel members thereof move relative to one another.

Preferably, one of the first and second variable force clevises includes a body member having a pair of arm members thereon. Here, a respective one of the extension and retraction devices (e.g., the first extension/retraction device when it is the first variable force clevis) has a first end coupled to the pair of arm members. The pair of arm members are desirably disposed relative to a longitudinal portion of the respective variable force clevis at an angle of between 115° and 150°.

In another alternative, one of the first and second variable force clevises comprises a pair of clevises with the pair of clevises each having an arm member thereon. Here, a respective one of the extension and retraction devices (e.g., the second extension/retraction device when it is the second variable force clevis) has a first end coupled to the arm members of the pair of clevises.

In a further alternative, the first channel member of the first arm member includes a first channel stiffening member for supporting the first arm member and the weight of the user device. The first channel member of the second arm member includes a second channel stiffening member for supporting the second arm member and the weight of the user device.

In another example, the apparatus further comprises a first adjustable clevis coupling the first extension and retraction device to one of the first endcap and the middle cap and a second adjustable clevis coupling the second extension and retraction device to one of the second endcap and the middle cap.

In one alternative, the first adjustable clevis couples the first extension and retraction device to the middle cap, and the second adjustable clevis couples the second extension and retraction device to the middle cap.

In another alternative, one of the first and second adjustable clevises is a straight clevis and the other one of the first and second adjustable clevises is a bent clevis. In this case, the middle cap may include pair of access points for adjusting the first and second clevises. Here, the bent clevis is preferably bent in a direction away from the access point, e.g., bent downward if the access points are on top of the middle cap.

In yet another example, the first and second endcaps, the middle cap and the first and second arm members provide cable management therein for cables of the user device.

In accordance with another embodiment of the present invention, an adjustable support apparatus for supporting a user device comprising a first cap having a first section, a second section and a cover disposed between the first and second sections, the first section being adapted for engagement with a support surface and the cover being adapted for providing immediate access to a cable of the user device; a second cap having a first section, a second section and a cover disposed between the first and second sections, the first section being adapted for engagement with the user device and the cover being adapted for providing immediate access to the cable of the user device; a first arm member having first and second ends and a cover disposed between the first and second ends for providing immediate access to the user device cable, the first end of the first arm member being coupled to the second section of the first cap, the second end of the first arm member being coupled to the second section of the second cap, and the first arm member being operable to receive an extension and retraction device therein for providing a force for supporting the user device; a middle cap disposed between the first and second caps, the middle cap having a first side, a second side and a cover coupled to the first and second sides thereof for providing access to the user device cable, the first side of the middle cap being connected to the second end of the first arm member; and a second arm member having first and second ends and a cover disposed between the first and second ends for providing immediate access to the user device cable, the first end of the second arm member being connected to the second side of the middle cap, the second end of the second arm member being connected to the second section of the second cap, and the second arm member being operable to receive a second extension and retraction device therein for providing a force for supporting the user device. One of the first and second arm members include a variable force clevis connected to a respective one of the extension and retraction devices, the variable force clevis being operable to vary the force provided by the respective extension and retraction device as the respective one of the first and second arm members is adjusted between selected positions.

In one example, the first arm member cover is removably coupled to the first arm member, the second arm member cover is removably coupled to the second arm member, and the middle cap cover is removably coupled to middle cap so that the cable of the user device is receivable within the first arm member, the second arm member and the middle cap.

In this case, the first cap cover is preferably pivotally connected to a surface of the first cap, the second cap cover is preferably pivotally connected to a surface of the second cap, and the first and second cap covers are preferably adapted to provide immediate access to the cable of the user device.

In another example, the adjustable support apparatus further comprises an extension member having first and second ends, the first end thereof being coupled to the first section of the second cap and the second end thereof being adapted for engagement with the user device. In this case, the extension member preferably includes a cover disposed on a first surface thereof for providing immediate access to the cable of the user device. Desirably, the cover is pivotally coupled to the first surface of the extension member.

In another example, the middle cap preferably includes a first fastener disposed on the first side thereof and a second fastener disposed on the second side thereof, and a first side of the middle cap cover is removably connected to the first fastener and a second side of the middle cap cover is removably coupled to the second fastener. A first end of the first arm member cover is removably coupled to the first middle cap fastener and a first end of the second arm member cover is removably coupled to the second middle cap fastener.

In a further example, the first arm member includes an upper channel member and a lower channel member; the second arm member includes an upper channel member and a lower channel member; the first arm member cover is disposed along the upper channel member thereof; and the second arm member cover is disposed along the upper channel member thereof.

In yet another example, the user device cable is substantially received within the first and second caps, the first and second arm members and the middle cap during use of the user device.

BRIEF DESCRIPTION OF THE DRAWINGS

FIGS. 1A-H illustrate an extension arm assembly in accordance with aspects of the present invention.

FIGS. 2A-E illustrate components of the extension arm assembly of FIGS. 1A-H.

FIG. 3 illustrates portions of the extension arm assembly of FIGS. 1A-H.

FIGS. 4A-E illustrate a middle cap of the extension arm assembly of FIGS. 1A-H.

FIGS. 5A-C illustrate selected components of an extension arm assembly in accordance with aspects of the present invention.

FIGS. 6A-C illustrate enlarged views of components of FIGS. 5A-C.

FIGS. 8A-E illustrate a variable force clevis in accordance with aspects of the present invention.

FIGS. 9A-E illustrate another variable force clevis in accordance with aspects of the present invention.

FIGS. 11A-D illustrate another adjustable clevis in accordance with aspects of the present invention.

FIGS. 12A-E illustrate views of a tapered extension arm assembly in accordance with aspects of the present invention.

FIGS. 13A-H illustrate operation of an arm member of an extension arm assembly in accordance with aspects of the present invention.

FIGS. 14A-H illustrate operation of another arm member of an extension arm assembly in accordance with aspects of the present invention.

FIGS. 16A-I illustrate another extension arm assembly in accordance with aspects of the present invention.

FIGS. 17A-D illustrate selected components of the extension arm assembly of FIGS. 16A-I.

FIGS. 18A-C illustrate a variable force clevis in accordance with aspects of the present invention.

FIGS. 19A-D illustrate an alternative variable force clevis in accordance with aspects of the present invention.

FIGS. 21A-C illustrate an extension arm assembly in accordance with aspects of the present invention.

FIG. 22 illustrates another extension arm assembly in accordance with aspects of the present invention.

FIGS. 23A-D illustrate yet another extension arm assembly in accordance with aspects of the present invention.

FIGS. 24A-F illustrate a further extension arm assembly in accordance with aspects of the present invention.

FIGS. 25A-H illustrate partly assembled views of the extension arm of FIGS. 24A-F.

DETAILED DESCRIPTION

Figure 5B:
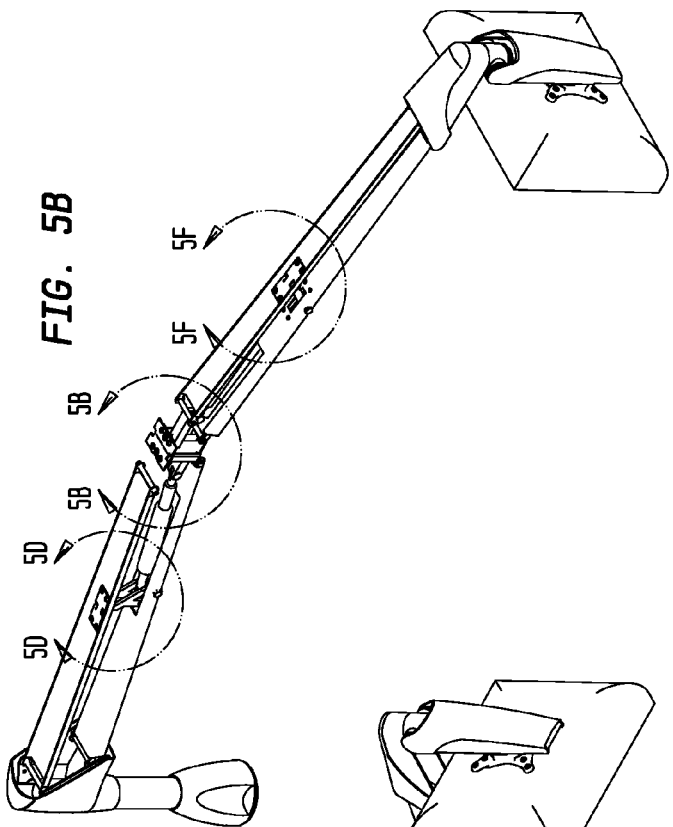

The aspects, features and advantages of the present invention will be appreciated when considered with reference to the following description of preferred embodiments and accompanying figures. In describing the preferred embodiments of the invention illustrated in the figures, specific terminology will be used for the sake of clarity. However, the invention is not intended to be limited to the specific terms so selected.

FIGS. 1A-H illustrate a preferred embodiment of an adjustable support apparatus such as extension arm assembly 100 in accordance with aspects of the present invention. As shown, the assembly 100 includes a first endcap 102 that connects at one end to a base member 104 and at the other end to a first arm member 106. The base member 104 may be separate from the first endcap 102 or may be part of the first endcap 102. The first arm member 106 is preferably connected to a middle cap 108 at a first side thereof. A second arm member 110 preferably connects to the other side of the middle cap 108. The second arm member 110 also connects to a second endcap 112.

While a user device such as a flat panel monitor 116 may be directly or indirectly coupled to the second endcap 112 or to other components of the assembly 100, a tilting device 114 is preferably used to couple the user device 116 to the second endcap 112. The tilting device 114 provides additional flexibility to position the user device 116 as desired.

The tilting device 114 may comprise components such as those shown and described in U.S. Pat. No. 6,505,988, entitled "Tilter for Positioning Electronic Devices," which is fully incorporated by reference herein. In particular, FIGS. 1-9 of the patent illustrate a tilter 10 including a support block 20 attached to a support block shaft 30, a center tilt mount 40 pivotally attached to the support block 20 by a support block bushing 50, a tilter roller shaft 60, and a set screw 12 for preventing rotation of the tilter 10. Alternative tilter devices which may be employed are shown and described in U.S. Patent Application Publication No. 2006/0181637, entitled "Quick Release Assembly for an Electronic Device," published on Aug. 17, 2006, which is fully incorporated by reference herein. In particular, applicants refer to FIGS. 3-11 and the accompanying description thereof in the patent application publication for a tilter assembly that includes a mechanism for quickly releasing the user's electronic device, such as a flat panel display, from a tilter device, which may be connected to an extension arm.

The base member 104 preferably includes a support section 118 and may also include a shaft 120. The support section 118 is configured so that it can be secured to a mounting surface, which may be on a workspace, on a bed such as a hospital bed, on the floor, on the wall, or may be a portion of the ceiling. The support section 118 may be affixed to the mounting surface by many different kinds of fasteners. Preferably the support section 118 includes threaded receptacles 122 (see FIGS. 1C and 1H) that receive threaded fasteners such as bolts or screws (not shown).

The support section 118 and the shaft 120 may be of a unitary construction that is formed by casting or another process. Alternatively, the support section 118 and the shaft 120 may be formed as separate components that are attached during manufacture, for instance by welding, riveting, etc. In another configuration, the shaft 120 may comprise part of the first endcap 102. In this case, the shaft 120 may be removably or permanently affixed to the support section 118.

As best seen in FIGS. 1C and 1H, the base member 104 preferably includes a receptacle 124. The receptacle 124 desirably extends through both the support section 118 and the shaft 120. The receptacle may be used for cable management, where power and/or signal cables for the user device 116 may be hidden from view when the user device is connected to the assembly 100. The aforementioned U.S. Pat. No. 6,409,134 describes several examples of cable management which can be used with the present invention, for instance as shown in FIG. 9 of the patent and the accompanying text.

Returning to the perspective views of FIGS. 1A and 1B and the side view of FIG. 1G, it can be seen that the first arm member 106 and the second arm member 110 may each include upper and lower channel members, identified as upper and lower channel members 106a and 106b and 110a and 110b, respectively. Depending upon the selected configuration, one or both of the upper and lower channel members of either the first or second arm members may provide structural support for the assembly 100, for instance as it supports the weight of the user device 116. Alternatively, either upper channel member and/or either lower channel member of each arm member need not provide structural support, as will be described below. In either case, the upper and/or lower channel members may also provide an aesthetic appearance. Furthermore, the upper and/or lower channel members may also be used for cable management purposes by concealing the power and/or signal cables of the user device 116. Preferably, the user device cables run through the first endcap 102, through one or both of upper and lower channel members 106a,b, through the middle cap 108, through one or both of the upper and lower channel members 110a,b, and through the second endcap 112. The cables may run through the upper or lower channel members of either arm member 106 or 110, or may be concealed by covers attached to the upper/lower channel members.

As seen in the top and bottom views of FIGS. 1F and 1H, respectively, the assembly 100 tapers generally from the end of the first arm member 106 adjacent the first endcap 102 to the end of the second arm member 110 adjacent the second endcap 114. The tapering provides a sleek, aesthetically pleasing appearance. In order to achieve the tapered look while providing adequate support to the user device 116, the first and second arm members are specifically configured. Details of such a configuration will be described below with reference to FIGS. 12A-E.

The upper channel members of one or both of the arm members may include a covering 126a. Similarly, the lower channel members of one or both of the arm members may include a covering 126b. The coverings 126a and/or 126b may provide further decoration or cable management. The coverings 126a and/or 126b may optionally be padded, for instance to protect a user such as a patient or doctor if he or she accidentally bumps into the assembly 100.

FIG. 2A presents a top perspective view and FIG. 2B presents a top plan view of the extension arm assembly 100 with the top coverings 126a omitted. FIG. 2C is a cross-sectional view of the assembly 100 taken along the 2A-2A line of FIG. 2B. Here it can be seen that each arm member includes several components that enable the assembly 100 to be configured in any number of positions and orientations.

The first arm member 106 desirably includes an upper channel stiffening member 128 and a lower channel stiffening member 130. The upper channel stiffening member 128 is preferably adapted to be covered by the upper channel member 106a, and the lower channel stiffening member 130 is preferably adapted to be covered by the lower channel stiffening member 106b when assembled.

A first end of the upper channel stiffening member 128 is preferably attached to the first endcap 102 at point 132. A second end of the upper channel stiffening member 128 is preferably attached to a first side of the middle cap 108 at point 134. Similarly, a first end of the lower channel stiffening member 130 is preferably attached to the first endcap 102 at point 136. A second end of the lower channel stiffening member 130 is preferably attached to the first side of the middle cap 108 at point 138. The ends of the upper and lower channel stiffening members 128 and 130 may be attached to the first endcap 102 and the middle cap 108 by, for example, pins, rivets or other fasteners. If pins are used, they preferably extend the width of the first endcap 102 or the middle cap 108.

A first extension and retraction member 140 is disposed within the first arm member 106. Preferably, the first extension/retraction member 140 is a gas cylinder or piston, although a coiled spring or other spring type may be employed. The first arm member 106 also includes a variable force clevis 142, which is coupled to a first end 144 of the member 140, e.g., a gas cylinder 140. A second end 146 of the gas cylinder 140 is coupled to the middle cap 108. In the present embodiment, the second end 146 is coupled to the middle cap 108 through an adjustable clevis 148. However, the second end 146 may be coupled to the middle cap 108 through a fixed clevis or a direct connection.

It can also be seen in FIG. 2C that the second arm member 110 includes an upper channel stiffening member 150 and a lower channel stiffening member 152. The upper channel stiffening member 150 is preferably adapted to be covered by the upper channel member 110a, and the lower channel stiffening member 152 is preferably adapted to be covered by the lower channel stiffening member 110b when assembled.

A first end of the upper channel stiffening member 150 is preferably attached to the second side of the middle cap 108 at point 154. A second end of the upper channel stiffening member 150 is preferably attached to the second endcap 114 at point 156. Similarly, a first end of the lower channel stiffening member 152 is preferably attached to second side of the middle cap 108 at point 158. A second end of the lower channel stiffening member 152 is preferably attached to the second endcap 114 at point 160. The ends of the upper and lower channel stiffening members 150 and 152 may be attached to the second endcap 114 and the middle cap 108 by, for example, pins, rivets or other fasteners. As with the upper and lower channel stiffening members 128 and 130, if pins are used, they preferably extend the width of the second endcap 114 or the middle cap 108.

A second extension and retraction member 162 is disposed within the second arm member 110. Preferably, the second extension/retraction member 162 is a gas cylinder or piston, which may be the same or a different size as the gas cylinder disposed in the first arm member 106. Although the gas cylinder/piston is preferred, a coiled spring or other spring type may be employed. In a preferred example where the first arm member 106 is longer than the second arm member 110, the first gas cylinder is sized to handle a larger mass than the second gas cylinder.

The second arm member 110 also includes a variable force clevis 164, which is coupled to a first end 166 of the member 162, e.g., gas cylinder 162. A second end 168 of the gas cylinder 162 is coupled to the middle cap 108. In the present embodiment, the second end 168 is coupled to the middle cap 108 through an adjustable clevis 170. However, the second end 168 may be coupled to the middle cap 108 through a fixed clevis or a direct connection.

FIG. 2D is an enlarged view of the area 2B-2B shown in FIG. 2C. Specifically, FIG. 2D illustrates the connection between the first end 144 of the gas cylinder 140 and the variable force clevis 142, as well as the connections between the variable force clevis 142 and the upper and lower channel stiffening members 128 and 130. Similarly, FIG. 2E is an enlarged view of the area 2C-2C shown in FIG. 2C. Specifically, FIG. 2E illustrates the connection between the first end 166 of the gas cylinder 162 and the variable force clevis 164, as well as the connections between the variable force clevis 164 and the upper and lower channel stiffening members 150 and 152.

The variable force clevis 142 will now be described with reference to FIGS. 8A-E. As shown in the perspective view of FIG. 8A, the variable force clevis 142 preferably includes a body member 172 having a first end 174 and a second end 176. The first end 174 may include a pair of projections 174a and 174b. Each of the projections 174a,b is preferably cylindrical. The second end 176 desirably includes an opening 178 such as a receptacle or through hole.

As seen in the perspective and top views of FIGS. 8A and 8B, respectively, the body member 172 desirably includes first and second halves 172a and 172b, which are symmetric about a central longitudinal axis 177 of the variable force clevis 142. The first and second halves 172a and 172b each preferably include respective arm members 180a and 180b. The arm members 180a and 180b may include respective openings 182a and 182b that are preferably aligned along a transverse axis 179. The body member 172 desirably also includes a central opening 184, as best seen in FIG. 8D. FIG. 8E is a cutaway view of the variable force clevis 142 taken along the 8A-8A line of FIG. 8D.

As illustrated in FIG. 8C, the arm members 180a,b may be disposed at an angle $\alpha_1$ relative to the longitudinal portion of the variable force clevis 142 from the first end 174 to the second end 176. Preferably, the angle $\alpha_1$ is on the order of 135°, although the exact angle may vary, for instance by +/−5° to 10°. For instance, the angle $\alpha_1$ may be selected based upon a particular configuration of the variable force clevis 142. In one example, the angle $\alpha_1$ may be between 130° and 140°. In another example, the angle $\alpha_1$ may be between 115° and 150°. Wider or narrower angles may also be selected. As shown in the figure, angle $\alpha_2$ is complementary to angle $\alpha_1$. Thus, in the example where $\alpha_1$ is 135°, $\alpha_2$ is 45°.

The variable force clevis 164 will now be described with reference to FIGS. 9A-E. As shown in the perspective view of FIG. 9A, the variable force clevis 164 preferably includes a body member 186 having a first end 188 and a second end 190. The first end 188 may include a pair of projections 188a and 188b. Each of the projections 188a,b is preferably cylindrical. The second end 190 desirably includes an opening 192 such as a receptacle or through hole.

As seen in the perspective and top views of FIGS. 9A and 9B, respectively, the body member 186 desirably includes arm members 194a and 194b which are symmetric about a central longitudinal axis 195 of the variable force clevis 164. The arm members 194a and 194b may include respective openings 196a and 196b that are preferably aligned along a transverse axis 197.

While FIG. 9A illustrates the second end 190 as not including projections, the top, side and front views of FIGS. 9B-D illustrate an alternative in which a pair of projections 198a and 198b are provided. In this case, the opening 192 preferably extends through the projections 198a and 198b.

FIG. 9E is a cutaway view of the variable force clevis 164 taken along the 9A-9A line of FIG. 9D. As illustrated in FIG. 9E, the body member 186 may include an angled section 200 having an angle $\beta_1$ therealong. Preferably, the angle $\beta_1$ is on the order of 135°, although the exact angle may vary, for instance by +/−5° to 10°. For instance, the angle $\beta_1$ may be selected based upon a particular configuration of the variable force clevis 164. In one example, the angle $\beta_1$ may be between 130° and 140°. In another example, the angle $\beta_1$ may be between 115° and 150°. Wider or narrower angles may also be selected.

A second angle $\beta_2$ is formed at the nexus 202 of the arm members 194a,b with the body member 186. Preferably, the angle $\beta_2$ is on the order of 135°, although the exact angle may vary, for instance by +/−5° to 10°. For instance, the angle $\beta_2$ may be selected based upon a particular configuration of the variable force clevis 164. In one example, the angle $\beta_2$ may be between 130° and 140°. In another example, the angle $\beta_2$ may be between 115° and 150°. Wider or narrower angles may also be selected. In the example shown, the angle $\beta_2$ is set to be the same as the angle $\beta_1$.

Returning to FIG. 2D, the connectivity of the variable force clevis 142 will now be described. Here, the first end 144 of the gas cylinder 140 is coupled to the arm members 180a and 180b of the variable force clevis 142 by fastener 204. The fastener 204, such as a pin, rivets, etc extends through the openings 182a and 182b of the arm members 180a,b. Preferably, the pin or other fastener 204 permits movement about the transverse axis 179.

The pair of projections 174a and 174b of the first end 174 of the variable force clevis 142 are desirably coupled to the upper stiffening member 128 by upper bracket 206. The upper bracket 206 may be integrally formed as part of the upper stiffening member 128 or may be formed as a separate component that is affixed thereto, for example by fasteners 208. The upper bracket 206 is preferably not fixedly attached to the projections 174a,b; rather, the projections 174a,b should be movable as will be explained in more detail below. The second end 176 of the variable force clevis 142 is preferably coupled to the lower stiffening member 130 by fastener 210, such as a pin, rivet, bolt, etc, which engages the opening 178. Preferably, the pin or other fastener 210 permits movement, such as rotational movement, of the second end 176 relative to the lower stiffening member 130.

The connectivity of the variable force clevis 164 will now be described in relation to FIG. 2E. Here, the first end 188 of the gas cylinder 162 is coupled to the arm members 194a and 194b of the variable force clevis 164 by fastener 212. The fastener 212, such as a pin, rivets, etc., extends through the openings 196a and 196b of the arm members 194a,b. Preferably, the pin or other fastener 212 permits movement about the transverse axis 197.

The pair of projections 188a and 188b of the first end 188 of the variable force clevis 164 are desirably coupled to the upper stiffening member 150 by upper bracket 214. As with the upper bracket 206, the upper bracket 214 may be integrally formed as part of the upper stiffening member 150 or may be formed as a separate component that is affixed thereto, for example by fasteners 216. The upper bracket 214 is preferably not fixedly attached to the projections 188a,b; rather, the projections 188a,b should be movable as will be explained in more detail below. The second end 190 of the variable force clevis 142 is preferably coupled to the lower stiffening member 152 by fastener 218, such as a pin, rivet, bolt, etc, which engages the opening 192 therein. Preferably, the pin or other fastener 218 permits movement, such as rotational movement, of the second end 190 relative to the lower stiffening member 152.

FIG. 3 illustrates the assembly 100 with the upper channel members 106a, 110a and the lower channel members 106b, 110b omitted. The first arm member 106 is desirably implemented as a four bar link, where the upper channel stiffening member 128 connects at points 132 and 134 and the lower channel stiffening member 130 connects at points 136 and 138. In this embodiment, the upper and lower channel stiffening members 128 and 130 are load bearing members for the first arm member 106.

Similarly, the second arm member 110 is desirably also implemented as a four bar link, where the upper channel stiffening member 150 connects at points 154 and 156 and the lower channel stiffening member 152 connects at points 158 and 160. In this embodiment, the upper and lower channel stiffening members 150 and 152 are load bearing members for the second arm member 110.

As shown, the distance $l_1$ between points 132 and 136 is most preferably the same distance as between points 134 and 138. The distance from where the projections 174a,b couple to the upper bracket 206 to where the second end 176 of the variable force clevis 142 is coupled to the lower stiffening member 130 by fastener 210 is most preferably also $l_1$.

The points 132 and 136 spaced at length $l_1$ are preferably disposed along a line at the first endcap 102 having an angle $\phi_1$ as shown. The points 134 and 138, also spaced at length $l_1$, are preferably disposed along a line at the middle cap 108 having an angle $\phi_2$ as shown. The angle $\phi_2$ should be kept the same as the angle $\phi_1$. In a preferred example, $\phi_1=\phi_2=45°$. The angle need not be exactly 45°. For instance, it may be between 40°-50°. Alternatively, other angles may be selected, such as between 30°-60°. Larger or smaller angles may also be used. The angle $\phi_3$ of the variable force clevis 142 should be set to the same as $\phi_1$ and $\phi_2$. Otherwise, as the first arm member 106 moves, the variable force clevis 142 may not rotate properly. In such a case, this may cause the first arm member 106 to jam and not move through a full range of motion.

The second arm member 110 operates in a similar manner. As shown, the distance $l_2$ between points 154 and 158 is most preferably the same distance as between points 156 and 160. The distance from where the projections 188a,b couple to the upper bracket 214 to where the second end 190 of the variable force clevis 164 is coupled to the lower stiffening member 152 by fastener 218 is most preferably also $l_2$. While $l_2$ may be the same or greater than $l_1$ in the present example $l_2$ is less than $l_1$. This helps to provide a tapering effect along the length of the assembly 100.

The points 154 and 158 spaced at length $l_2$ are preferably disposed along a line at the middle cap 108 having an angle $\phi_4$ as shown. The points 156 and 160, also spaced at length $l_2$, are preferably disposed along a line at the second endcap 110 having an angle $\phi_5$ as shown. The angle $\phi_5$ should be kept the same as the angle $\phi_4$. In a preferred example, $\phi_4=\phi_5=45°$. The angle need not be exactly 45°. For instance, it may be between 40°-50°. Alternatively, other angles may be selected, such as between 30°-60°. Larger or smaller angles may also be used. Most preferably, $\phi_4$ and $\phi_5$ are equal to $\phi_1$ and $\phi_2$. The angle $\phi_6$ of the variable force clevis 164 should be set to the same as $\phi_4$ and $\phi_5$. Otherwise, as explained above with regard to the first arm member 106, as the second arm member 110 moves, the variable force clevis 164 may not rotate properly. In such a case, this may cause the second arm member 110 to jam and not move through a full range of motion.

In order to enhance the tapering effect, a first distance $l_a$ between the outer surfaces of the upper and lower stiffening members 128 and 130 adjacent the first endcap 102 preferably decreases to a second distance $l_b$ adjacent the middle cap 108. A third distance $l_c$ between the outer surfaces of the upper and lower stiffening members 150 and 152 adjacent the middle cap 108 is preferably less than the distance $l_b$. And a fourth distance $l_d$ adjacent the second endcap 112 is preferably less than the third distance $l_c$.

As explained above, the gas cylinders 140 and 162 may be coupled to the middle cap 108 through a fixed clevis or a direct connection. In the present embodiment, the gas cylinders 140 and 162 are preferably connected to the middle cap 108 through adjustable clevises. FIGS. 4A-E illustrate the middle cap 108 coupled to a first adjustable clevis 220 and a second adjustable clevis 222.

As seen in the side, top and bottom views of FIGS. 4A-C, respectively, the middle cap 108 preferably includes an outer housing 224 having a top portion 226 and a pair of sidewalls 228a,b. Each sidewall preferably includes the connection points 134, 138, 154 and 158 for connection to the first and second arm members 106 and 110, respectively.

As seen in the end view of FIG. 4D, the first adjustable clevis 220 may be threadedly engaged by a first clevis bolt 230. A first clevis bolt holder 232 and a first clevis bolt retainer 234 secure the first clevis bolt 222 in the middle cap 108 while permitting rotational adjustment thereof. The retainer 234 may be secured to the holder 232 by fasteners 236 such as screws. The holder 232 may be secured to the outer housing 224 by a retaining plate 238. Here, the holder 232 may be connected to the retaining plate 238 by fasteners 240 such as screws.

Similarly, as seen in the end view of FIG. 4E, the second adjustable clevis 222 may be threadedly engaged by a second clevis bolt 242. A second clevis bolt holder 244 and a second clevis bolt retainer 246 secure the second clevis bolt 224 in the middle cap 108 while permitting rotational adjustment thereof. The second retainer 246 may be secured to the second holder 244 by the same fasteners 236 which secure the first retainer 234 to the first holder 232. The second holder 244 may be secured to the outer housing 224 by the retaining plate 238. The second holder 244 may be connected to the retaining plate 238 by the fasteners 240.

Either clevis 222 or 224 may be adjusted by rotation of respective bolts 230 or 242. For example, a tool (not shown) such as a screwdriver or a hex-shaped key can engage the head of either bolt 230 or 242, which may stick out of the middle cap 108, or which may be accessed through access points in the middle cap 108. The access points should be placed for easy access without impinging on the operation of the adjustable clevises or other components of the assembly 100. The tool is employed so as to rotate the threaded bolt 230 or 242 along its axis of rotation. When the threaded bolt 230 or 242 is rotated along its axis of rotation, the clevis 222 or 224 moves along the length of the threaded bolt 230 or 242 in a direction that corresponds to the direction which the tool is turned. This movement of the clevis 230 or the clevis 242 permits respective gas cylinder 140 or 162 to be adjusted.

Specifically, as the clevis 222 moves up or down along the path defined by the axis of the threaded bolt 230, the position of the second end 146 of the gas cylinder 140 is adjusted. Similarly, as the clevis 224 moves up or down along the path defined by the axis of the threaded bolt 242, the position of the second end 168 of the gas cylinder 162 is adjusted. Adjustment of the gas cylinder 140 or 162 can be used to increase or decrease the amount of load that the first arm member 106 or the second arm member 110 can support.

Figure 5C:
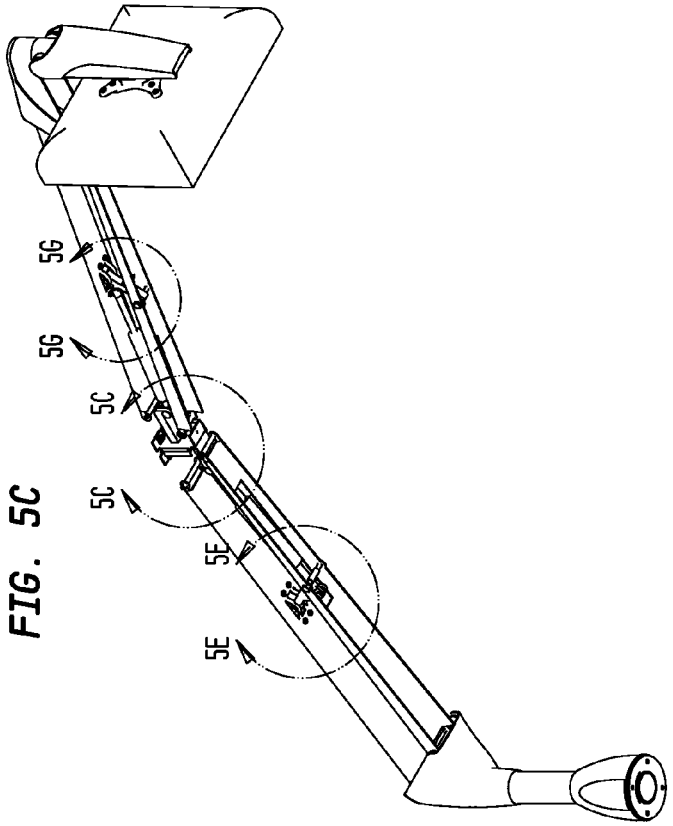
Figure 6B:
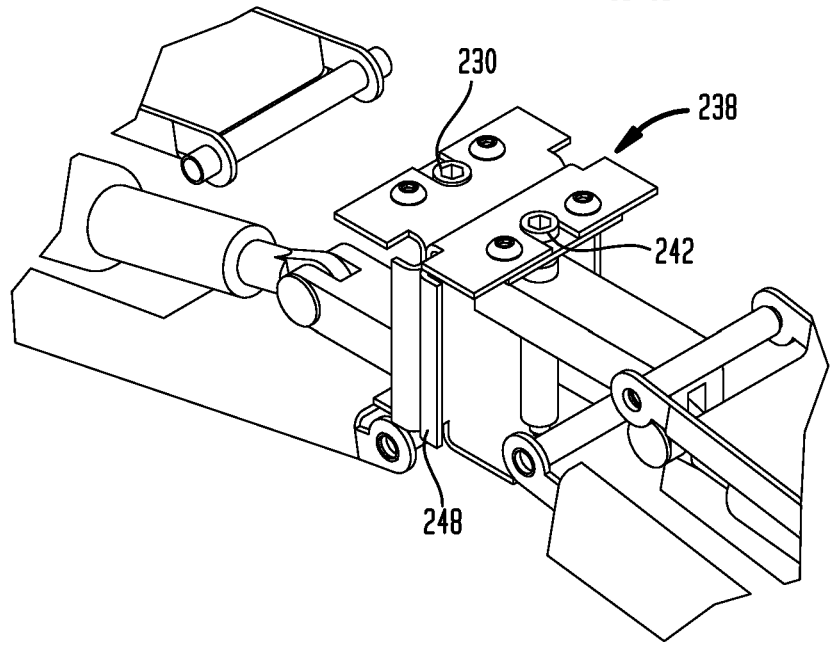
Figure 6C:
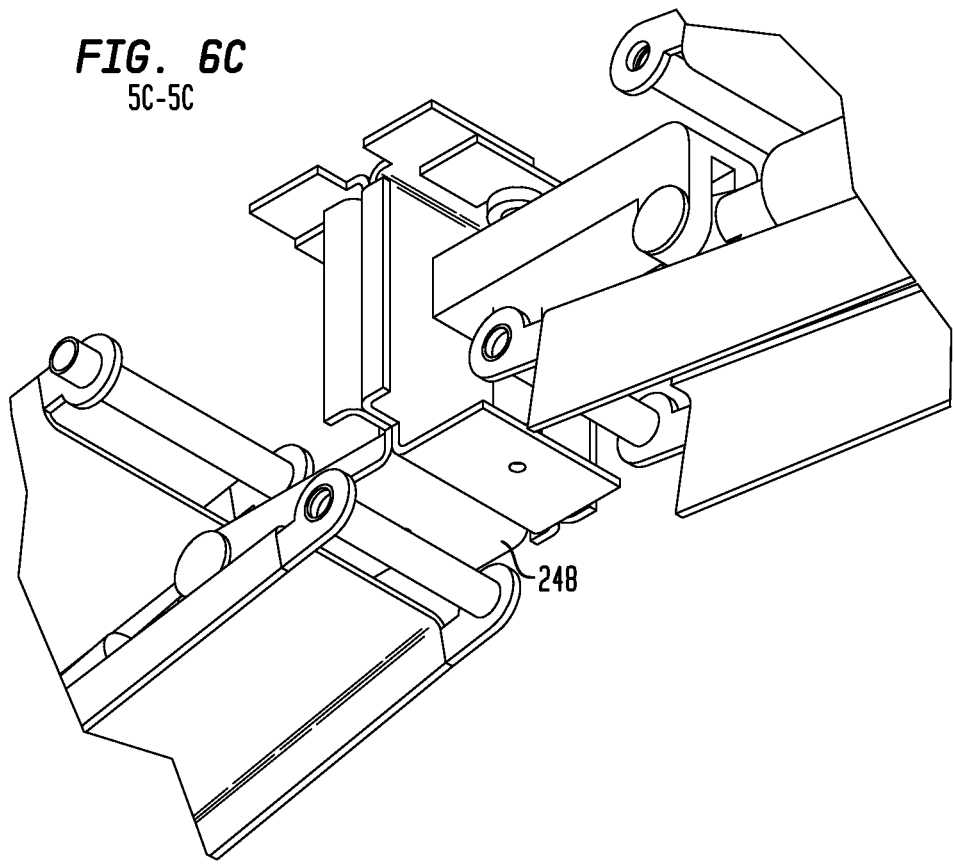

FIGS. 5A-C illustrate a side view and top and bottom perspective views, respectively, of the assembly 100 with the outer housing 224 of the middle cap 108 and with the omitted for clarity. Sections of these illustrations will be described in more detail below. For instance, FIG. 6A is an enlarged view taken of region 5A-5A in FIG. 5A. FIG. 6B is an enlarged view of area 5B-5B taken of a central region of FIG. 5B. And FIG. 6C is an enlarged view of area 5C-5C taken of the central region as shown in FIG. 5C. Connections of the variable force clevises 142 and 164 will then be described with regard to areas 5D-5D through 5G-5G in FIGS. 7 and 8. 104 As shown in FIGS. 6A-C, the first clevis bolt holder 232 may be secured to the second clevis bolt holder 244 as shown along region 248. Alternatively, the holders 232 and 244 may be formed as a single, integral component. As shown in FIG. 6A, the first clevis bolt 230 is adjustable along a generally vertical axis 247. Similarly, the second clevis bolt 242 is adjustable along a generally vertical axis 249. In alternative examples, the axes 247 and 249 need not be vertical, and need not be parallel to one another.

For instance, as described in pending U.S. patent application Ser. No. 11/141,348, entitled "Angled Mini Arm Having a Clevis Assembly," and filed on May 31, 2005, adjustable clevises may be configured to adjust along a path at non vertical angles. As explained in the patent application, the entire disclosure of which is hereby incorporated by reference herein, angling the path of the clevis can provides a significant increase in the amount of load that the first arm member 106 or the second arm member 110 can support, because the angling provides enhanced leverage. See FIGS. 12-16 and the accompanying description from the aforementioned patent application. Thus, a smaller gas cylinder can support the same load as a larger gas cylinder. This decrease in size of the gas cylinder enables a manufacturer to use a much more compact gas cylinder. In turn, this enables a more compact design.

Figure 10C:
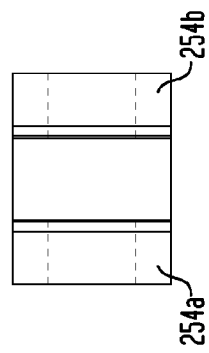
FIGS. 10A-C illustrate an adjustable clevis in accordance with aspects of the present invention.
Figure 10A:
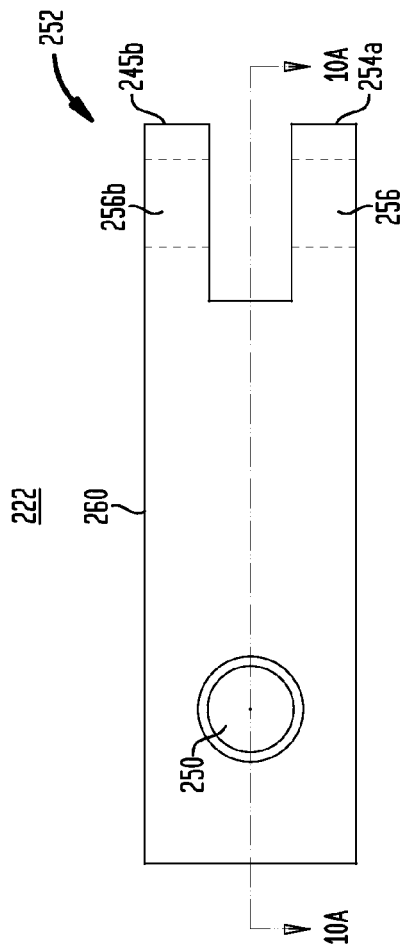
Figure 10B:
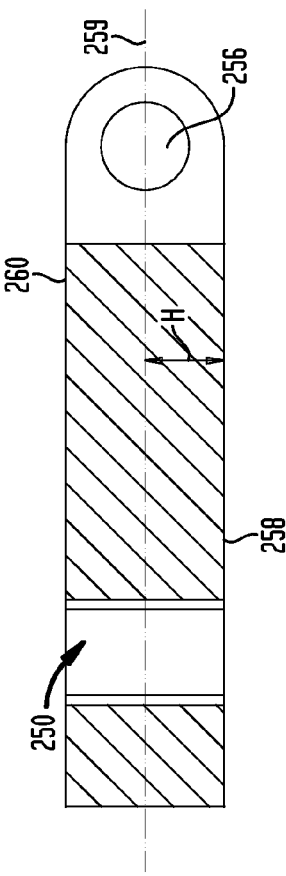

As shown in FIGS. 10A-C, the clevis 222 may be a "straight" clevis. The top view of FIG. 10A illustrates that the clevis 222 has a receptacle 250, which is configured to align along the axis 247. The receptacle 250 preferably threadedly receives the threaded bolt 230. As seen in the top view, a first end 252 of the clevis 222 preferably includes a pair of spaced apart fastening members 254a,b. The fastening members 254a,b include aligned openings 256a,b therein. The openings 256a,b are positioned at a height H relative to a bottom surface 258 of the clevis 222.

In the straight clevis embodiment, the openings 256a,b are positioned approximately halfway between the bottom surface 258 and a top surface 260 of the clevis 222, along a center line 259, as shown by the cutaway view of FIG. 10B along the 10A-10A line of FIG. 10A. The second end 146 of the gas cylinder 140 is fastened to the fastening members 254a,b via a pin 262 or other fastener received by the openings 256a,b (see FIG. 5B).

As shown in FIGS. 11A-D, the clevis 224 may be a "bent" clevis. A receptacle 264, illustrated in the perspective view of FIG. 11A and the bottom view of FIG. 11B, is preferably adapted to receive the threaded bolt 242. As seen in the perspective view, a first end 266 of the downward angled clevis 224 preferably includes spaced apart fastening members 268a,b, which are angled downward relative to top surface 270. The downward angled fastening members 268a,b include aligned openings 272a,b therein. The aligned openings 272a,b are positioned at a height $H_2$ relative to bottom surface 274 of the clevis 224. In this embodiment, the center point of the aligned openings 272a,b is preferably below a center line 275 as measured between the top and bottom surfaces 270 and 274. The center point of the aligned openings 272,a,b is shown having a height $H_2$ below the center line 275, which is preferably below the bottom surface 274. Thus, in this example, the clevis 224 is bent downward.

While the straight and downward bent clevis configurations of FIGS. 10 and 11 are preferred, other adjustable clevis configurations may be employed. For instance, either clevis 222 or clevis 224 may be bent upward, and/or may be configured to adjust at a non-vertical angle relative to the middle cap 108. Examples of such alternate clevis configurations are discussed in detail in the incorporated U.S. patent application Ser. No. 11/141,348 referenced above. Other adjustable clevises are disclosed in U.S. Pat. No. 6,076,785, the entire disclosure of which is hereby incorporated by reference herein. See, for instance, FIG. 1 of the '785 patent and accompanying discussion at column 3, line 67 to column 4, line 34. Any such adjustable clevis configurations may be used for either the clevis 222 or the clevis 224.

Figure 7A:
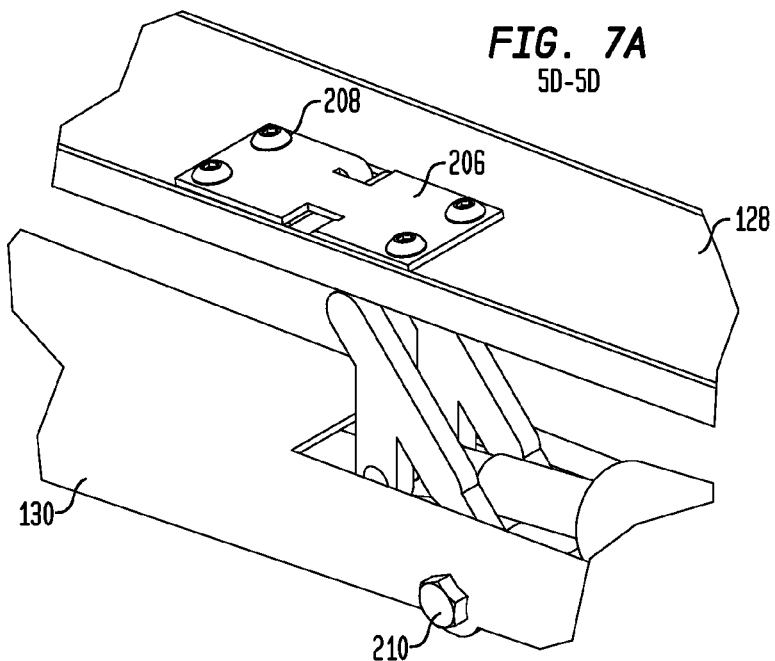
FIGS. 7A-D illustrate additional enlarged views of components of FIGS. 5A-C.
Figure 7B:
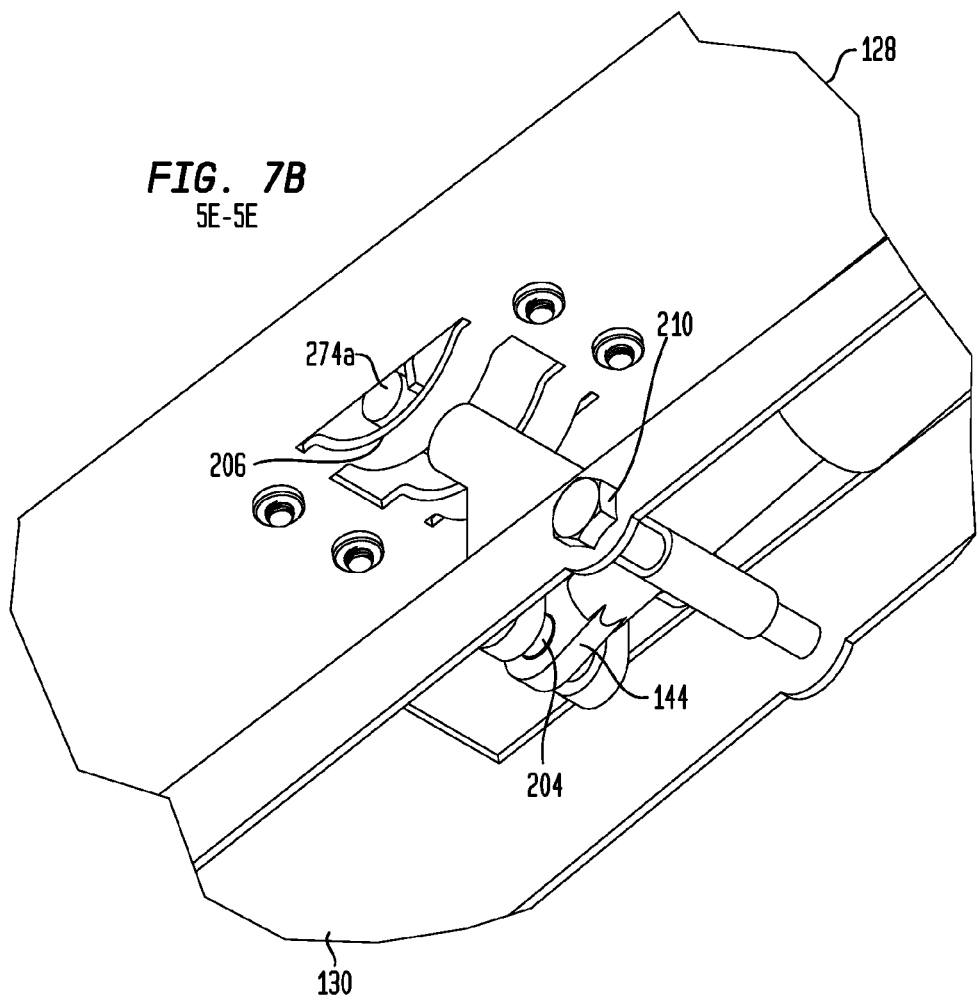

Turning to the connections of the variable force clevis 142, FIG. 7A is an enlarged view taken of region 5D-5D in FIG. 5B. FIG. 7B is an enlarged view taken of region 5E-5E in FIG. 5C. As shown in FIG. 7A, the upper bracket 206 is desirably fastened to the upper channel stiffening member 128. As best seen in FIG. 7B, the projections 174a,b are retained by the upper bracket 206. The second end 176 is secured by fastener 210 to the lower channel stiffening member 130. The first end 144 of the gas cylinder 140 is inserted through the central opening 184 of the body member 172 of the variable force clevis 142, and connects to the arm members 180a,b with the fastener 204, as described above with regard to FIG. 2D.

Figure 7C:
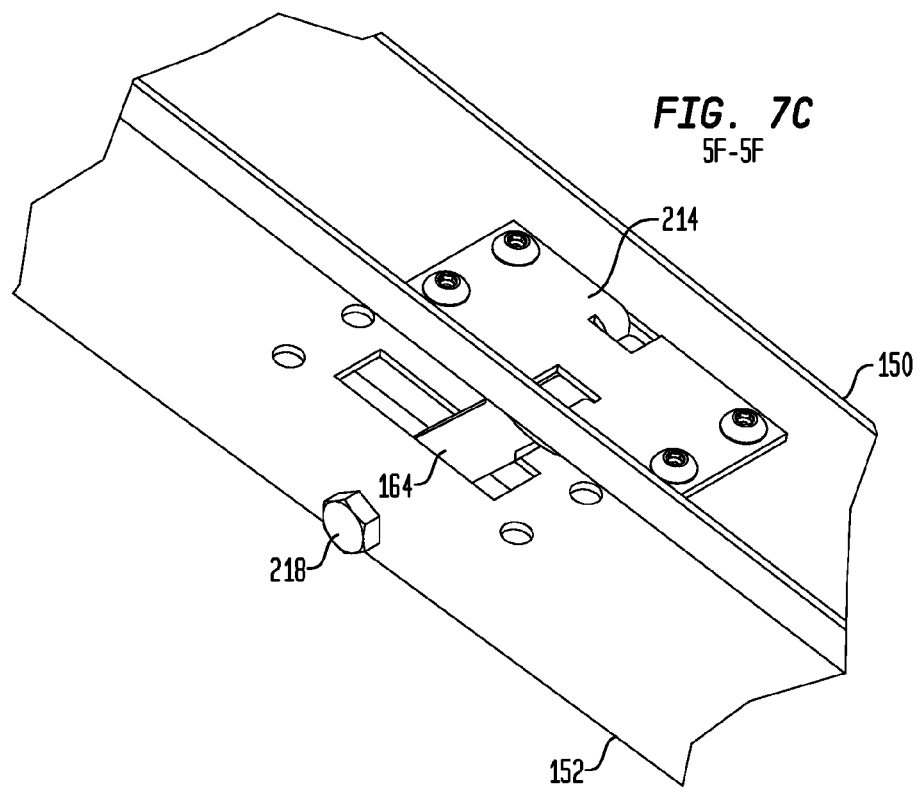
Figure 7D:
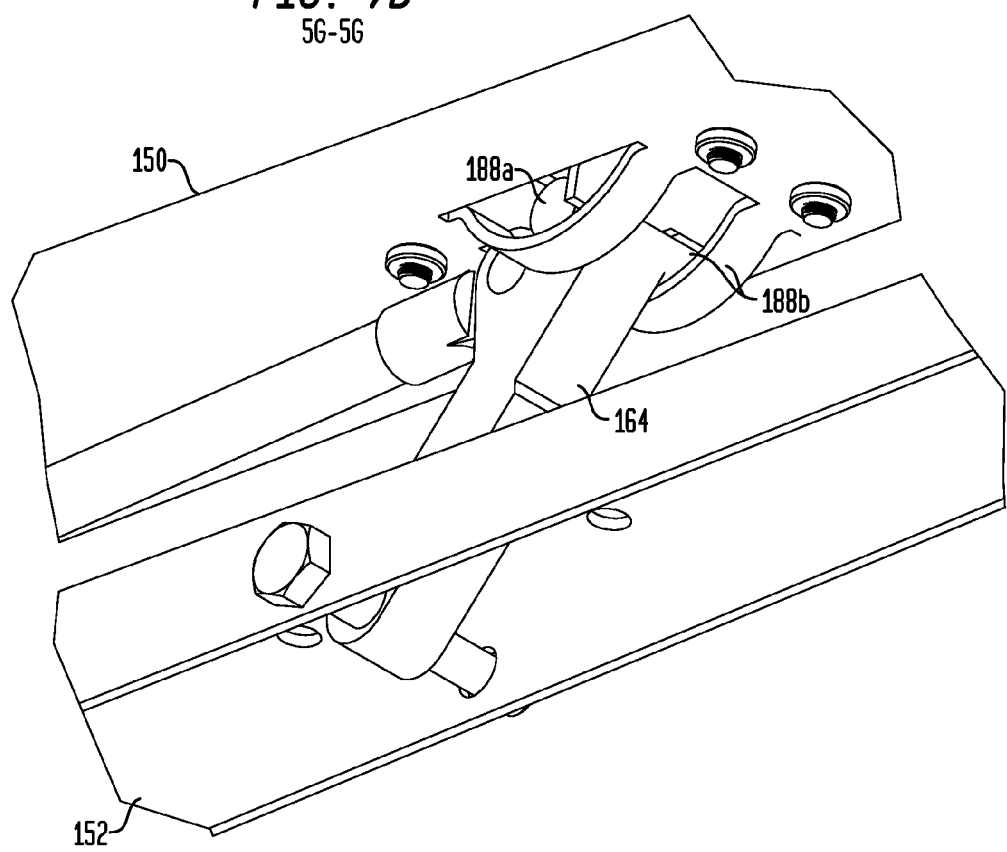

FIGS. 7C and 7D illustrate enlarged views of the connections of the variable force clevis 164. Specifically, FIG. 8A is an enlarged view taken of region 5F-5F in FIG. 5B, and FIG. 8B is an enlarged view taken of region 5G-5G in FIG. 5C. As shown in FIG. 7C, the upper bracket 214 is desirably fastened to the upper channel stiffening member 150. As seen in FIG. 7D, the projections 188a,b are retained by the upper bracket 214. The second end 190 is secured by fastener 218 to the lower channel stiffening member 152. The first end 166 of the gas cylinder 162 connects to the arm members 194a,b of the variable force clevis 164 as described above with regard to FIG. 2E.

In the present embodiment, while the first gas cylinder 140 is shown as connecting to the variable force clevis 142 and the second gas cylinder 152 is shown as connecting to the variable force clevis 164, either variable force clevis may be used with either gas cylinder. Alternatively, different configurations of the variable force clevises may be selected depending where they are placed in the different arm members.

FIGS. 13A-H illustrate an alternative example of the first arm member 106, namely 106', where the figures illustrate the first arm member 106' in different positions and show how the variable force clevis 142 functions. Here, as in the above-described figures, the variable force clevis 142 is disposed between the first and second ends of the arm member 106; however, the placement of the clevis 142 is reversed from the earlier examples. See FIG. 13A. As above, the first end 144 of the gas cylinder connects to the variable force clevis. But in this example, the second end 146 of the gas cylinder 140 is not coupled to the middle cap 108. Rather, the second end 146 is coupled to the first endcap 102.

The orientation and/or position of the variable force clevis and the gas cylinder are not critical. For instance, the first arm members 106 and 106' function in the same manner even though the relative positions and orientations of the gas cylinder and the variable force clevis differ. What is important is that the variable force clevis 142 be fastened to the upper and lower channel stiffening members 128 and 130 so that it is able to rotate or pivot relative to its connections to them. It will be shown how the variable force clevis automatically adjusts the amount of force provided by the gas cylinder as the first arm member moves through different positions.

As shown in the enlarged view of FIG. 13B, the clevis bolt 230 may be vertically aligned along a longitudinal axis of the first endcap 102. However, as mentioned above with regard to the middle cap 108, the clevis bolt 230 may be disposed at some angle relative to the longitudinal axis of the first endcap 102.

FIGS. 13A and 13B illustrate the first arm member 106' in a full upright or vertical position where $\omega_1$ is 90°. As seen in FIG. 13B, the gas cylinder 140 has a small angle $\gamma_1$ relative to the upper channel stiffening member 128 or upper side of the first arm member 106'. Preferably, the angle $\gamma_1$ is measured relative to a line defined by the points 132 and 134 or by the point 132 and the connection point where the pair of projections 174a and 174b of the first end 174 of the variable force clevis 142 are coupled to the upper stiffening member 128 by the upper bracket 206. In this position, the point where the gas cylinder 140 connects to the clevis 142 is shown as being closer to the lower channel stiffening member 130 than to the upper channel stiffening member 128.

In this position, the gas cylinder 140 may be substantially or completely extended. A low amount of force from the gas cylinder 140 is required to counterbalance the user device 116. If the force from the gas cylinder is too high, the arm member 106 will snap back to the vertical position after it has been extended downward. The amount of force provided by the gas cylinder 140 may be adjusted by moving the adjustable clevis 222 along the axis of the clevis bolt 230.

It should be noted that if approximate weight of the user device 116 is known, an adjustable clevis 222 is not necessary. In this case, a fixed clevis could be employed, or the gas cylinder 140 could be fixed to the first endcap 102 (or to the middle cap 108) at a predetermined position sufficient for the user device's weight.

FIGS. 13C and 13D illustrate the first arm member 106' traveling downward, as illustrated by the arrow A, from the full upright or vertical position. Here, the first arm member 106' is positioned with $\omega_1$ being approximately 60° relative to the horizontal. As shown by arrow B in the enlarged view of FIG. 13D, the variable force clevis 142 preferably rotates counter-clockwise as the upper and lower channel stiffening members 128 and 130 move relative to one another. For instance, while the four bar linkage of the upper and lower channel members 106a and 106b maintain a general parallelogram shape, the channel members slide along parallel planes relative to one another.

As the first arm member 106' moves downward, the gas cylinder 140 has an angle $\gamma_2$, which is larger than the angle $\gamma_1$ of the full upright position. In the current position, more force is required to counter balance the weight of the user device 116 on the end of the assembly 100. The variable force clevis 142 automatically adjusts the force provided by the gas cylinder 140 as it moves from the full upright position.

FIGS. 13E and 13F illustrate the first arm member 106' continuing to travel downward, as illustrated by the arrow C. Here, the first arm member 106' is positioned with $\omega_1$ being approximately 30° relative to the horizontal. As shown by arrow D in the enlarged view of FIG. 13F, the variable force clevis 142 continued to rotate as the upper and lower channel stiffening members 128 and 130 move relative to one another. The point where the gas cylinder 140 connects to the clevis 142 is shown as being closer to the upper channel stiffening member 128 than to the lower channel stiffening member 130.

As the first arm member 106' moves downward, the gas cylinder 140 has an angle $\gamma_3$, which is larger than the angle $\gamma_2$. The gas cylinder 140 is also being compressed at the same time as the angle $\gamma$ increases. This creates more force compared to the arm member 106' being in the full upright position.

FIGS. 13G and 13H illustrate the first arm member 106' in a horizontal position, where $\omega_1$ is approximately 0°. The point where the gas cylinder 140 connects to the clevis 142 is shown as being substantially adjacent to the upper channel stiffening member 128. This creates an angle $\gamma_4$, which is larger than the angle $\gamma_3$. With the first arm member 106' in the horizontal position, the assembly 100 requires a large amount of force from the gas cylinder 140 to counterbalance the weight of the user device 116.

The variable force clevis 142 has been rotated from an initial position in the full vertical arrangement of FIGS. 13A and 13B to a final position in the full horizontal arrangement of FIGS. 13G and 13H. This rotation varies the angle $\gamma$ and compresses the gas cylinder 140 throughout the range of motion as illustrated. The result is that the amount of force provided by the gas cylinder 140 has increased as the first arm member 106' has gone from vertical to horizontal, thereby providing the necessary amount of force to counterbalance the user device 116.

FIGS. 14A-H focus on operation of variable force clevis 164 and the gas cylinder 162 of the second arm member 110. In particular, FIGS. 14A and 14B illustrate the second arm member 110 in a horizontal position, where $\omega_2$ is approximately 0°. The point where the gas cylinder 162 connects to the clevis 164 is shown as being substantially adjacent to the upper channel stiffening member 150. This creates an angle $\lambda_1$, as illustrated in FIG. 14B. The angle $\lambda_1$ may be the same or different than the angle $\gamma_4$ of the first arm member 106. The angle $\lambda_1$ may differ from $\gamma_4$ due to different factors, such as the lengths of the gas cylinders, the spacing between the respective upper and lower channel stiffening members, and the lengths of the variable force clevises.

With the second arm member 110 in the horizontal position, the assembly 100 requires a large amount of force from the gas cylinder 162 to counterbalance the weight of the user device 116. Therefore, the gas cylinder 162 is preferably positioned within the second arm member 110 to have as large an angle $\lambda_1$ as possible.

FIGS. 14C and 14D illustrate the second arm member 110 traveling in a downward direction, as illustrated by the arrow E. Here, the second arm member 100 is positioned with $\omega_2$ being approximately 30° relative to the horizontal. As shown by arrow F in the enlarged view of FIG. 14D, the variable force clevis 164 preferably rotates in a counter-clockwise manner as the upper and lower channel stiffening members 150 and 152 move relative to one another. For instance, while the four bar linkage of the upper and lower channel members 110a and 110b maintain a general parallelogram shape, the channel members slide along parallel planes relative to one another. The point where the gas cylinder 162 connects to the clevis 164 is shown as moving away from the upper channel stiffening member 150. Thus, angle $\lambda_2$ is smaller than angle $\lambda_1$. The result is that the first end 166 of the gas cylinder 162 moves away from the upper channel 110a.

FIGS. 14E and 14F illustrate the second arm member 110 as it continues to travel in a downward direction, as illustrated by the arrow G. Here, the second arm member 110 is positioned with $\omega_2$ being approximately 75° relative to the horizontal. As shown by arrow H in the enlarged view of FIG. 14F, the variable force clevis 164 continues to rotate counter-clockwise as the upper and lower channel stiffening members 150 and 152 move relative to one another. The rotation is illustrated as being in a counter-clockwise direction.

As the arm member 110 continues to move downward, the first end 166 of the gas cylinder 162 moves farther away from the upper channel 110a. Thus, the gas cylinder 162 now has an angle $\lambda_3$, which is smaller than the angle $\lambda_2$. The net result is to decrease the amount of force the gas cylinder 140 applies to the arm member 110.

FIGS. 14G and 14H illustrate the second arm member 110 in a full downward or vertical position where $\omega_2$ is 90°. As seen in FIG. 14H, the gas cylinder 162 has a small angle $\lambda_4$ relative to the upper channel stiffening member 128 or upper channel 110a of the second arm member 110. $\lambda_4$ is smaller than $\lambda_3$, and is preferably on the order of 0°. In this position, the point where the gas cylinder 162 connects to the clevis 164 is shown as being approximately midway between the upper and lower channel members 110a and 110b. Thus, the gas cylinder 162 is preferably substantially parallel to the upper and lower channel members 110a and 110b. Here, there should be minimal or no force from the gas cylinder 162 being applied to the arm member 110. Otherwise, the arm member 110 will not stay in the full downward position.

Figure 15A:
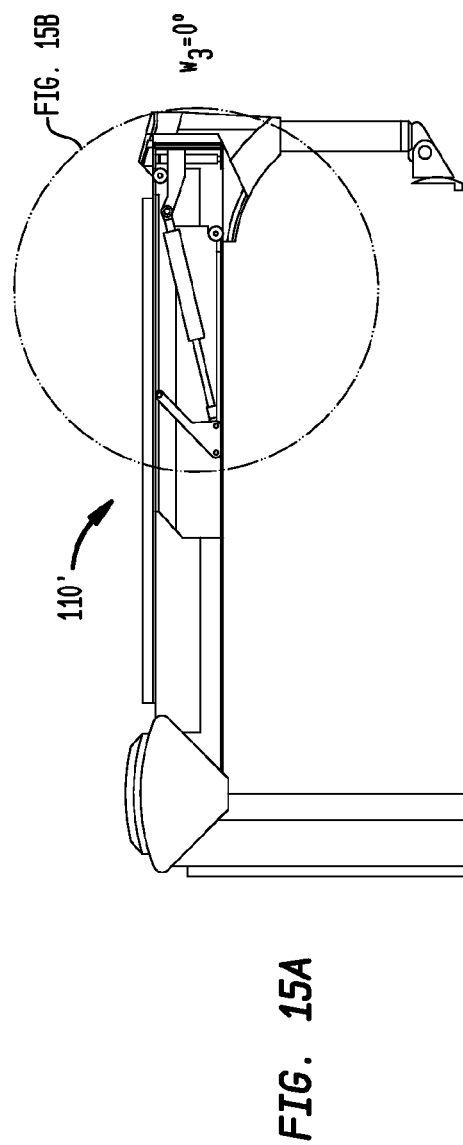
FIGS. 15A-F illustrate operation of a further arm member of an extension arm assembly in accordance with aspects of the present invention.

FIGS. 15A-F illustrate a variation of the second arm member 110, namely second arm member 110'. In this case, the variable force clevis 164 and the gas cylinder 162 are flipped from the positions shown in FIGS. 14A-H. Here, as seen in FIG. 15A, the clevis 164 is still disposed between the middle cap 108 and the second endcap 112, although it is inverted and facing the opposite direction from the earlier embodiment. The gas cylinder 162 is shown in FIG. 15A as connecting at the first end 166 to the clevis 164, and at the second end 168 to the second endcap 112 through the adjustable clevis 224. The adjustable clevis 224 in this example is preferably bent upward toward the upper channel member 110a.

Figure 15B:
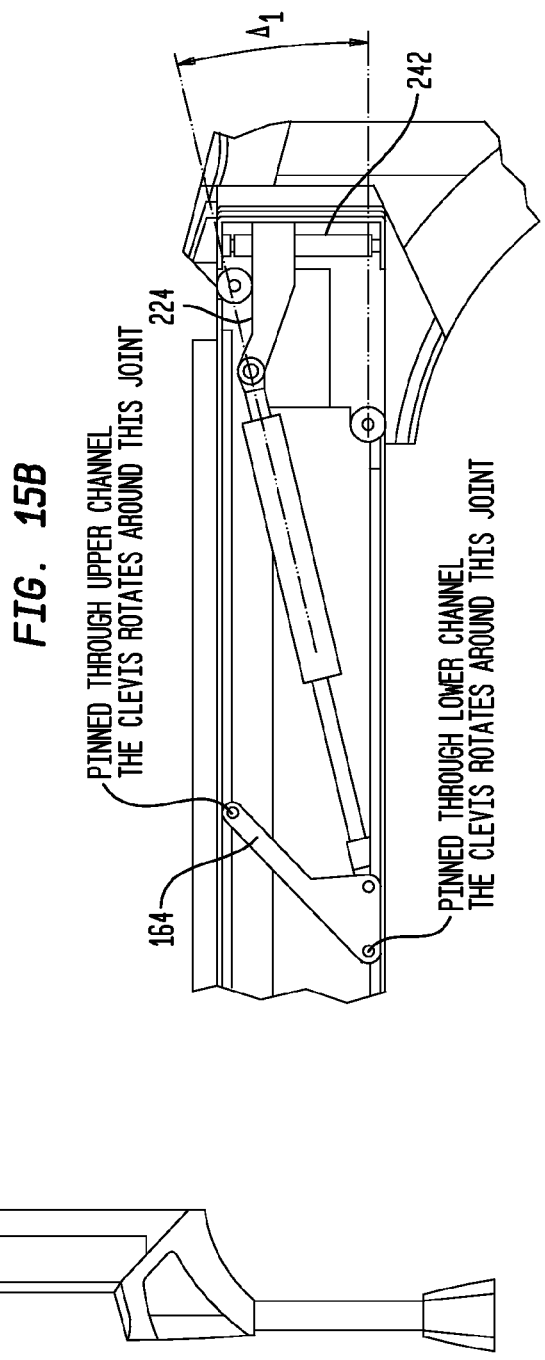

FIGS. 15A and 15B illustrate the second arm member 110' in a horizontal position, where $\omega_3$ is approximately 0°. The point where the gas cylinder 162 connects to the clevis 164 is shown as being substantially adjacent to the lower channel stiffening member 152 and the lower channel member 110b. This creates an angle $\Delta_1$, as illustrated in FIG. 15B. The angle $\Delta_1$ may be the same or different than the angle $\lambda_1$ of the second arm member 110 discussed above. For instance, the angle $\Delta_1$ may differ from $\lambda_1$ due to different factors, such as the lengths of the gas cylinders, the spacing between the respective upper and lower channel stiffening members, and the lengths of the variable force clevises. The bolt 242 is employed to move the adjustable clevis 224 upward or downward within the second arm member 110', thereby adjusting the force provided by the gas cylinder 162.

Figure 15D:
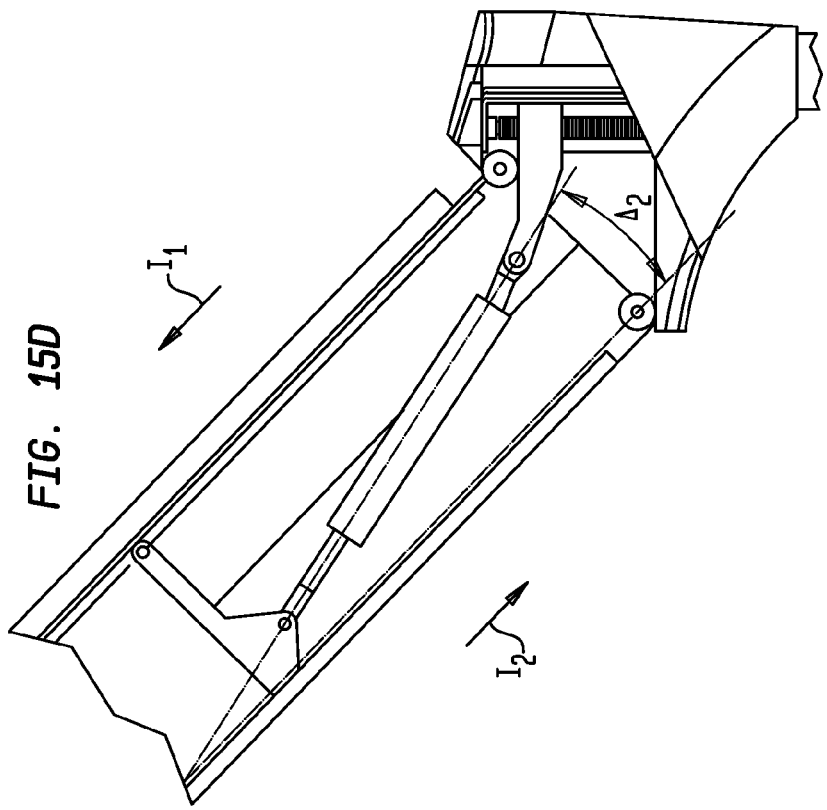
Figure 15C:
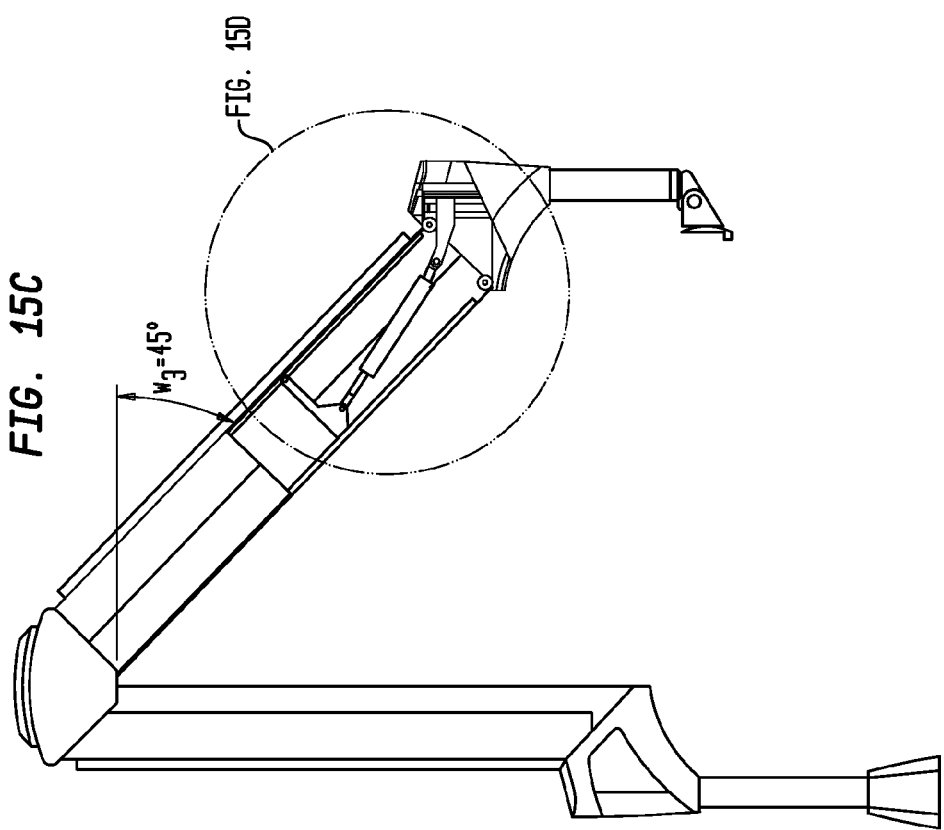

FIGS. 15C and 15D illustrate the second arm member 110' positioned with $\omega_3$ being on the order of 45° relative to the horizontal. As shown by arrows $I_1$ and $I_2$ in the enlarged view of FIG. 15D, the upper and lower channel members 110a and 110b move relative to one another. For instance, while the four bar linkage of the upper and lower channel members 110a and 110b maintain a general parallelogram shape, the channel members slide along parallel planes relative to one another. The point where the gas cylinder 162 connects to the clevis 164 is shown as moving away from the lower channel stiffening member 152. Thus, angle $\Delta_2$ is smaller than angle $\Delta_1$. The result is that the first end 166 of the gas cylinder 162 moves away from the lower channel 110b, and the gas cylinder 162 partially compresses.

Figure 15F:
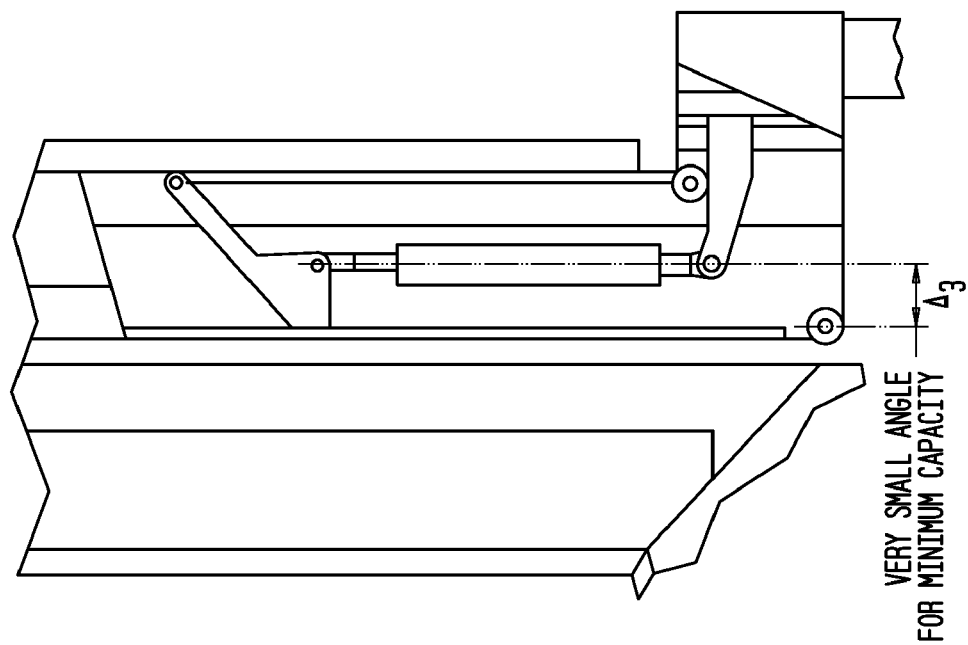
Figure 15E:
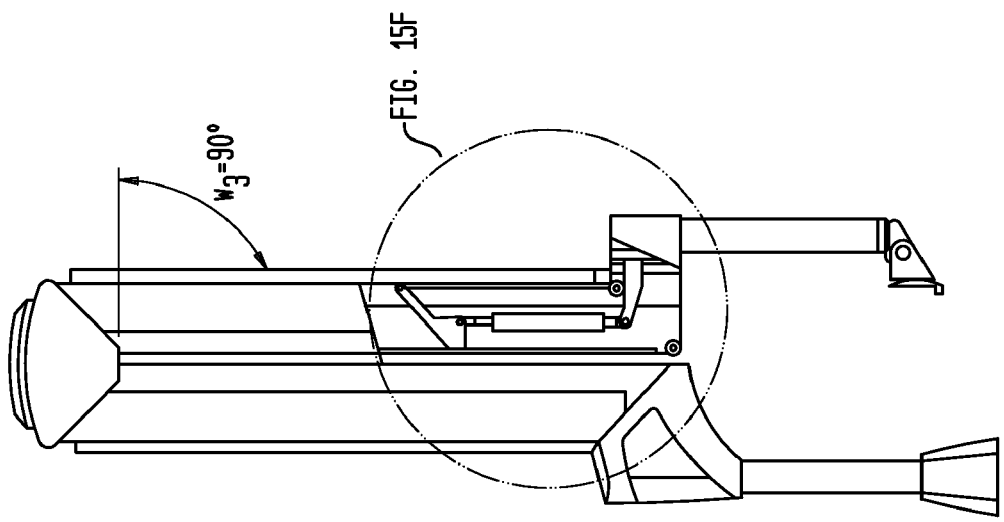

FIGS. 15E and 15F illustrate the second arm member 110' in a full downward or vertical position where $\omega_3$ is 90°. As seen in FIG. 15F, the gas cylinder 162 has a small angle $\Delta_3$ relative to the upper channel stiffening member 128 or upper channel 110a of the second arm member 110. $\Delta_3$ is smaller than $\Delta_2$, and is preferably less than about 15°, more preferably on the order of 0°. In this position, the point where the gas cylinder 162 connects to the clevis 164 is shown as being substantially midway between the upper and lower channel members 110a and 110b. Here, the gas cylinder 162 is preferably not completely compressed. In this relationship, there should be minimal or no force from the gas cylinder 162 being applied to the arm member 110'. Thus, the arm member 110' remains in the full downward position and does not "float" back up.

In a preferred example, the assembly 100 tapers generally from the end of the first arm member 106 adjacent the first endcap 102 to the end of the second arm member 110 adjacent the second endcap 114. FIG. 12A is a top view of the assembly 100 without the coverings 126a on the upper channel members 106a and 110a. As seen in this figure, the first arm member 106 preferably tapers from point 276 to point 278. Similarly, the second arm member 110 preferably tapers from point 280 to point 282. Most preferably, the tapering is constant from point 276 to point 282. In one example, the tapering may be at an angle ρ between 0.5° and 2.5°. For instance, the tapering may be on the order of 1°, for instance between 0.75° and 1.25°. In a preferred example, ρ is approximately 1.2°.

The transversal tapering illustrated in FIG. 12A may be done alone, or in conjunction with the longitudinal tapering described above with regard to FIG. 3. Similarly, the longitudinal tapering may be done independently of the transversal tapering. Preferably, the transversal tapering and the longitudinal tapering are done together, providing a constantly tapering appearance in multiple dimensions.

FIGS. 12B-D illustrate cutaway views of the first and second arm members 106 and 110 having a tapered configuration. For instance, FIG. 12B shows a cutaway view along the 12A-12A line close to the point 276. Here, the first arm member 106 has a width $W_1$. Next, FIG. 12C shows a cutaway view along the 12B-12B line close to the point 278. Here, the first arm member 106 has a width $W_2$. FIG. 12D shows a cutaway view of the second arm member 110 along the 12C-12C line close to the point 280. Here, the second arm member 110 has a width $W_3$. Finally, FIG. 12E shows a cutaway view along the 12D-12D line close to the point 282. Here, the second arm member 110 has a width $W_4$. As shown, $W_1 > W_2 > W_3 > W_4$.

In the examples above with regard to the extension arm assembly 100, structural support for the first and second arm members 106 and 100 is provided by the upper channel stiffening members 128 and 150 and the lower channel stiffening members 130 and 152. In such a case, is it possible to make the upper and lower channel members thinner, lighter or of less expensive materials. However, in some situations it is desirable to not use the upper and/or the lower channel stiffening members. In this case, the upper channel members, the lower channel members, or both, will provide structural support to the extension arm assembly.

FIGS. 16A-I illustrate an extension arm assembly 300 which is generally similar to the extension arm assembly 100 except that the lower channel stiffening members are omitted. FIG. 17A is a bottom perspective view of the assembly 300 with certain elements removed for illustrative purposes. As shown, the assembly 300 has first and second arm members 306 and 310, which are similar to the first and second arm members 106 and 110 discussed above. Here, the first arm member 306 and the second arm member 310 may each include upper and lower channel members, identified as upper and lower channel members 306a and 306b and 310a and 310b, respectively.

FIG. 17B is a longitudinal cross-sectional view of the assembly 300 of FIG. 17A. FIG. 17C is another cutaway view of the assembly 300 of FIG. 17A, showing the arm members 306 and 310 in a folded orientation. As shown, the first and second arm members 306 and 310 include many of the same components as the arm members 106 and 110, with the exception of the lower channel stiffening members 130 and 152 (see FIG. 2C). Here, as in the assembly 100, the variable force clevis 142 is desirably coupled to the upper stiffening member 128 by the upper bracket 206, and the variable force clevis 164 is desirably coupled to the upper stiffening member 150 by the upper bracket 214.

Figure 16H:
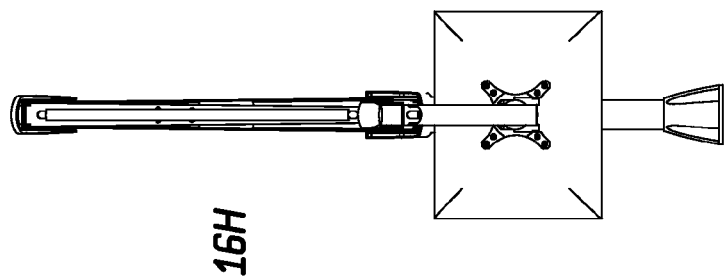
Figure 16E:
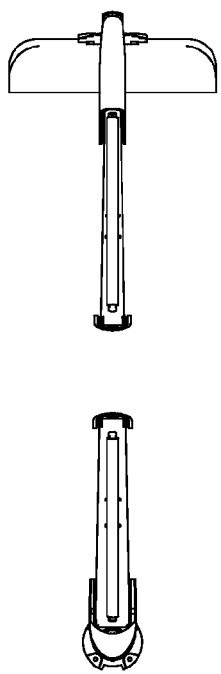
Figure 16F:
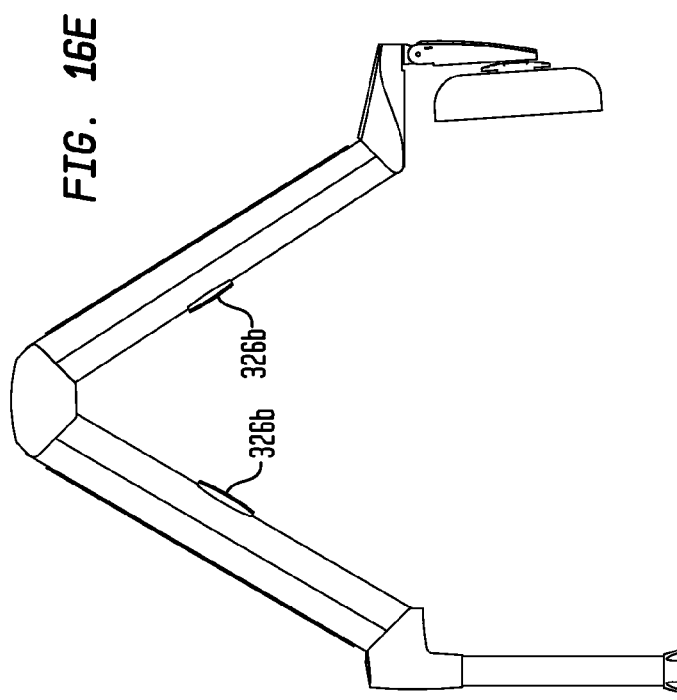
Figure 16G:
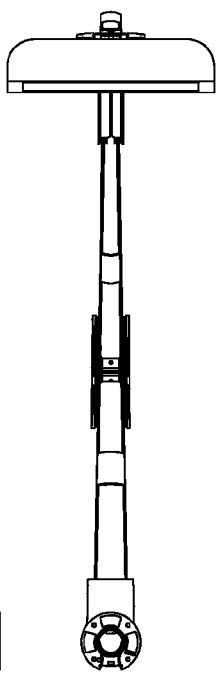
Figure 16I:
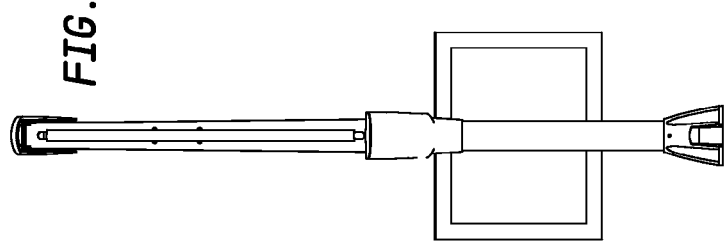

In the present embodiment, the lower channel members 306b and 310b provide structural support in lieu of the lower stiffening members 130 and 152. Here, the second end 176 of the variable force clevis 142 is preferably coupled to the lower channel member 306b by a bracket 309, which includes the fastener 210. Similarly, the variable force clevis 164 is preferably coupled to the lower channel member 310b by a bracket 311, which includes the fastener 218. Coverings 326b, as shown in FIG. 16E, are adapted to conceal the brackets 309 and 311.

FIG. 17D is a partially disassembled view of the assembly 300 with the upper channels 306a and 310a and the lower channels 306b and 310b removed. Here, the upper channel stiffening members 128 and 150 are clearly visible along with the brackets for supporting the variable force clevises. In this embodiment, the variable force clevises may be of the same configurations as described in the other embodiments herein, or may comprise alternative structures as shown in FIGS. 18 and 19.

Specifically, FIGS. 18A-C illustrate a variable force clevis 342, and FIGS. 19A-D illustrate a variable force clevis 364. With regard to FIGS. 18A-C, the clevis 342 is similar to the clevis 142 in that the clevis 342 has a body member 344 having a first end 346 and a second end 348. However, instead of including first and second halves which are symmetric about a central longitudinal axis, there is a single arm member 350 extending from the body member 344. As shown in the side and top views of FIGS. 18B and 18C, respectively, the clevis 342 is generally planar. In a preferred example, a pair of clevises 342 may be used, for instance in place of a single clevis 142. It may be desirable to use the pair of clevises 342 in lieu of the clevis 142 for space considerations and/or for ease of assembly. The clevises 342 connect to the supporting structures in the same manner that the clevis 142 would connect. Most preferably, the clevises 342 are pivotally coupled to the supporting structures.

As illustrated in FIG. 18A, the arm member 350y is disposed at an angle $\alpha'_1$ relative to the longitudinal portion of the variable force clevis 342 from the first end 346 to the second end 348. Preferably, the angle $\alpha'_1$ is on the order of 135°, although the exact angle may vary, for instance by +/−5° to 10°. For instance, the angle $\alpha'_1$ may be selected based upon a particular configuration of the variable force clevis 342. In one example, the angle $\alpha'_1$ may be between 130° and 140°. In another example, the angle $\alpha'_1$ may be between 115° and 150°. Wider or narrower angles may also be selected. As shown in the figure, angle $\alpha'_2$ is complementary to angle $\alpha'_1$. Thus, in the example where $\alpha'_1$ is 135°, $\alpha'_2$ is 45°.

As shown in FIGS. 19A-D, the variable force clevis 364 is similar to the variable force clevis 164. In fact, the variable force clevis 362 may be used in place of the variable force clevis 162 or any of the other variable force clevises herein.

FIG. 19A is a perspective view. FIG. 19B is a top view and 19C is a front view. FIG. 19D is a side cutaway view along the 19A-19A line of FIG. 19B. As shown in the perspective view of FIG. 19A, the variable force clevis 364 preferably includes a body member 366 having a first end 368 and a second end 370. The first end 368 desirably includes an opening 372 such as a receptacle or through hole. The second end 370 desirably also includes an opening 374 such as a receptacle or through hole.

As seen in the perspective and top views of FIGS. 19A and 19B, respectively, the body member 366 desirably includes arm members 376a and 376b which are symmetric about a central longitudinal axis of the variable force clevis 364. A portion of the body member 366 adjoining the arm members 376a,b is preferably thicker than the first and second ends 368 and 370. This thickness provides added strength to the connection with the arm members 376a,b. The arm members 376a and 376b may include respective openings 378a and 378b that are preferably aligned along a transverse axis.

As shown in the cutaway view of FIG. 19D, an angle $\beta'_1$ is formed at the nexus 380 of the arm members 376a,b with the body member 366. Preferably, the angle $\beta'_1$ is on the order of 135°, although the exact angle may vary, for instance by +/31 5° to 10°. For instance, the angle $\beta'_1$ may be selected based upon a particular configuration of the variable force clevis 364. In one example, the angle $\beta'_1$ may be between 130° and 140°. In another example, the angle $\beta'_1$ may be between 115° and 150°. Wider or narrower angles may also be selected. As shown, a second angle $\beta'_2$ is on the order of 18°. For instance the second angle $\beta'_2$ may be between about 10° and 30°. This defines a portion of the body member 366 where material is omitted, enabling connection of the gas cylinder 162.

Figure 20A:
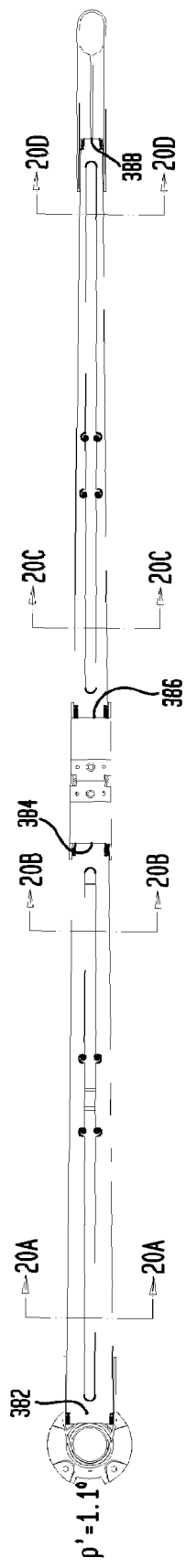
FIGS. 20A-E illustrate tapering of an extension arm assembly in accordance with aspects of the present invention.

In a preferred example, the assembly 300 tapers generally from the end of the first arm member 306 adjacent the first endcap 102 to the end of the second arm member 310 adjacent the second endcap 114. FIG. 20A, which is similar to FIG. 12A described above, is a top view of the assembly 300 without any coverings on the upper channel members 306a and 310a. As seen in this figure, the first arm member 306 preferably tapers from point 382 to point 384. Similarly, the second arm member 310 preferably tapers from point 386 to point 388. Most preferably, the tapering is constant from point 382 to point 388. In one example, the tapering may be at an angle $\rho'$ between 0.5° and 2.5°. For instance, the tapering may be on the order of 1°, for instance between 0.75° and 1.25°. In a preferred example, $\rho'$ is approximately 1.1°.

The transversal tapering illustrated in FIG. 16A may be done alone, or in conjunction with the longitudinal tapering described above with regard to FIG. 3. Similarly, the longitudinal tapering may be done independently of the transversal tapering. Preferably, the transversal tapering and the longitudinal tapering are done together, providing a constantly tapering appearance in multiple dimensions.

Figure 20B:
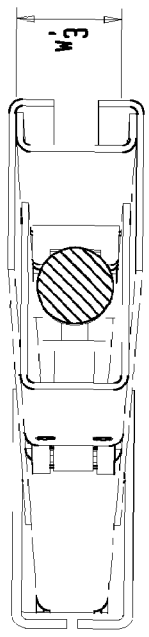
Figure 20C:
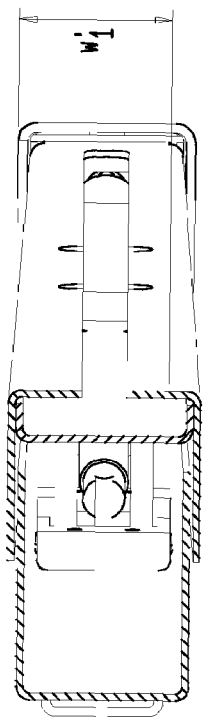
Figure 20D:
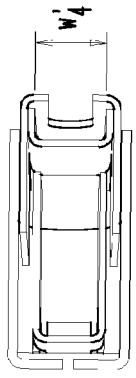
Figure 20E:
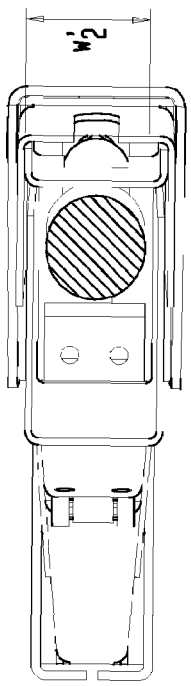
Figure 25D:
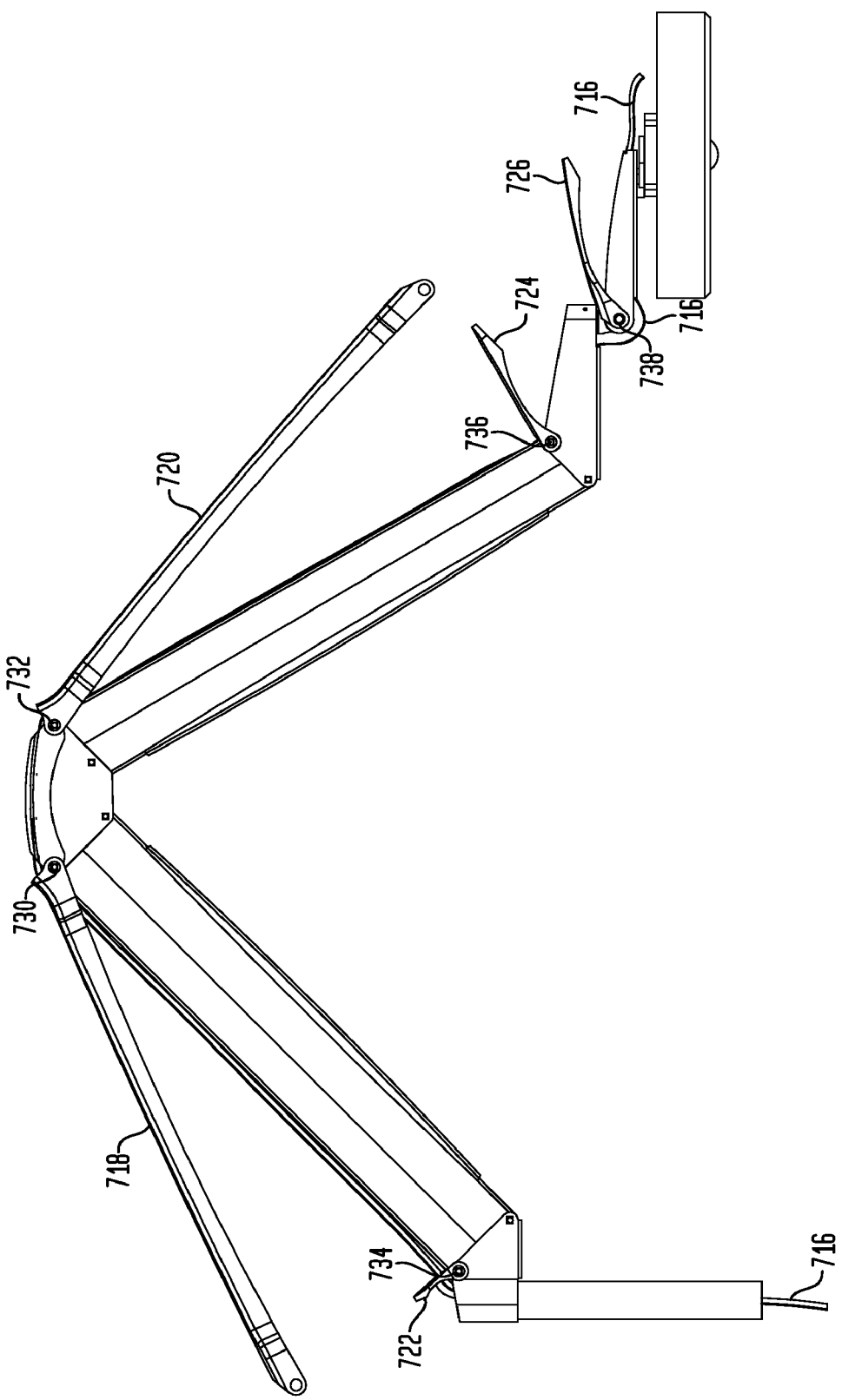
Figure 25H:
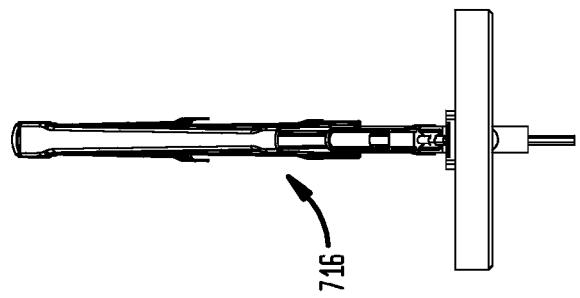
Figure 25E:
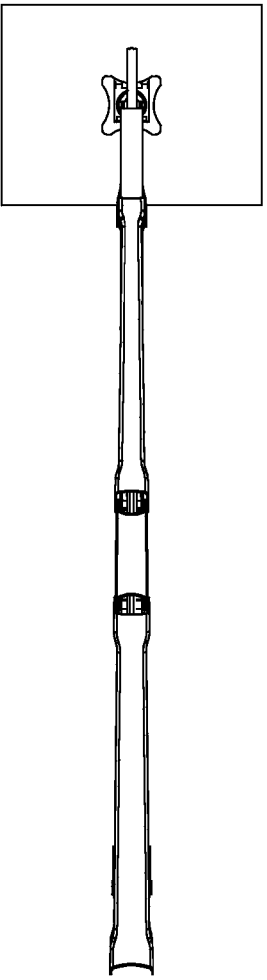
Figure 25F:
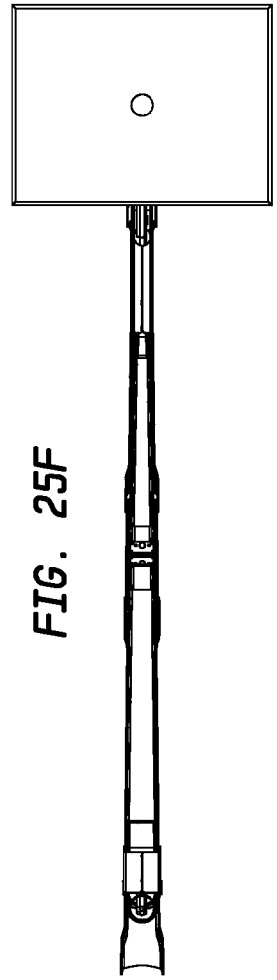
Figure 25G:
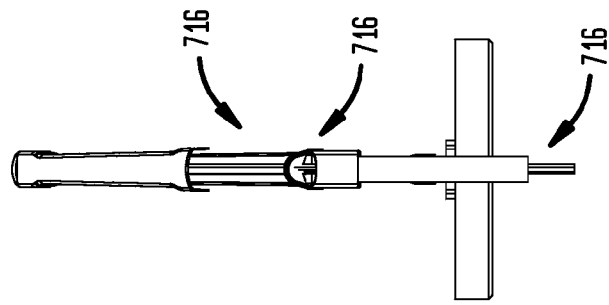

FIGS. 20B-D illustrate cutaway views of the first and second arm members 306 and 310 having a tapered configuration. For instance, FIG. 20B shows a cutaway view along the 20A-20A line close to the point 382. Here, the first arm member 306 has a width $W'_1$. Next, FIG. 20C shows a cutaway view along the 20B-20B line close to the point 384. Here, the first arm member 306 has a width $W'_2$. FIG. 20D shows a cutaway view of the second arm member 310 along the 20C-20C line close to the point 386. Here, the second arm member 310 has a width $W'_3$. Finally, FIG. 20E shows a cutaway view along the 20D-20D line close to the point 388. Here, the second arm member 310 has a width $W'_4$. As shown, $W'_1 > W'_2 > W'_3 > W'_4$.

As described above, the various extension arm assemblies employ variable force clevises to automatically adjust the force provided by the gas cylinders. This permits positioning of a user device in any number of positions for many different purposes. For instance, when a pair of arm members such as the first and second arm members 106 and 110 or 306 and 310 are employed, a display may be positioned near the foot of a patient's bed while the base member 104 is positioned by the head of the bed or at some other remote location.

While a pair of arm members have been shown, other variations are possible. For instance, a single arm member may be used, or three or more arm members may be used in conjunction. FIGS. 21A-C illustrate another preferred embodiment of the present invention, namely extension arm assembly. As shown, the assembly 400 includes a first endcap 402 that connects at one end to a base member 404 and at the other end to an arm member 406. The base member 404 may couple to a work surface 407 such as a desk or drawer. The arm member 406 is preferably connected to a second endcap 408.

While a user device such as a keyboard (not shown) may be directly or indirectly coupled to the second endcap 408 or to other components of the assembly 400, a tilting device 410 is preferably used to couple the user device to the second endcap 408. The tilting device 410 provides additional flexibility to position the user device as desired. A platform 412 for supporting the user device id preferably coupled to the tilting device 410.

In this assembly, the arm member 406 preferably includes upper and lower channel members 406a and 406b. A variable force clevis couples to a gas cylinder or other extension and retraction device to dynamically adjust the amount of force provided by the device. The variable force clevis and the gas cylinder or other device may connect within the arm member 406 in any of the configurations described herein. For instance, a first end of the gas cylinder may connect to either the first endcap 402 or to the second endcap 408, which the other end of the gas cylinder connects to the variable force clevis. Any of the variable force clevis configurations described herein may be employed.

As shown in FIGS. 21A-D, the assembly 400 may move through a range of positions and locations. For instance, as seen in FIG. 21A, the assembly 400 may be stored beneath the work surface 407 when not in use. Then, as shown in FIG. 21B, the assembly may slide out from under the work surface 407. Next, as shown in FIG. 21C, the assembly may be adjusted so that the arm member 406 is in a vertical position, providing a user with convenient access to the user device such as a keyboard. As above, an adjustable clevis may also be used in conjunction with the variable force clevis and the extension/retraction device.

FIG. 22 illustrates yet another preferred embodiment of the present invention. Here, extension arm assembly 500 is similar to the assemblies 100 and 300, but includes at least three arm members, which can be used to greatly extend the reach of the assembly 500. As shown, the assembly 500 includes a first endcap 502 that connects at one end to a base member 504 and at the other end to a first arm member 506. The base member 504 may connect to a support surface 507, which may be a wall, ceiling, work surface, etc.

The first arm member 106 is preferably connected to a first middle cap 508 at a first side thereof. A second arm member 510 preferably connects to the other side of the first middle cap 508. The second arm member 510 also connects to a second middle cap 512. Third arm member 514 connects to the second middle cap 512 and to a second endcap 516. While not shown, a variable force clevis is employed within each arm member to dynamically adjust the force provided by the extension and retraction device. Any of the aforementioned configurations and/or orientations of variable force clevis and extension/retraction device may be employed.

While a user device such as a flat panel monitor 518 may be directly or indirectly coupled to the second endcap 516 or to other components of the assembly 500, a tilting device 520 such as described above in the assembly 100 is preferably used to couple the user device 518 to the second endcap 516. The tilting device 520 provides additional flexibility to position the user device 518 as desired. The specifics of the assembly's components are the same as described above for the other embodiments herein and need not be repeated.

As shown, the support surface 507 may be part of the ceiling. This enables the user device 518 to be used and stored in a high-ceiling room such as in a warehouse or manufacturing facility. The user device 518 may be stored above a work area when not in use, and can be pulled down when it is needed. Any of the variable force clevis configurations described herein may be employed with any of the arm members. While three arm members are illustrated, additional arm members may be employed, for example by adding extra middle caps to the assembly 500.

FIGS. 23A-D illustrate another preferred embodiment of the present invention. Here, extension arm assembly 600 is generally similar to the assemblies 100 and 300, but includes a pair of middle caps coupled together, which can be used to provide an enhance degree of freedom to the assembly 600. As shown, the assembly 600 includes a first endcap 602 that connects at one end to a base member 604 and at the other end to a first arm member 606. The base member 604 may connect to a support surface 607, which may be a wall, ceiling, work surface, etc.

The first arm member 606 is preferably connected to a first middle cap 608 at a first side thereof. A second middle cap member 610 preferably connects to the other side of the first middle cap 608 through a coupling member 612. The second middle cap 610 also connects to a second arm member 614, which, in turn, connects to a second endcap. While not shown, a variable force clevis is employed within each arm member to dynamically adjust the force provided by the extension and retraction device. Any of the aforementioned configurations and/or orientations of variable force clevis and extension/retraction device may be employed.

While a user device such as a flat panel monitor 618 may be directly or indirectly coupled to the second endcap 616 or to other components of the assembly 600, a tilting device 620 such as described above in the assembly 100 is preferably used to couple the user device 618 to the second endcap 616. The tilting device 620 provides additional flexibility to position the user device 618 as desired. The specifics of most of the assembly's components are the same as described above for the other embodiments herein and need not be repeated. On exception is the coupling member 612.

As shown in FIGS. 23A-C, the coupling member 612 permits the second arm member 614 to swivel in relation to the first arm member 606. The coupling member 612 may be part of either middle cap 608 or 610, or may be a separate component. As seen in FIG. 23D, the coupling member 612 may be received within one or both middle caps when the assembly 600 is in a vertical position.

FIGS. 24A-F illustrate a preferred embodiment of an adjustable support apparatus such as extension arm assembly 700 in accordance with further aspects of the present invention. As shown, the assembly 700 includes a first endcap 702 that connects at one end to a base member 704 and at the other end to a first arm member 706. The base member 704 may be separate from the first endcap 702 or may be part of the first endcap 702. Preferably, the base member 704 has a hollow tubular structure, which be coupled to a support surface (not shown). The first arm member 706 is preferably connected to a middle cap 708 at a first side thereof. A second arm member 710 preferably connects to the other side of the middle cap 708. The second arm member 710 also connects to a second endcap 712.

While a user device such as the flat panel monitor 116 may be directly or indirectly coupled to the second endcap 712 or to other components of the assembly 700, the tilting device 114 is preferably used to couple the user device 116 to the second endcap 712. The tilting device 114 provides additional flexibility to position the user device 116 as desired. An extension member 714 may be part of the second endcap 712 or may be a separate component, and is preferably used to couple to the tilting device 114.

The assembly 700 is generally similar to the other assemblies described herein, including assemblies 100 and 300. For instance, the assembly 700 preferably employs the same variable force clevises and associated components as in the aforementioned assemblies. Structurally and functionally, the assembly 700 preferably operates in the same manner as the other assemblies, for instance with regard to extension, retraction and other movement of its arm members 706 and 710.

It can be seen that the first arm member 706 and the second arm member 710 may each include upper and lower channel members, identified as upper and lower channel members 706a and 706b and 710a and 710b, respectively. Depending upon the selected configuration, one or both of the upper and lower channel members of either the first or second arm members may provide structural support for the assembly 700, for instance as it supports the weight of the user device 116. Alternatively, either upper channel member and/or either lower channel member of each arm member need not provide structural support, as will be described below. In either case, the upper and/or lower channel members may also be configured to provide an aesthetically pleasing appearance. Furthermore, the upper and/or lower channel members may also be used for cable management purposes by concealing the power and/or signal cables of the user device 116. Preferably, the user device cables run through the base member 704, the first endcap 702, through one or both of upper and lower channel members 706a,b, through the middle cap 708, through one or both of the upper and lower channel members 710a,b, through the second endcap 712 and through the extension member 714. The cable(s) may run through the upper or lower channel members of either arm member 706 or 710, and/or may be concealed by covers attached to the upper/lower channel members.

Cable management is important for reasons that extend beyond the aesthetic. In many situations, it is undesirable or detrimental to have cables of the user device running between the user device and other equipment or between the user device and a power source without the cables being secured. For instance, the cables may get tangled in or trapped by equipment, particularly when an extension arm is being moved through various positions and orientations. This may result in damage to the cable, to the user device, and/or to the extension arm. Thus internal cable management, wherein the cable is run through part or all of the extension arm, is highly desirable. Even in such a case, the cable is still subject to movement as the extension arm assembly is repositioned.

The extension arm assembly 700 provides internal cable management while preventing kinking or other damage to cable 716 of the display 116. As shown in the perspective view of FIG. 24A, the side view of FIG. 24B, the top view of FIG. 24C, the bottom view of FIG. 24D, the rear view of FIG. 24E and the front view of FIG. 24F, cable 716 of the display 116 is managed and substantially concealed within the assembly 700.

FIGS. 25A-H illustrate the assembly 700 in a partly assembled configuration. As best seen in the perspective views of FIGS. 25A-C and the side view of FIG. 25D, the upper channel members 706a and 710a each preferably include covers, namely covers 718 and 720, respectively. The first endcap 702 may include a cover 722 and the second endcap 712 may include a cover 724 as well. Furthermore, the extension member 714 may include a cover 726 therein. The middle cap 708 desirably also includes a cover 728. The covers 718, 720, 722, 724, 726 and 728 are used to secure or maintain the cable 716 within the body of the assembly 700, while also providing easy, immediate access to the cable 716.

The cover 718 of the upper channel member 706a may be fully removable or may be hingedly connected at one end to a connector such as a fastener 730 (e.g. a pin). Similarly, the cover 720 of the upper channel member 710a may be fully removable or may be hingedly connected at one end to a connector such as a fastener 732 (e.g. a pin). The cover 728 is preferably hingedly connected to or fully removable from the middle cap 708 by the connectors 730 and 732.

The cover 722 is preferably hingedly secured to or fully removable from the first endcap 702 by a connector such as a fastener 734 (e.g. a pin). Similarly, the cover 724 is preferably hingedly secured to or fully removable from the second endcap 712 by a connector such as a fastener 736 (e.g. a pin). And the cover 726 is preferably hingedly secured to or fully removable from the extension member 714 by a connector such as a fastener 738 (e.g. a pin).

Figure 26B:
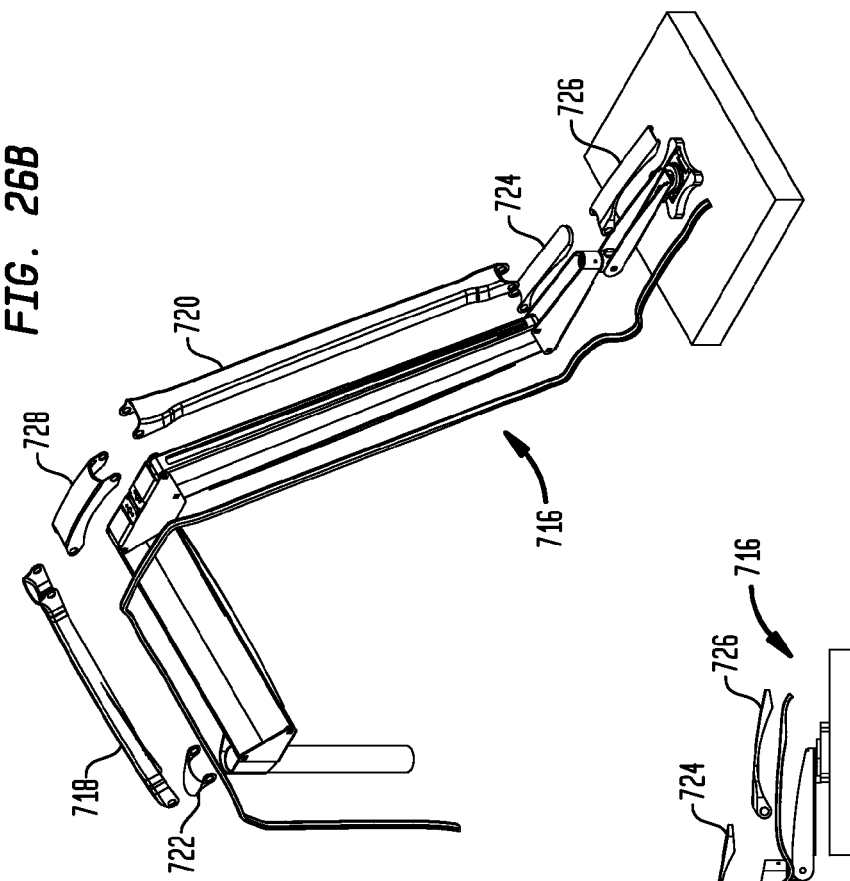
FIGS. 26A-B illustrate exploded views of the extension arm of FIGS. 24A-F.
Figure 26A:
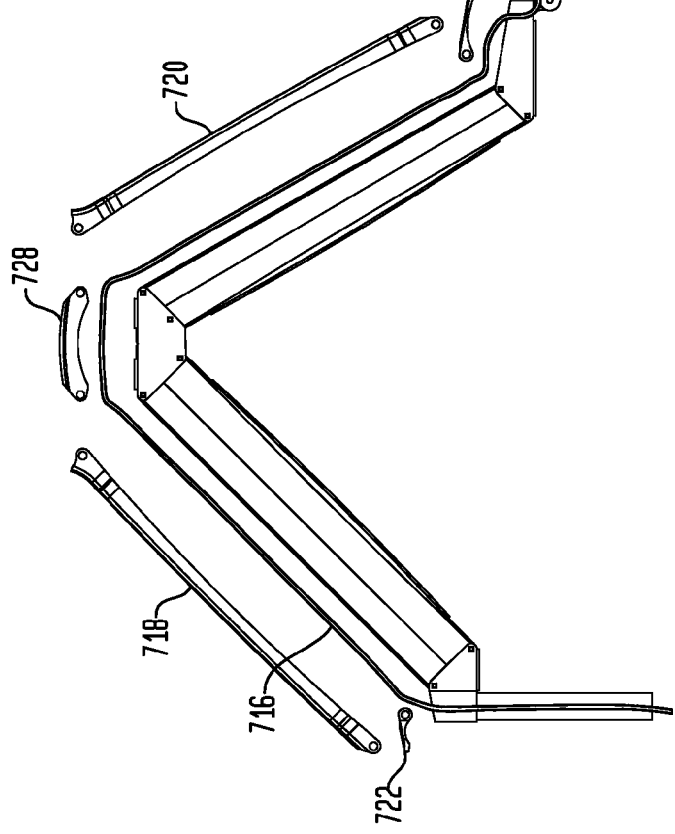

In order to run the cable 716 through the assembly 700, it is possible to unhinge at least some of the covers. For example, covers 718, 720, 722, 724 and 726 may be partly disengaged from the assembly 700. However, it is more preferable to fully remove at least covers 718, 720 and 728 when running the cable 716. FIGS. 26A-B illustrate exploded views with all of the covers fully removed from the rest of the assembly 700 to show how the cable 716 may be run in a preferred example. Depending upon the specific configuration of the assembly 700, it may be easiest to install the cable 716 while all of the covers are fully removed.

Figure 27A:
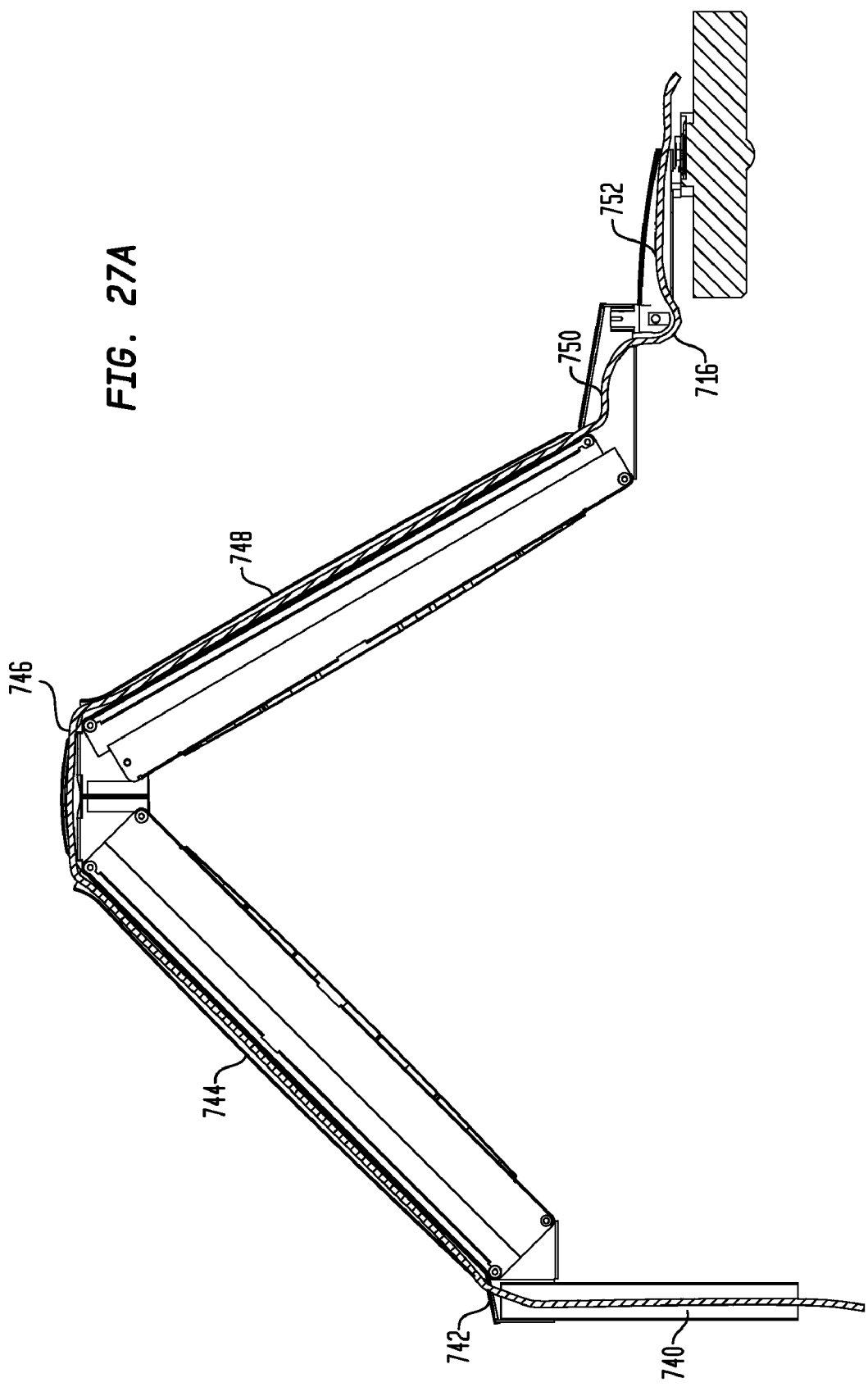
FIGS. 27A-B are cutaway views of the extension arm of FIGS. 24A-F.
Figure 27B:
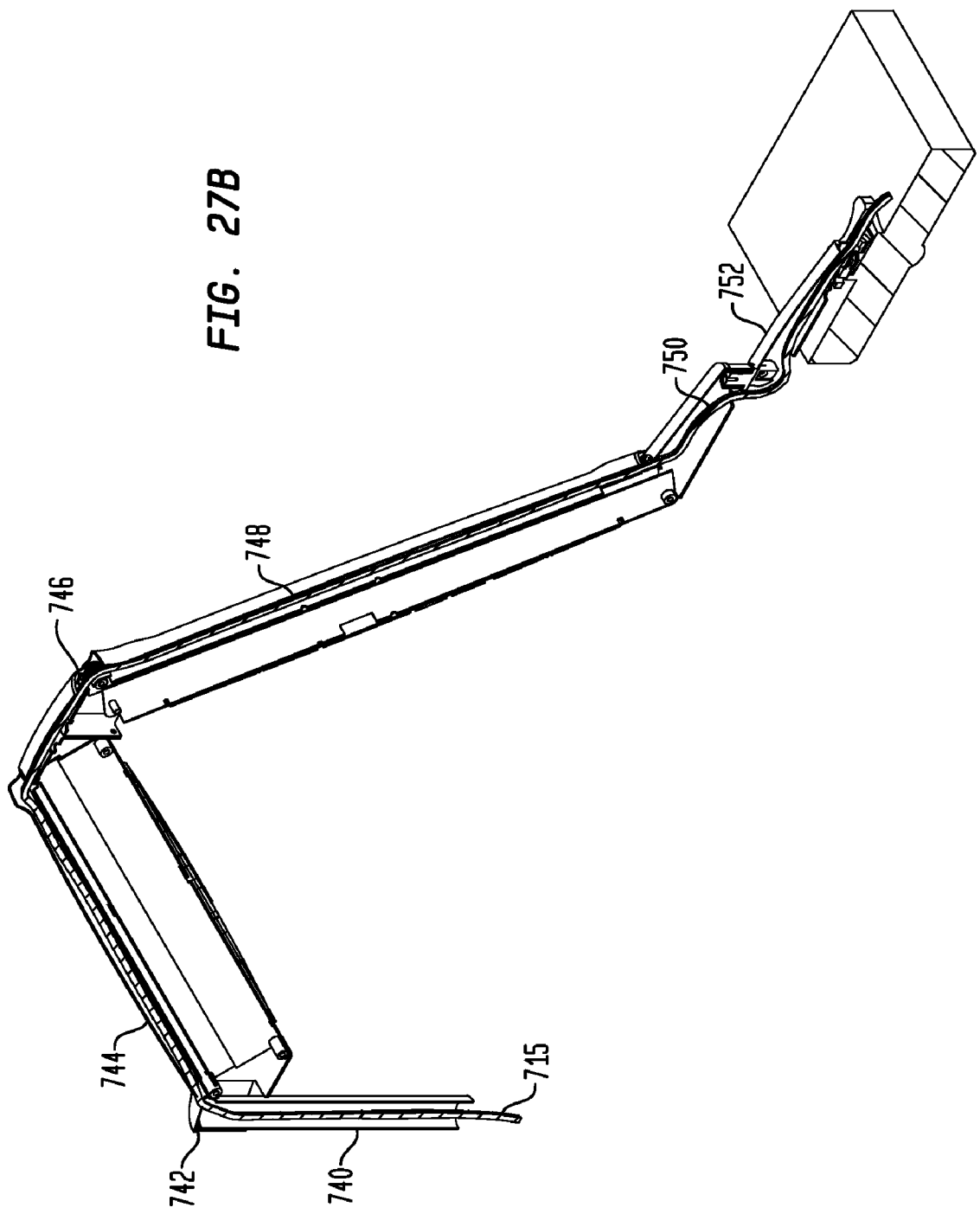

FIGS. 27A and 27B are cutaway views taken along the length of the assembly 700. As shown in these figures, the cable 716 may be disposed between the cover 718 and the body of the upper channel member 706a, between the cover 728 and the body of the middle cap 708, and between the cover 720 and the body of the upper channel member 710a. Preferably, the base member 704, the second endcap 712 and the extension member 714 are each hollow or include a receptacle therein to receive the cable 716. As seen in the side view of FIG. 27A, each of the base member 704, the second endcap 712 and the extension member 714 desirably has a first opening at a first end thereof and a second opening at a second end thereof for the cable 716 to pass through.

Thus, it can be seen in FIGS. 27A-B that the assembly 700 includes a series of cable channels through the various components to provide internal cable management for the cable 716. In particular, the base member 704 includes a cable channel 740 therein, which couples to cable channel 742 of the first endcap 702. The cable channel 742 is also coupled to a cable channel 744 of the first arm member 706. The cable channel 744 preferably extends substantially the length of the first arm member, and couples to cable channel 746 of the middle cap. In turn, the cable channel 746 also couples to cable channel 748 of the second arm member 710. As with the cable channel 744 of the first arm member 706, the cable channel 748 of the second arm member 710 preferably extends substantially the length of the second arm member. Cable channel 750 of the second endcap 712 preferably couples to the cable channel 748 as well as to cable channel 752 of the extension member 714, if the extension member is used. As shown, a portion of the cable 716 may extend outside of the assembly 700 as it passes from the cable channel 750 of the second endcap 712 to the cable channel 752 of the extension member 714.

In an alternative configuration, the cable 716 may be run along the lower channel members 706b and 710b. In this case, the lower channel members 706b and 710b may include the respective covers 718 and 720. The covers 718 and 720 preferably operate and connect to the lower channel members 706b and 710b in the same way as described above with regard to the upper channel members 706a and 710a. In this alternative configuration, the cover 728 may be disposed along the bottom side of the middle cap 708. Similarly, the covers 722, 724 and 726 may also be disposed along the bottoms of the first endcap 702, the second endcap 712 and the extension member 714.

The various examples presented herein illustrate extension arm assemblies in different configurations that can be used in a number of different environments for any number of specialty uses. Regardless of the configuration, use of the variable force clevis provides the means for automatically/dynamically adjusting the force of the gas cylinder as the arm member(s) moves through a range of motion. Adjustable clevises may also be employed in conjunction with the variable force clevises, as described in detail above.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. For instance, cable management may be employed with any embodiment. Tapering, such as transverse and/or lateral tapering, may also be used in any embodiment.

The invention claimed is:

1. An adjustable support apparatus for supporting a user device, comprising:
    a first cap having a first section, a second section and a cover disposed between the first and second sections, the first section being adapted for engagement with a support surface and the cover being adapted for providing immediate access to a cable of the user device; a second cap having a first section, a second section and a cover disposed between the first and second sections, the first section being adapted for engagement with the user device and the cover being adapted for providing immediate access to the cable of the user device;
    a first arm member having first and second ends and a cover disposed between the first and second ends for providing immediate access to the user device cable, the first end of the first arm member being coupled to the second section of the first cap, and the first arm member being operable to receive an extension and retraction device therein for providing a force for supporting the user device;
    a middle cap disposed between the first and second caps, the middle cap having a first side, a second side and a cover coupled to the first and second sides thereof for providing access to the user device cable, the first side of the middle cap being connected to the second end of the first arm member; and a second arm member having first and second ends and a cover disposed between the first and second ends for providing immediate access to the user device cable, the first end of the second arm member being connected to the second side of the middle cap, the second end of the second arm member being connected to the second section of the second cap, and the second arm member being operable to receive a second extension and retraction device therein for providing a force for supporting the user device;

wherein one of the first and second arm members including a variable force clevis connected to a respective one of the extension and retraction devices, the variable force clevis being operable to vary the force provided by the respective extension and retraction device as the respective one of the first and second arm members is adjusted between selected positions.

2. The adjustable support apparatus of claim 1, wherein the first arm member cover is removably coupled to the first arm member, the second arm member cover is removably coupled to the second arm member, and the middle cap cover is removably coupled to middle cap so that the cable of the user device is receivable within the first arm member, the second arm member and the middle cap.

3. The adjustable support apparatus of claim 2, wherein the first cap cover is pivotally connected to a surface of the first cap, the second cap cover is pivotally connected to a surface of the second cap, and the first and second cap covers are adapted to provide immediate access to the cable of the user device.

4. The adjustable support apparatus of claim 1, further comprising an extension member having first and second ends, the first end thereof being coupled to the first section of the second cap and the second end thereof being adapted for engagement with the user device.

5. The adjustable support apparatus of claim 4, wherein the extension member includes a cover disposed on a first surface thereof for providing immediate access to the cable of the user device.

6. The adjustable support apparatus of claim 5, wherein the cover is pivotally coupled to the first surface of the extension member.

7. The adjustable support apparatus of claim 1, wherein:
the middle cap includes a first fastener disposed on the first side thereof and a second fastener disposed on the second side thereof, and a first side of the middle cap cover is removably connected to the first fastener and a second side of the middle cap cover is removably coupled to the second fastener;
a first end of the first arm member cover is removably coupled to the first middle cap fastener; and
a first end of the second arm member cover is removably coupled to the second middle cap fastener.

8. The adjustable support apparatus of claim 1, wherein:
the first arm member includes an upper channel member and a lower channel member;
the second arm member includes an upper channel member and a lower channel member;
the first arm member cover is disposed along the upper channel member thereof; and
the second arm member cover is disposed along the upper channel member thereof.

9. The adjustable support apparatus of claim 1, wherein the user device cable is substantially received within the first and second caps, the first and second arm members and the middle cap during use of the user device.

10. An adjustable support apparatus for supporting a user device, comprising;
a first cap having a first section, the first section being adapted for engagement with a support surface, a second section and first cover means disposed between the first and second sections for providing immediate access to a cable of the user device;
a second cap having a first section, the first section being adapted for engagement with the user device, a second section and second cover means disposed between the first and second sections for providing immediate access to the cable of the user device;
a first arm member having first and second ends, the first end of the first arm member being coupled to the second section of the first cap, the first arm member being operable to receive an extension and retraction device therein for providing a force for supporting the user device, and third cover means disposed between the first and second ends for providing immediate access to the user device cable;
a middle cap disposed between the first and second caps, the middle cap having a first side, a second side and fourth cover means coupled to the first and second sides thereof for providing access to the user device cable, the first side of the middle cap being connected to the second end of the first arm member, and a second arm member having first and second ends, the first end of the second arm member being connected to the second side of the middle cap, the second end of the second arm member being connected to the second section of the second cap. the second arm member being operable to receive a second extension and retraction device therein for providing a force for supporting the user device, and fifth cover means disposed between the first and second ends for providing immediate access to the user device cable;
wherein one of the first and second arm members including variable force means connected to a respective one of the extension and retraction devices for varying the force provided by the respective extension and retraction device as the respective one of the first and second arm member is adjusted between selected positions.

* * * * *